US010289830B2

(12) United States Patent
Ni

(10) Patent No.: US 10,289,830 B2
(45) Date of Patent: May 14, 2019

(54) INTERCEPTION-PROOF AUTHENTICATION AND ENCRYPTION SYSTEM AND METHOD

(71) Applicant: Min Ni, Clarkston, GA (US)

(72) Inventor: Min Ni, Clarkston, GA (US)

(*) Notice: Subject to any disclaimer, the term of this patent is extended or adjusted under 35 U.S.C. 154(b) by 0 days.

(21) Appl. No.: 15/249,355

(22) Filed: Aug. 27, 2016

(65) Prior Publication Data

US 2017/0124317 A1 May 4, 2017

Related U.S. Application Data

(60) Division of application No. 14/931,613, filed on Nov. 3, 2015, now Pat. No. 9,460,280, which is a continuation of application No. 14/925,769, filed on Oct. 28, 2015, now abandoned.

(51) Int. Cl.

| | |
|---|---|
| ***H04L 29/06*** | (2006.01) |
| ***G06F 21/00*** | (2013.01) |
| ***G06F 21/36*** | (2013.01) |
| ***H04L 9/32*** | (2006.01) |

(52) U.S. Cl.

CPC ............ *G06F 21/36* (2013.01); *H04L 9/3226* (2013.01); *H04L 63/0435* (2013.01); *H04L 63/083* (2013.01)

(58) Field of Classification Search

CPC ..... G06F 21/36; H04L 9/3226; H04L 63/083; H04L 63/0435

See application file for complete search history.

(56) References Cited

U.S. PATENT DOCUMENTS

| | | | | |
|---|---|---|---|---|
| 7,801,307 | B2 * | 9/2010 | Bantwal | G09C 1/02 380/259 |
| 8,031,865 | B2 * | 10/2011 | Stedron | H04L 9/088 380/28 |
| 8,510,552 | B2 * | 8/2013 | De Atley | H04L 9/0891 380/277 |
| 8,756,672 | B1 | 6/2014 | Allen et al. | |
| 8,881,251 | B1 | 11/2014 | Hilger | |
| 2007/0028088 | A1 * | 2/2007 | Bayrak | H04L 63/0428 713/150 |
| 2008/0025497 | A1 * | 1/2008 | Ogram | H04L 9/16 380/28 |
| 2010/0023751 | A1 * | 1/2010 | He | H04L 63/0428 713/150 |

(Continued)

*Primary Examiner* — Lisa C Lewis

(74) *Attorney, Agent, or Firm* — Kaplan Breyer Schwarz, LLP

(57) ABSTRACT

An interception-proof authentication and encryption system and method is provided that utilizes passcodes with individual pins that are made up of symbols from a set of symbols, and tokens that contain at least two symbols from the set of symbols used for the passcode. Multiple tokens (a "token set") are presented to a user, with some or all of a user's pre-selected pins (symbols) randomly inserted into some or all of the tokens. The user selects a token from the token set for each pin position in the passcode. The user is authenticated based on the selected tokens. Because each selected token may or may not contain one of the pre-selected pins in the user's passcode, and also contains other randomly generated symbols that are not one of the pre-selected pins in the user's passcode, someone that observes which tokens the user has chosen cannot determine what the user's actual passcode is.

28 Claims, 43 Drawing Sheets

(56) References Cited

U.S. PATENT DOCUMENTS

| | | | | |
|---|---|---|---|---|
| 2011/0167102 | A1 | 7/2011 | Matzkel et al. | |
| 2012/0124656 | A1* | 5/2012 | Senac | H04L 9/3213<br>726/9 |
| 2015/0121493 | A1* | 4/2015 | Chen | G06F 21/36<br>726/6 |

* cited by examiner (GATE_4)

1st Dimension 1 2 3 4 5 6 7 8 9 10 11 12 13 14 15 16 17 18 19 20 21 22 23 24 25 26 27 28 29 30 31 32 33 34 35 36

A B C D E F G H I J K L M N O P Q R S T U V W X Y Z – ! @ # % < & * : ?

2nd Dimension

3rd Dimension

4th Dimension

Fig. 2B (GATE_5)

1st Dimension

Ⓐ Ⓑ Ⓒ Ⓓ Ⓔ Ⓕ Ⓖ Ⓗ Ⓘ Ⓙ Ⓚ Ⓛ Ⓜ Ⓝ Ⓞ ⓟ Ⓠ Ⓡ Ⓢ Ⓣ Ⓤ Ⓥ Ⓦ Ⓧ Ⓨ Ⓩ

2nd Dimension

α β γ δ ε ζ η θ ι κ λ μ ν ξ ο π ρ ς σ τ υ φ χ ψ ω ϟ

3rd Dimension 1 2 3 4 5 6 7 8 9 10 11 12 13 14 15 16 17 18 19 20 21 22 23 24 25 26

4th Dimension

○ ● △ ▲ □ ■ ☆ ★ ♤ ♠ ♧ ♣ ♡ ♥ ◇ ◆ ☺ ☻ ♂ ♀ ☂ ☼ ∵ ∴ ≡ ≠

5th Dimension

(Token Generation Rules)

[ For illustration, GATE_4 embodiment is used (see Fig. 2A)]
The goal is to generate 16 tokens with no redundant symbols in them, each token will have 4 symbols, one from each dimension. e.g. : Token_1( 2 Ⓩ ♡ ÷ ), Token_2( 30 ? ♠ λ ), ... , Token_16( 16 @ ✓ ✉ )
At least one user pin* should be in one of the 16 tokens, possibly more, even all of them.

Notice the orders of symbols above, 1st one is always from 1st_Dim, 2nd one is from the 2nd_Dim ...

| Rules And Steps | Example Results |
|---|---|
| [1] Create 4 Vectors each contains 36 symbols from one of the four dimensions described in FIG 2 : Available_Symbols for GATE_4. Each time a symbol is removed from a Vector, its size will reduce by one. The reason to remove symbols from the vectors is to avoid duplication. I'll refer to the above vectors as dimensional vectors : V_1, V_2, V_3, V_4. Each token generation step will remove one remaining symbol from each of the 4 above vectors, so that no two tokens will have the same symbols. | [1] V_1( 1, 2, ... 35, 36 ) V_2( Ⓐ, Ⓑ, ... ;, ? ) V_3( ○, ●, ... ℃, ℉ ) V_4( +, −, ... ₣, ✉ ) |
| [2] Get User_Id entered by the user during login process | [2] admin |
| [3] Get user passcode** from User_Id saved in memory during registration | [3] ① ♥ 2 ✉ |
| [4] Save a random pin from user passcode into : User_Pin_Vector*** | [4] ♥ |
| [5] Save a random number [ from 1 to 16 ] to User_Pin_Show_Up_Location | [5] 7 |
| [6] for (i=1 ; i<=16 ; i++) do step [7] and [8] to generate 16 tokens | [6] |
| [7] Create an empty token : a vector to hold 4 symbols | [7] Token_i() |
| [8] for (j=1 ; j<=4 ; j++) do step [8.1] or [8.2] to add one symbol from each dimension to the token. Step [8.1] makes sure at least 1 user pin is used. | [8] Add 4 symbols to it. |
| [8.1] if i equals User_Pin_Show_Up_Location and ♥ from User_Pin_Vector is still in V_j, remove it from V_j and add it to current token. | [8.1] Token_7(15 ~ ♥ ✉) |
| [8.2] else remove one random symbol from V_j to add to the current token. Size of V_j will reduce by one after removing that symbol. | [8.2] Token_i(8 Ⓔ ★ ⊖) |
| [9] After the above steps, we will have 16 tokens with at least one user pin. | [9] Token_1, ..., Token_16 |

Note : * pin – each symbol in a passcode** is a pin. For instance ① is the 1st pin and ✉ is the 4th pin in the following passcode : ① ♥ 2 ✉

** passcode – similar to common sense password, but can contain symbols from the selections in each dimension [ e.g. ① ♥ 2 ✉ ] , the dimensions are described in FIGS. 2A and 2B.

*** User_Pin_Vector – a Vector in computer language Java which can contain any number of elements of any type, in this case a symbol.

Fig. 6

(Token Selection Rules)

[1] User will be shown 16 tokens in a 4 x 4 table, each token will have 4 symbols in it, for example, a token(2 Ⓩ ♡ ÷) will show up like this :

| | |
|---|---|
| 2 | Ⓩ |
| ♡ | ÷ |

Each dimension has a fixed position in a token, upper left is for 1st dimension symbols, upper right is for 2nd dimension symbols, lower left is for 3rd dimension symbols, lower right is for 4th dimension symbols. Fixed position will help user quickly locate symbols in a token.

| | |
|---|---|
| 1st D | 2nd D |
| 3rd D | 4th D |

[2] User must follow the order of user passcode, e.g. Ⓘ ♥ 2 ✉, to select the tokens that contain user pins. For example, the table on the right has 16 tokens, at least one of them contains a user pin, user can follow the below steps to select tokens.

For easier reference, I'll name The rows : A, B, C, D, and columns : 1, 2, 3, 4

| | 1 | 2 | 3 | 4 |
|---|---|---|---|---|
| A | 13 & ☺ ✉ | 34 Ⓜ ◊ ♫ | 29 Ⓟ → ☢ | 28 ! ✓ ÷ |
| B | 3 Ⓠ ← ® | 36 Ⓥ = ☯ | 6 : ↓ π | 19 Ⓦ X ÷ |
| C | 20 Ⓩ ☪ ☞ | 26 Ⓙ ℉ € | 17 Ⓢ ♤ ✕ | 12 Ⓒ ♡ ₪ |
| D | 32 Ⓚ ♠ $ | 35 Ⓕ ☆ ❄ | 16 Ⓑ ● ☜ | 10 Ⓤ ℃ ☏ |

[3] Since user's 1st pin is Ⓘ which belongs to 2nd dimension, he can search for it in the upper right corner of each token, because it's not in any of the 16, he can and should pick any token in its place.

So I can pick A2 : (34 Ⓜ ◊ ♫). Same with 2nd user pin : ♥, because it's missing, I can pick D3 : (16 Ⓑ ● ☜). 3rd user pin 2 is also missing, so I'll pick B1 : (3 Ⓠ ← ®). But the 4th user pin ✉ is in token A1, user must pick it to be valid, so I'll pick A1 : (13 & ☺ ✉). So in the end, user picked the following 4 tokens : (34 Ⓜ ◊ ♫), (16 Ⓑ ● ☜), (3 Ⓠ ← ®) and (13 & ☺ ✉), these 4 tokens will be sent to the server for validation.

For GATE_5 : The process is the same as GATE_4, just add one more dimension. A sample token and the locations of the 5 dimensions are shown on the right. Now a token might be like this : ( Ⓙ σ 17 ● £ ).

| | | |
|---|---|---|
| Ⓙ | | σ |
| | 17 | |
| ● | | £ |

| | | |
|---|---|---|
| 1st D | | 2nd D |
| | 3rd D | |
| 4th D | | 5th D |

Each table has 16 tokens, but each token contains 5 symbols – one from each of the 5 dimensions from FIG. 2B.

Fig. 7

(Token Validation Rules)

For GATE_4 : continue with the example from FIG. 6.

[1] User must follow the order of user passcode ① ♥ 2 ✉ to select the tokens that contain user pins.

[2] The original 16 tokens are shown in the table on the right.

[3] The 4 tokens user selected were : (34 Ⓜ ◇ ♫), (16 Ⓑ ● ☜), (3 Ⓠ ← ®) and (13 & ☺ ✉).

[4] The validation process will check them one by one, if one of them fails, user login request will be denied.

[5] If user selected more or less tokens than the pin count in his passcode, login request will also be denied.

[6] In my sample implementation user passcodes can be up to 6 pins long.

| | 1 | 2 | 3 | 4 |
|---|---|---|---|---|
| A | 13 & ☺ ✉ | 34 Ⓜ ◇ ♫ | 29 ℗ → ☢ | 28 ! ✓ ÷ |
| B | 3 Ⓠ ← ® | 36 Ⓥ ≈ ◐ | 6 : ↓ π | 19 Ⓦ X + |
| C | 20 Ⓩ ☪ ☞ | 26 Ⓙ ℉ € | 17 Ⓢ ♤ ✕ | 12 Ⓒ ♡ ₪ |
| D | 32 Ⓚ ♠ $ | 35 Ⓕ ☆ ❁ | 16 Ⓑ ● ☜ | 10 Ⓤ ℃ ☎ |

[7] Since user's 1st pin is ①, we will go through all the symbols in all the 16 tokens and see if the symbol ① exists. Since it didn't exist, user can and must pick a wild-card token in its place, and in our example, user's 1st selected token (34 Ⓜ ◇ ♫) is valid.

[8] User's 2nd pin ♥ is also missing in all the 16 tokens, so the 2nd token that user picked : (16 Ⓑ ● ☜) is also valid, same with the 3rd token (3 Ⓠ ← ®) user picked.

[9] User's 4th pin was the symbol ✉, and when we go through all the symbols in the above 16 tokens, we can see it's in the A1 token, so in order to be valid, user must and can only pick A1, and in our example, he did pick (13 & ☺ ✉) as his 4th and last token, no more and no less than the pin count (4) in his original passcode, therefore, user login request is granted.

For GATE_5 : The process is the same, just add one more dimension.

Fig. 8A GATE_4_Create_Id
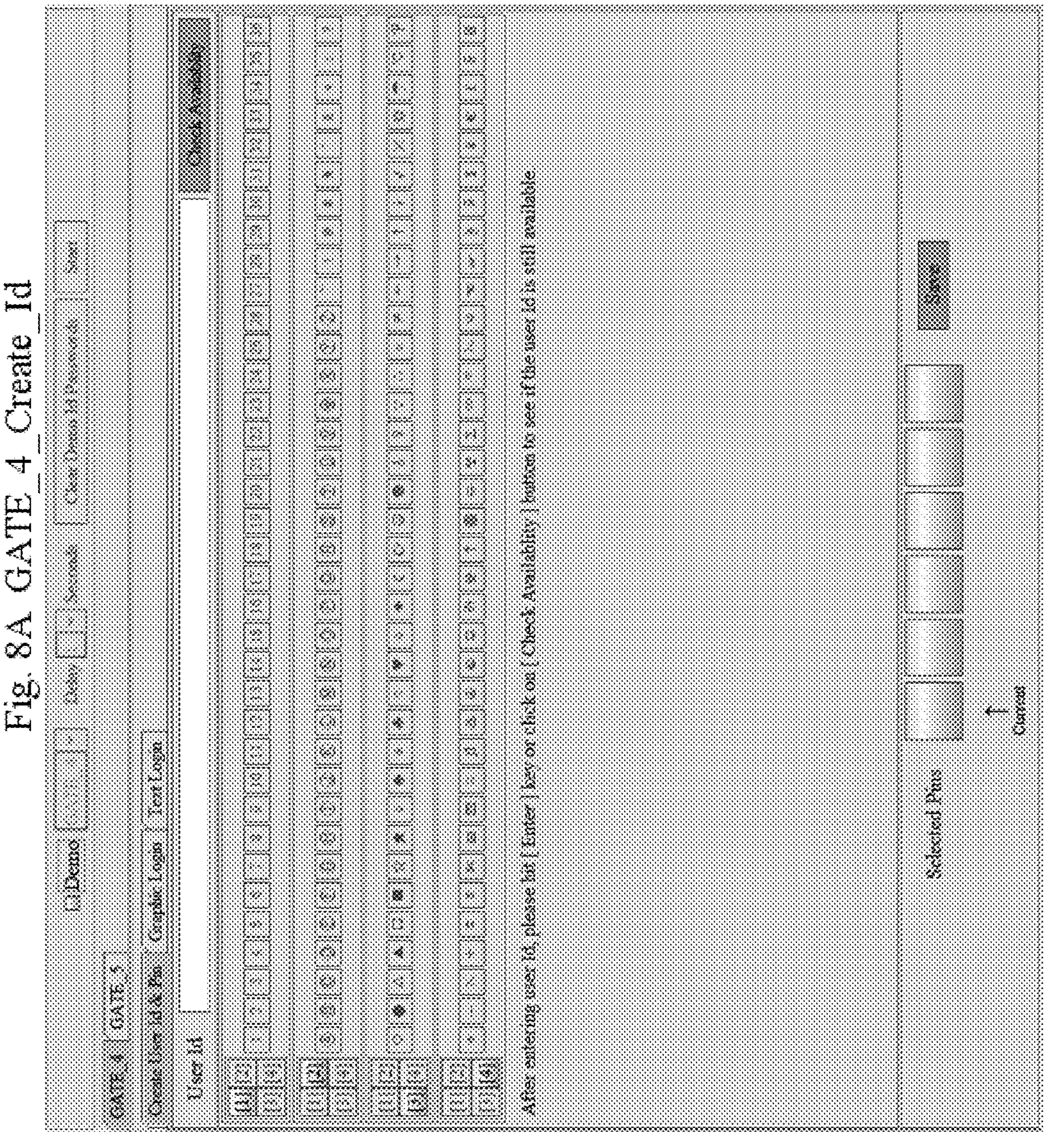

Fig. 8B GATE_4_Create_Id
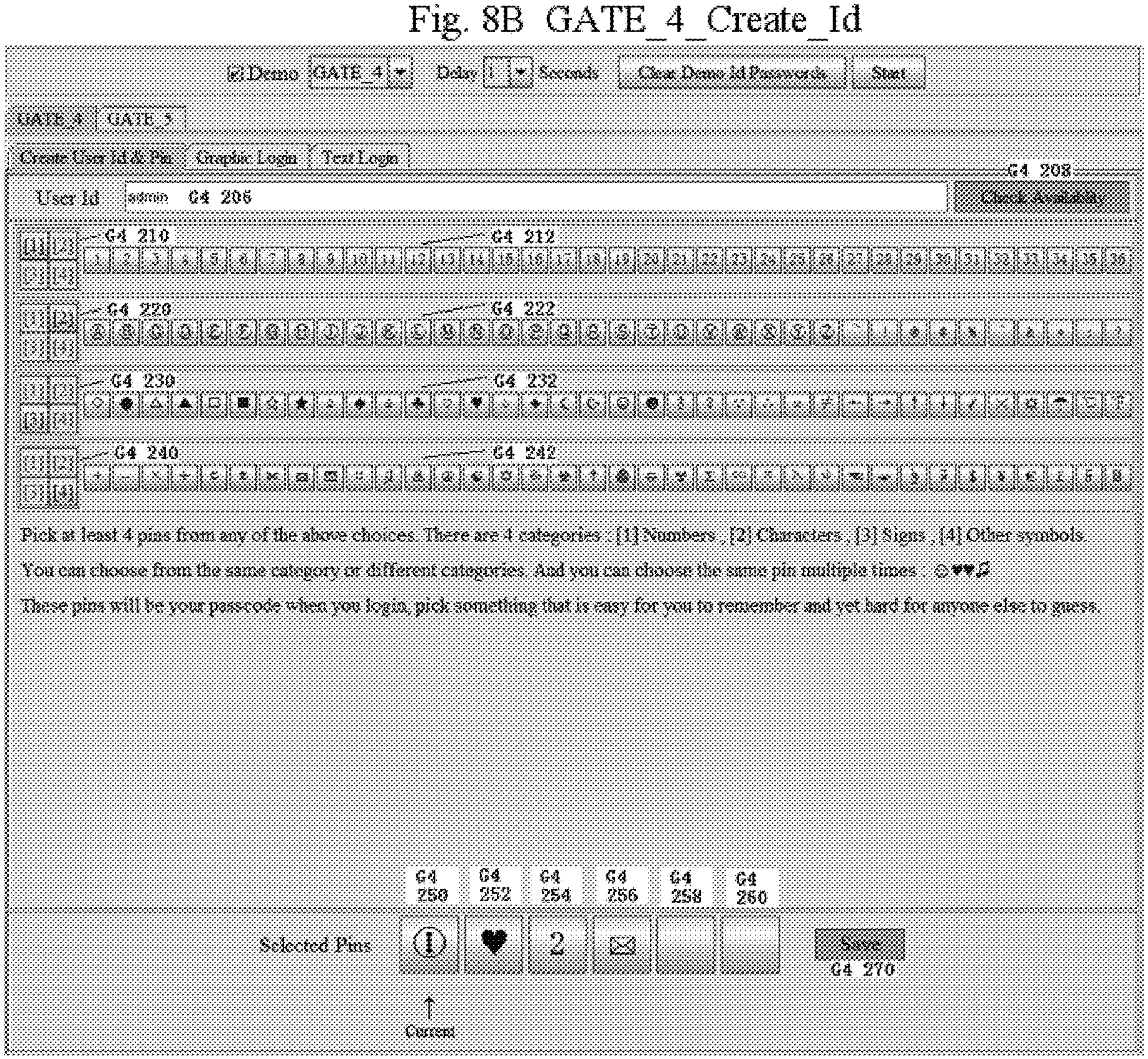

Fig. 9A GATE_4_Graphic_Login
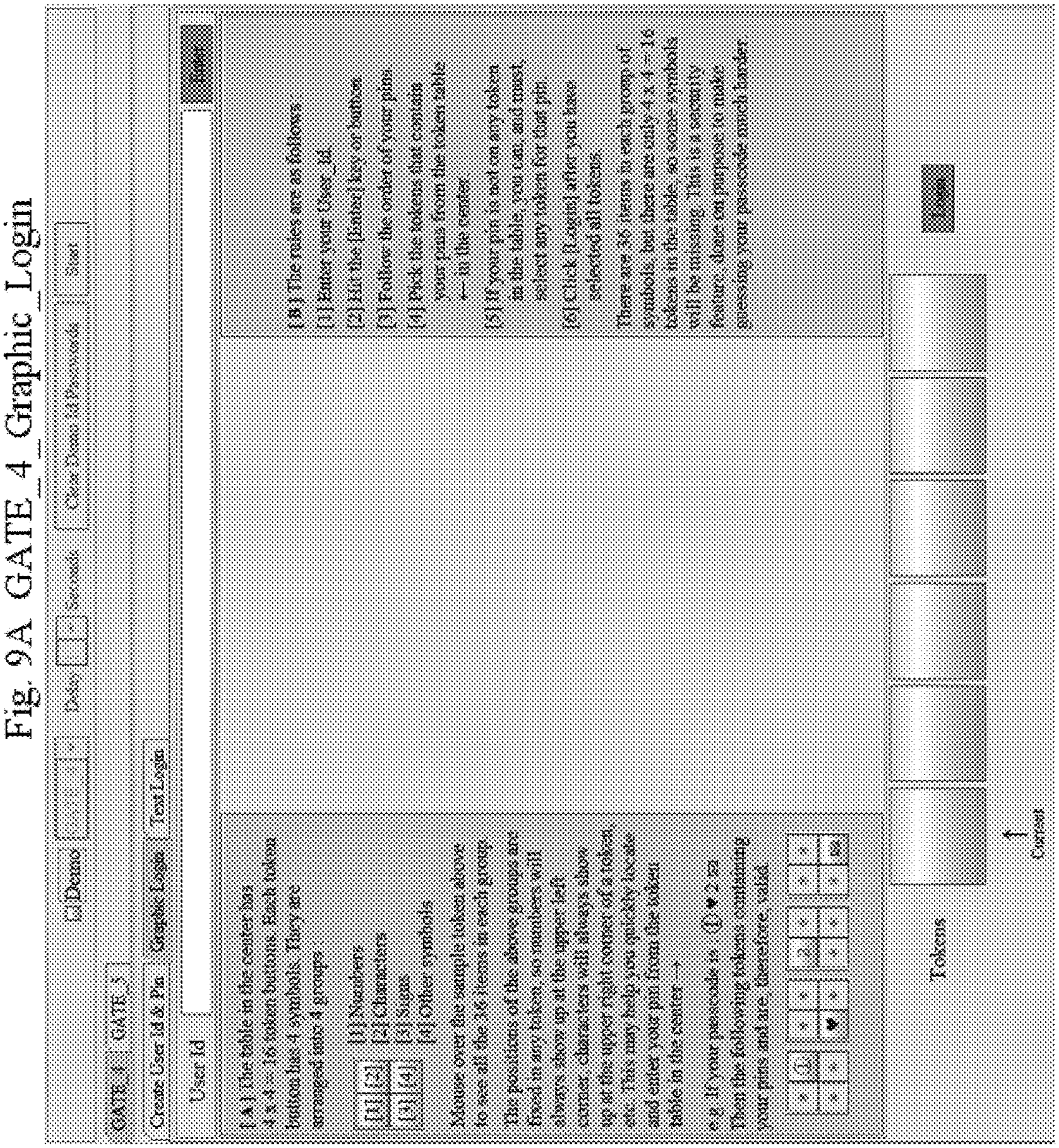

Fig. 9B GATE_4_Graphic_Login
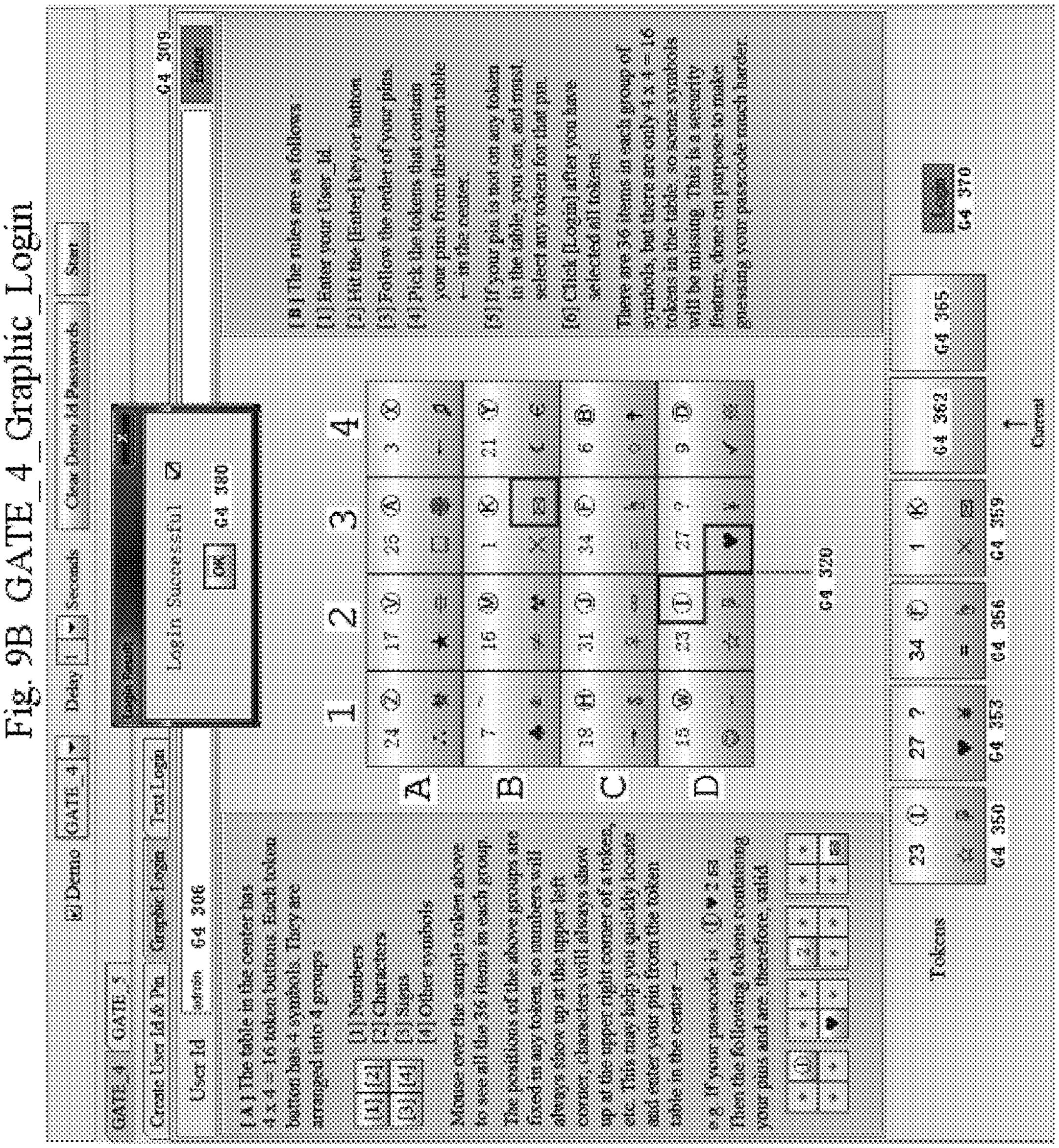

Fig. 9C GATE_4_Graphic_Login
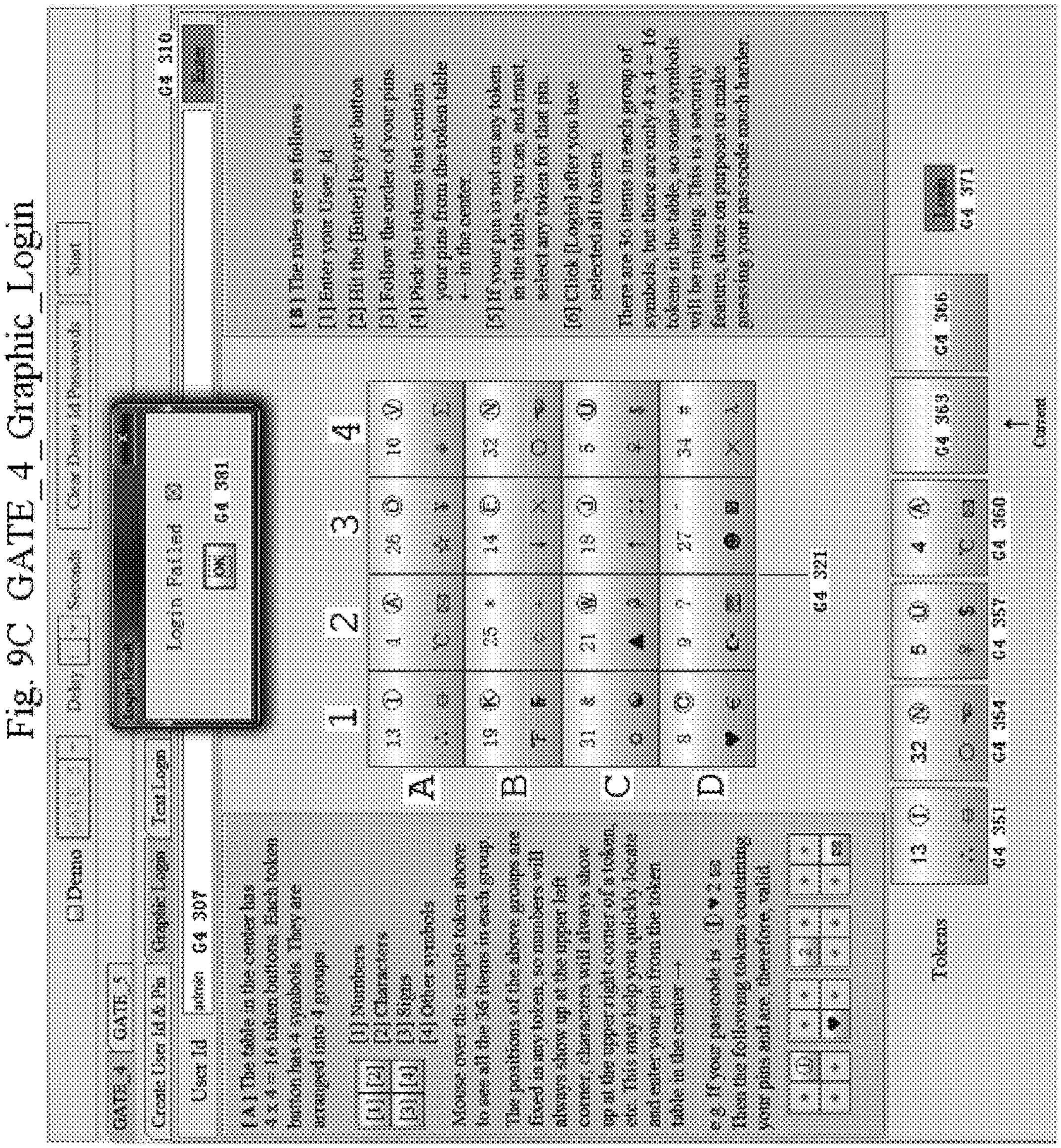

Fig. 9D GATE_4_Graphic_Login
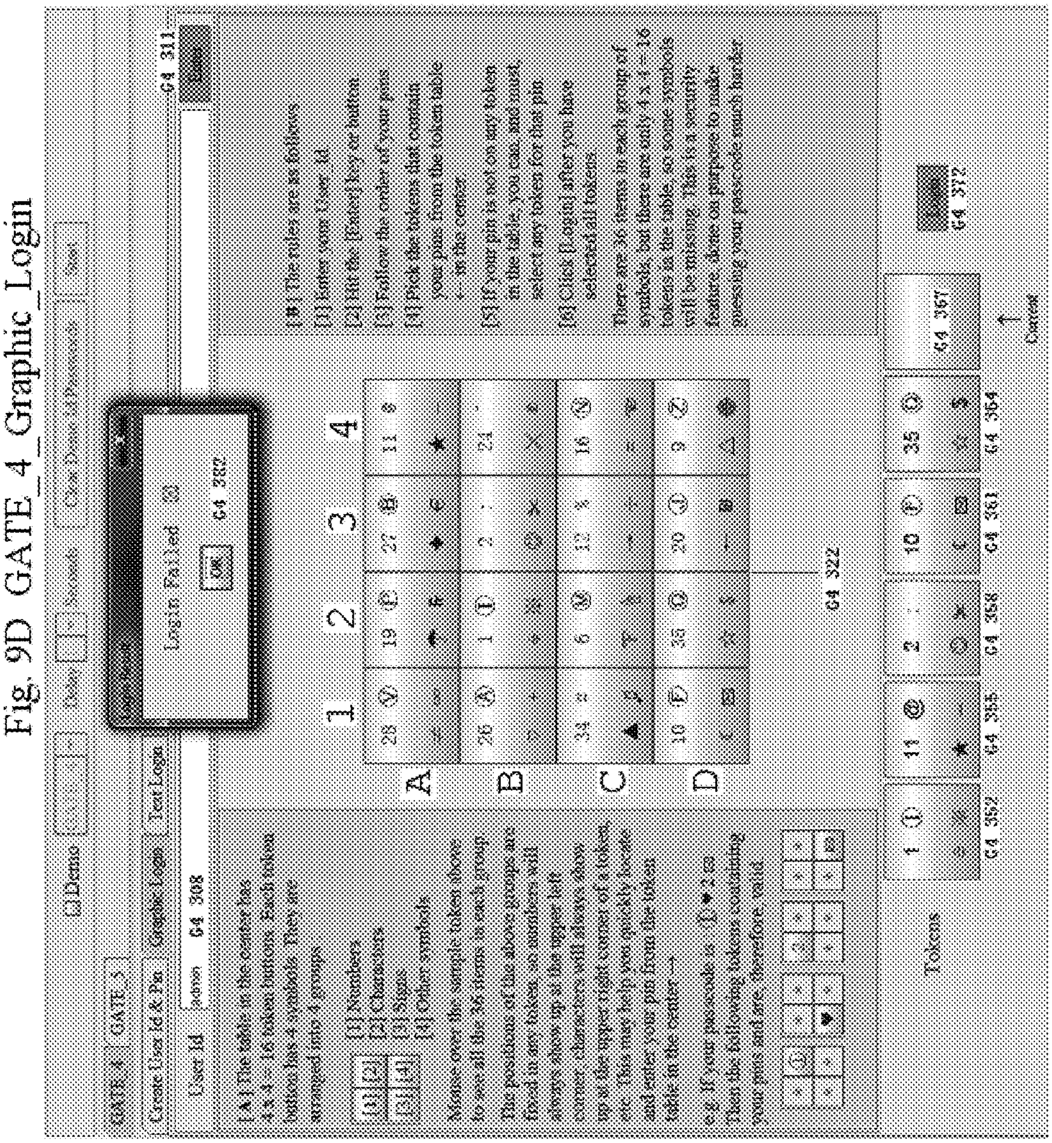

Fig. 10A GATE_4_Text_Login
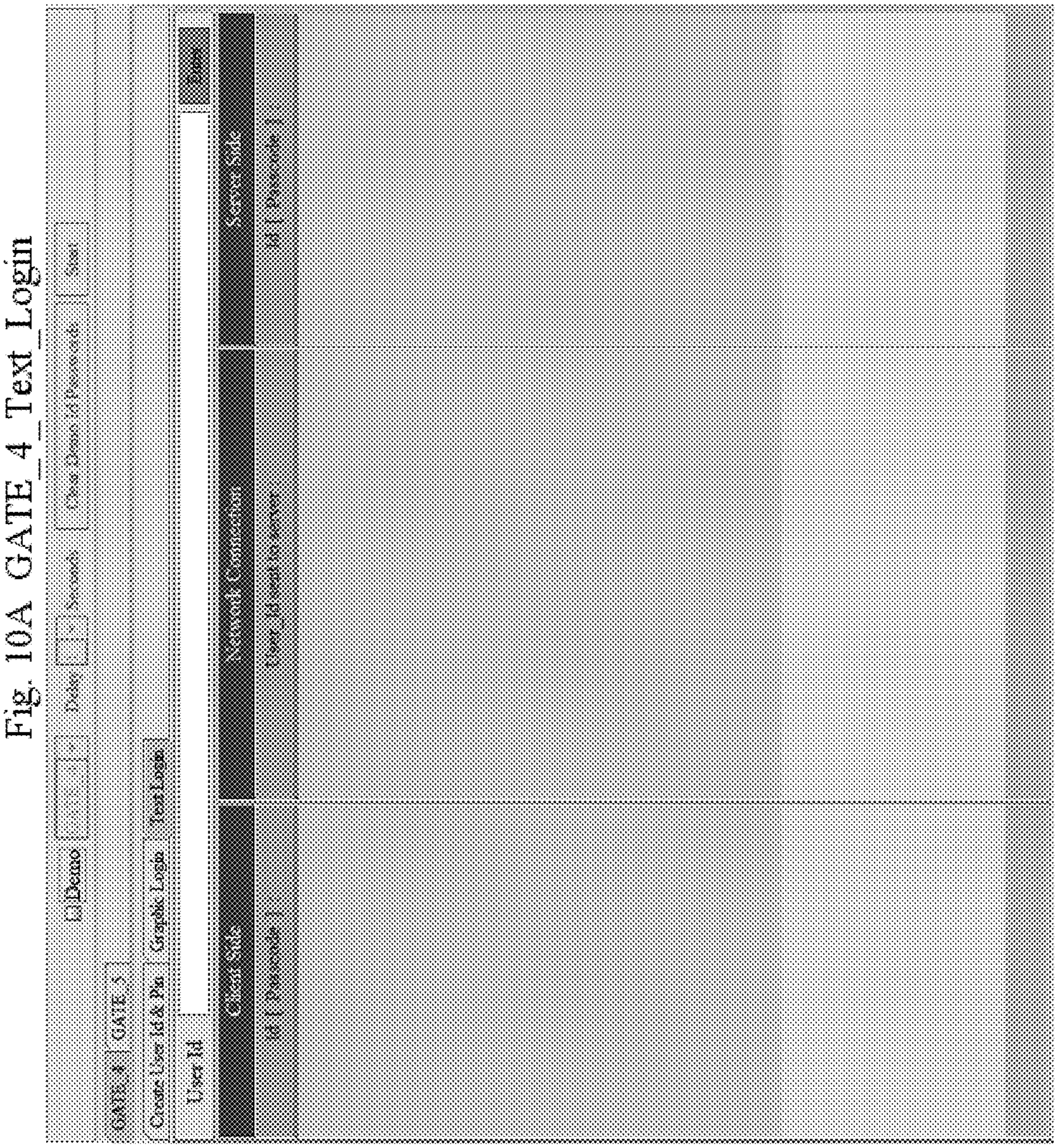

Fig. 10B GATE_4_Text_Login
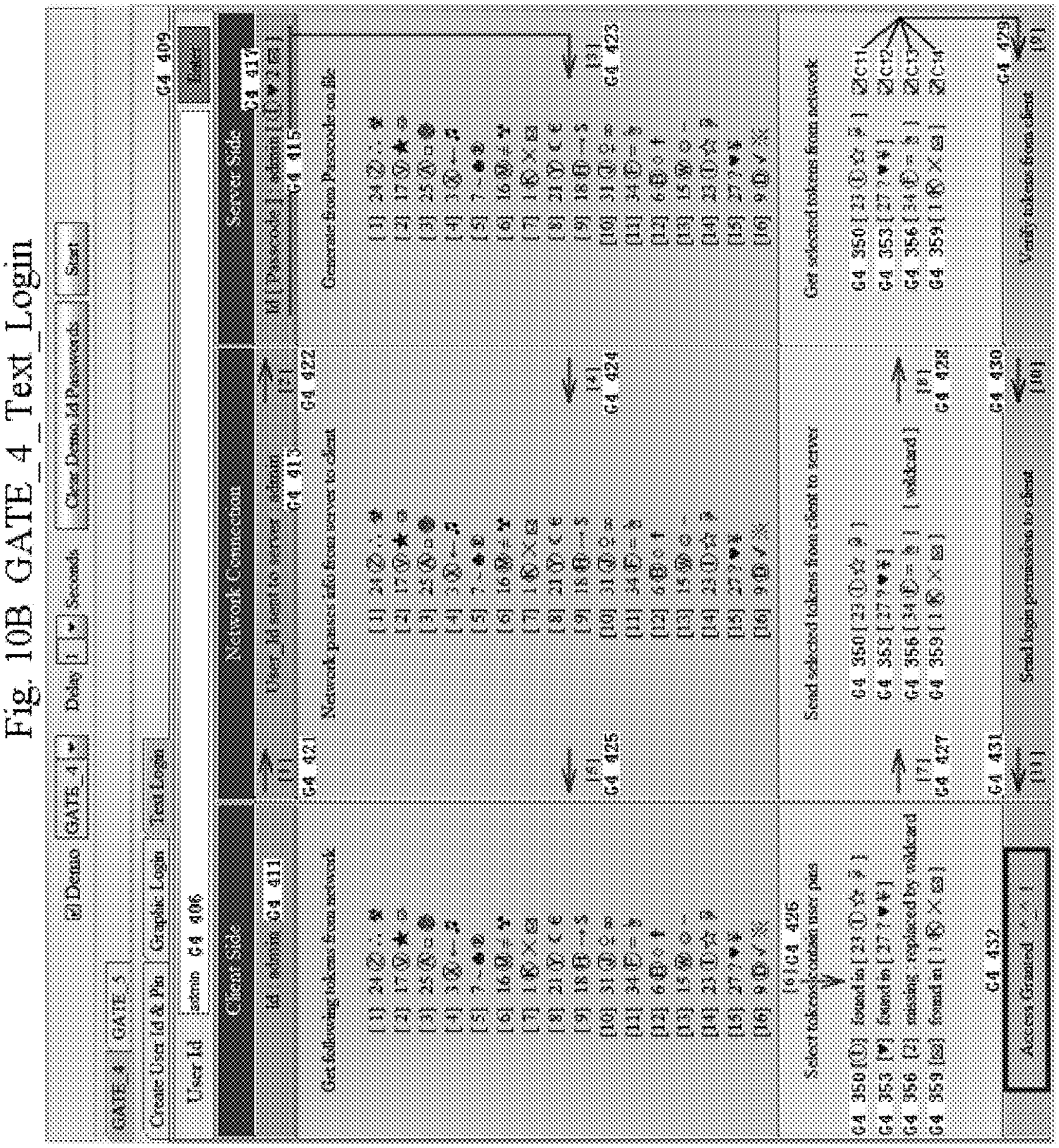

Fig. 10C GATE_4_Text_Login
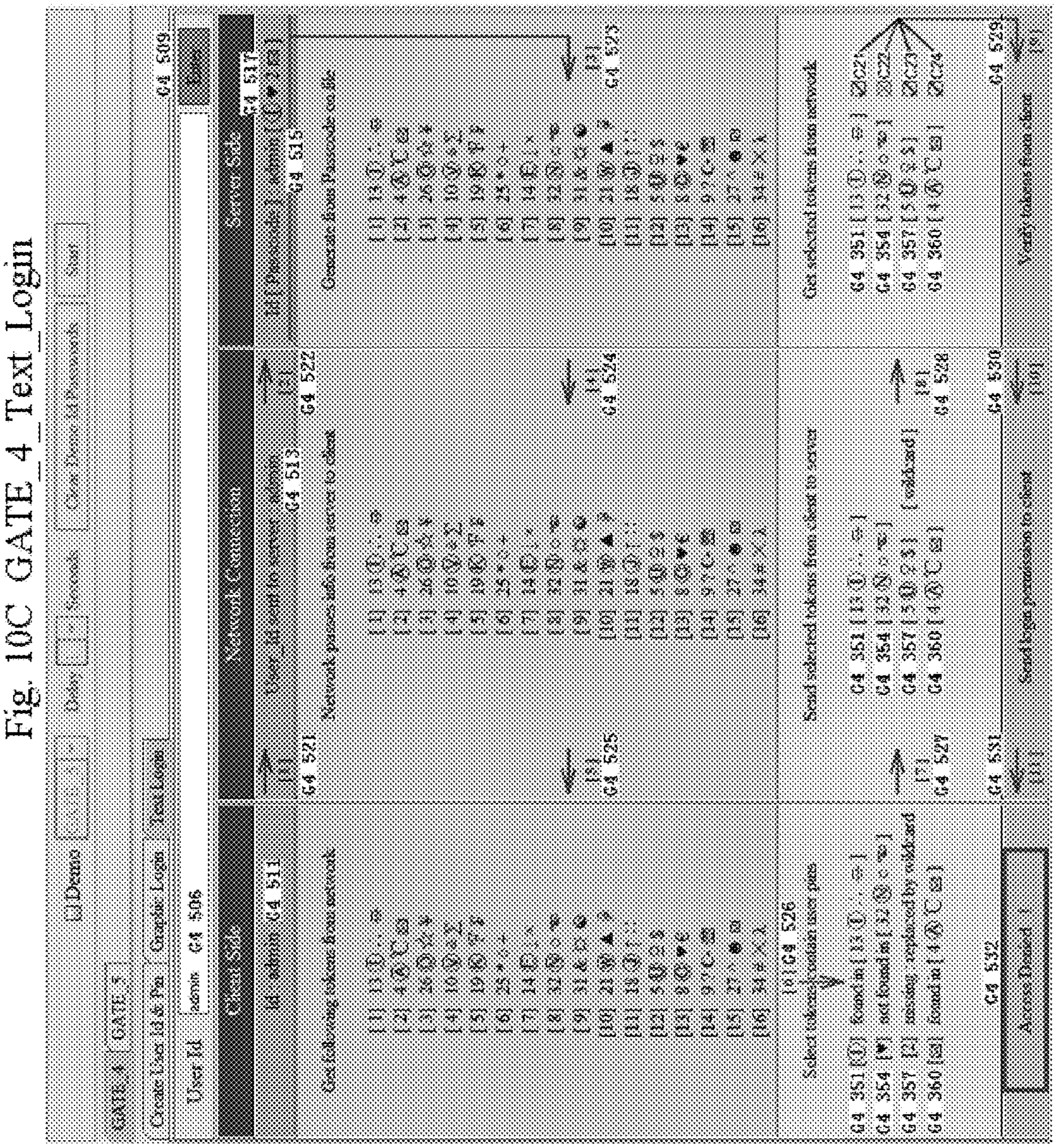

Fig. 10D GATE_4_Text_Login
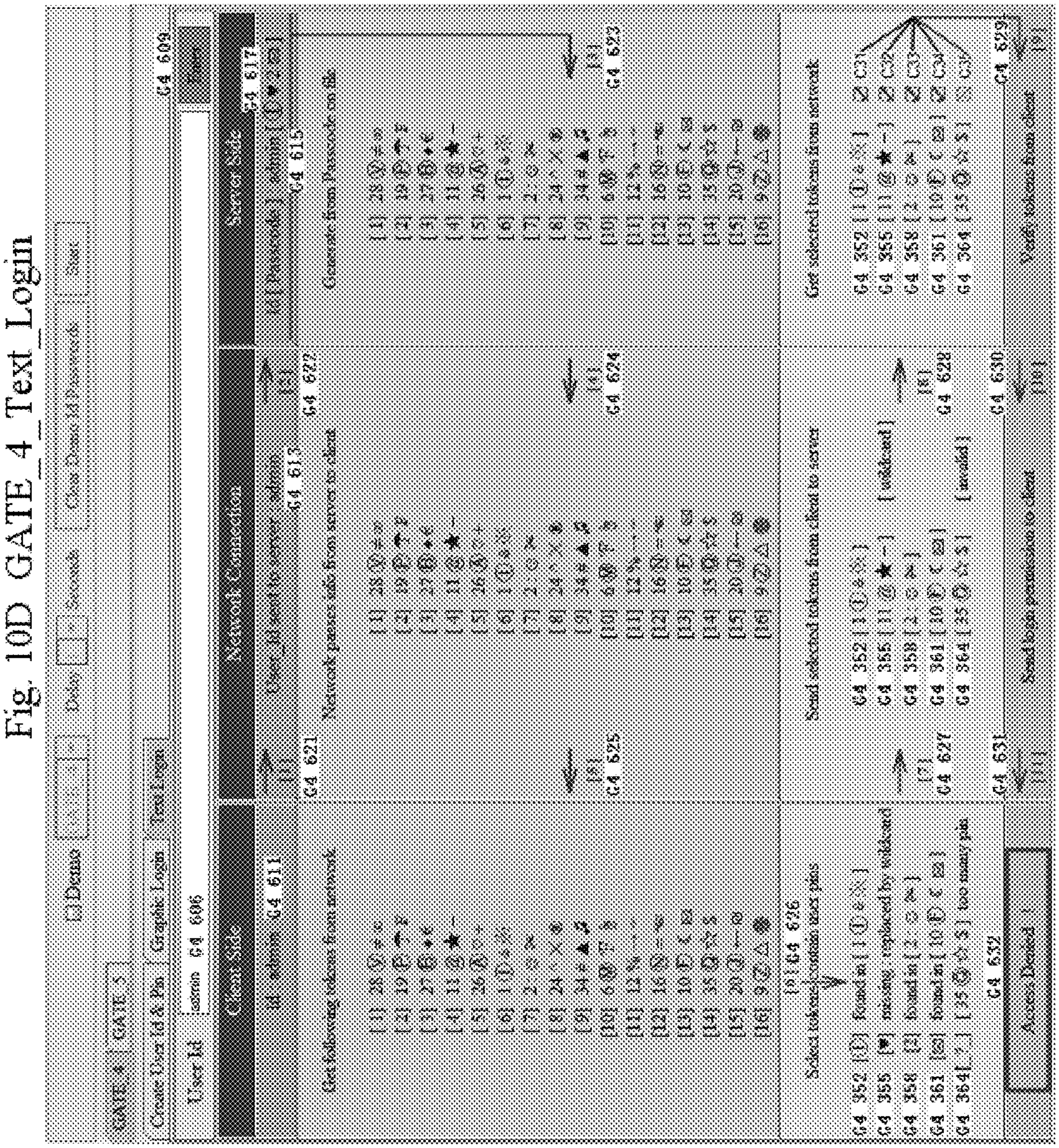

Fig. 11A GATE_5_Create_Id
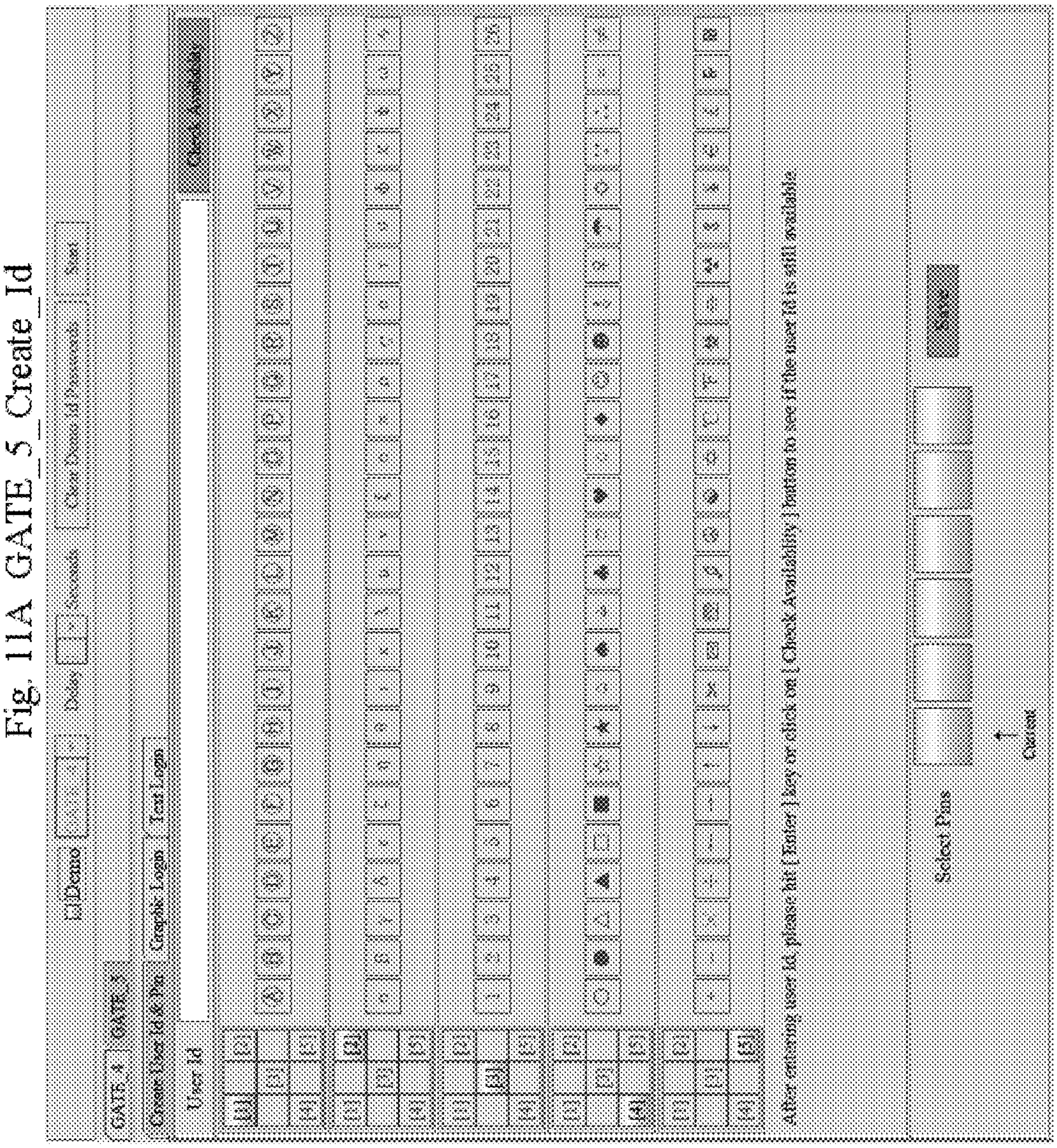

Fig. 11B GATE_5_Create_Id
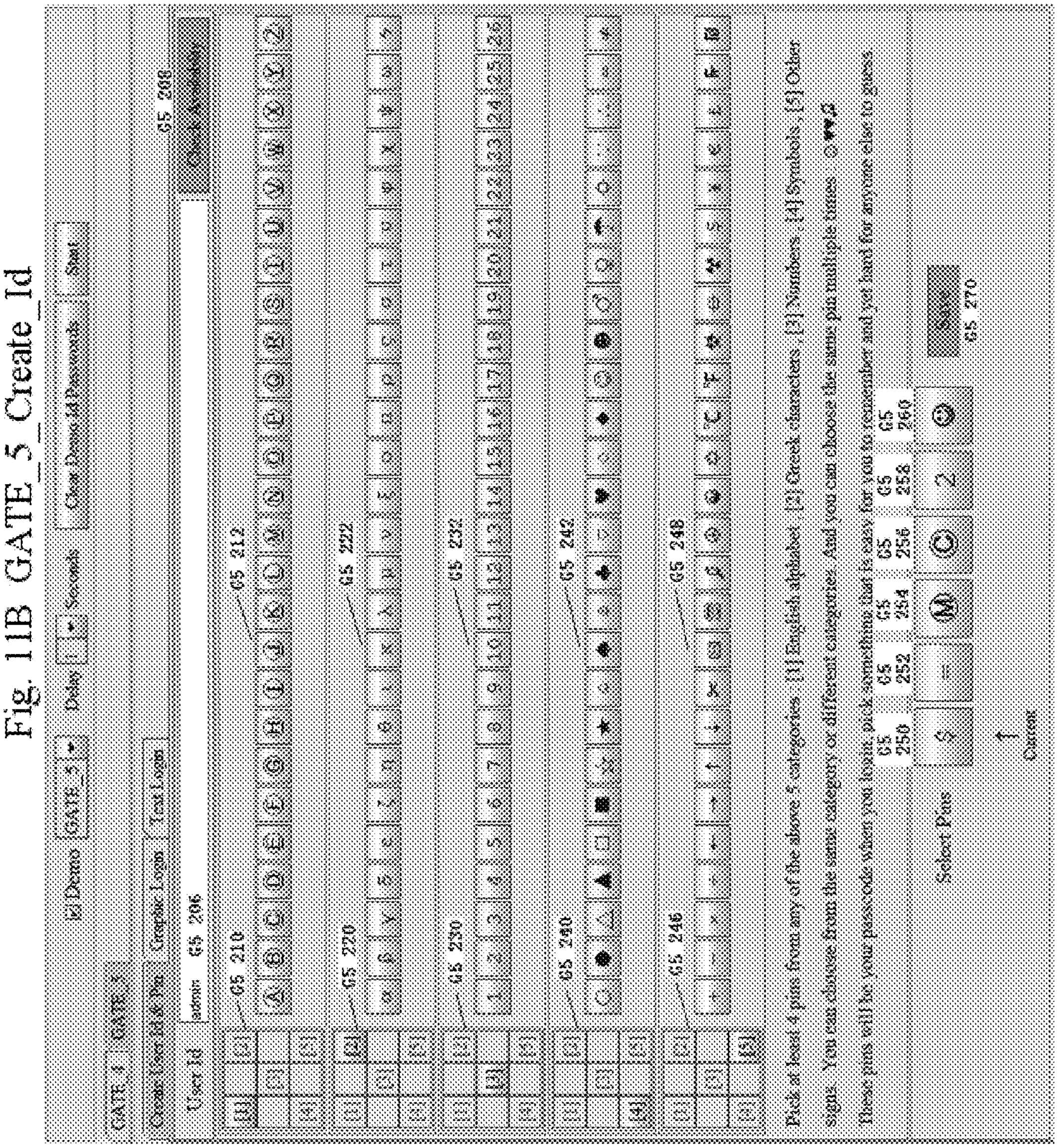

Fig. 12A GATE_5_Graphic_Login
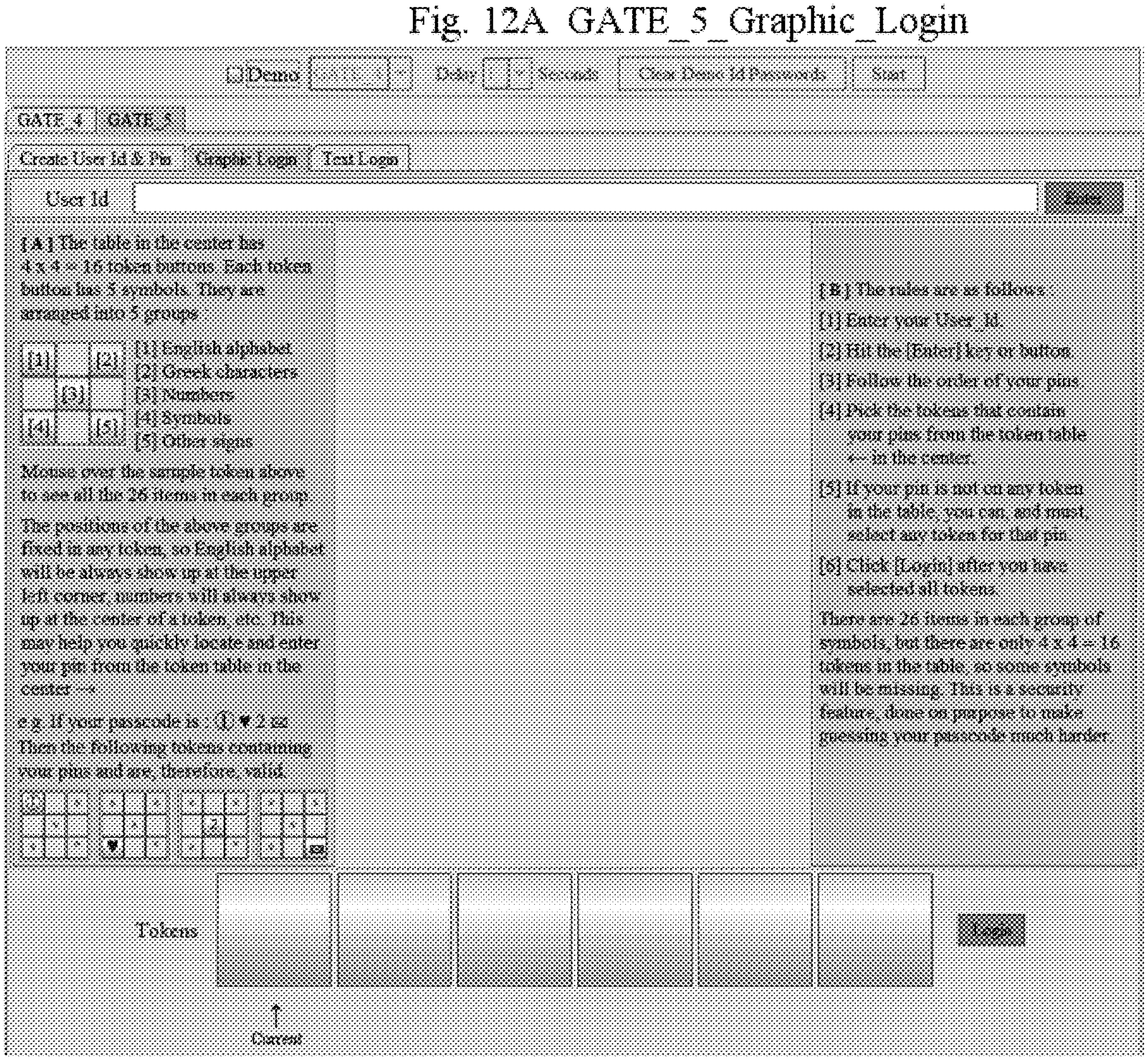

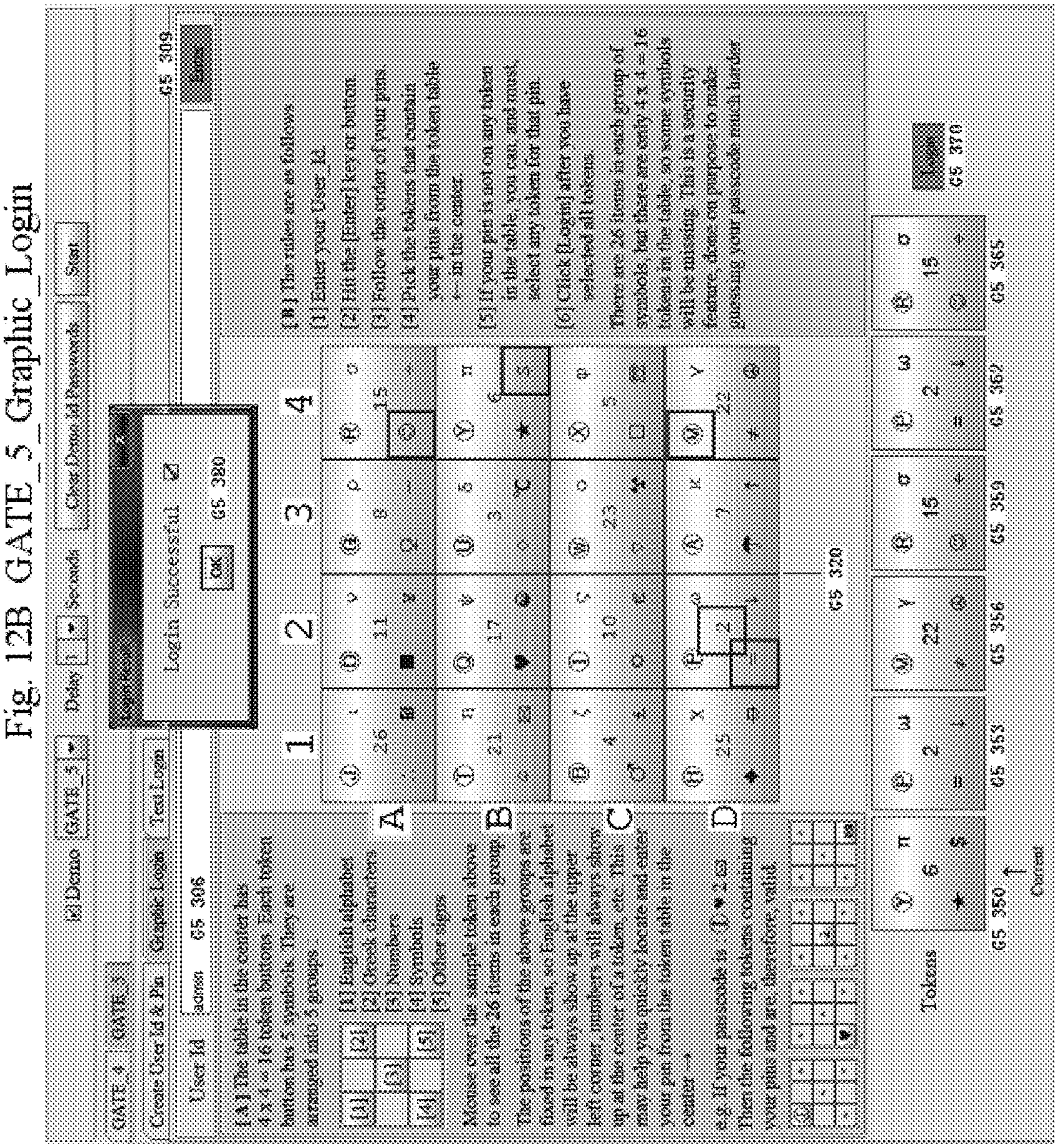
Fig. 12B GATE_5_Graphic_Login

Fig. 12C GATE_5 Graphic_Login
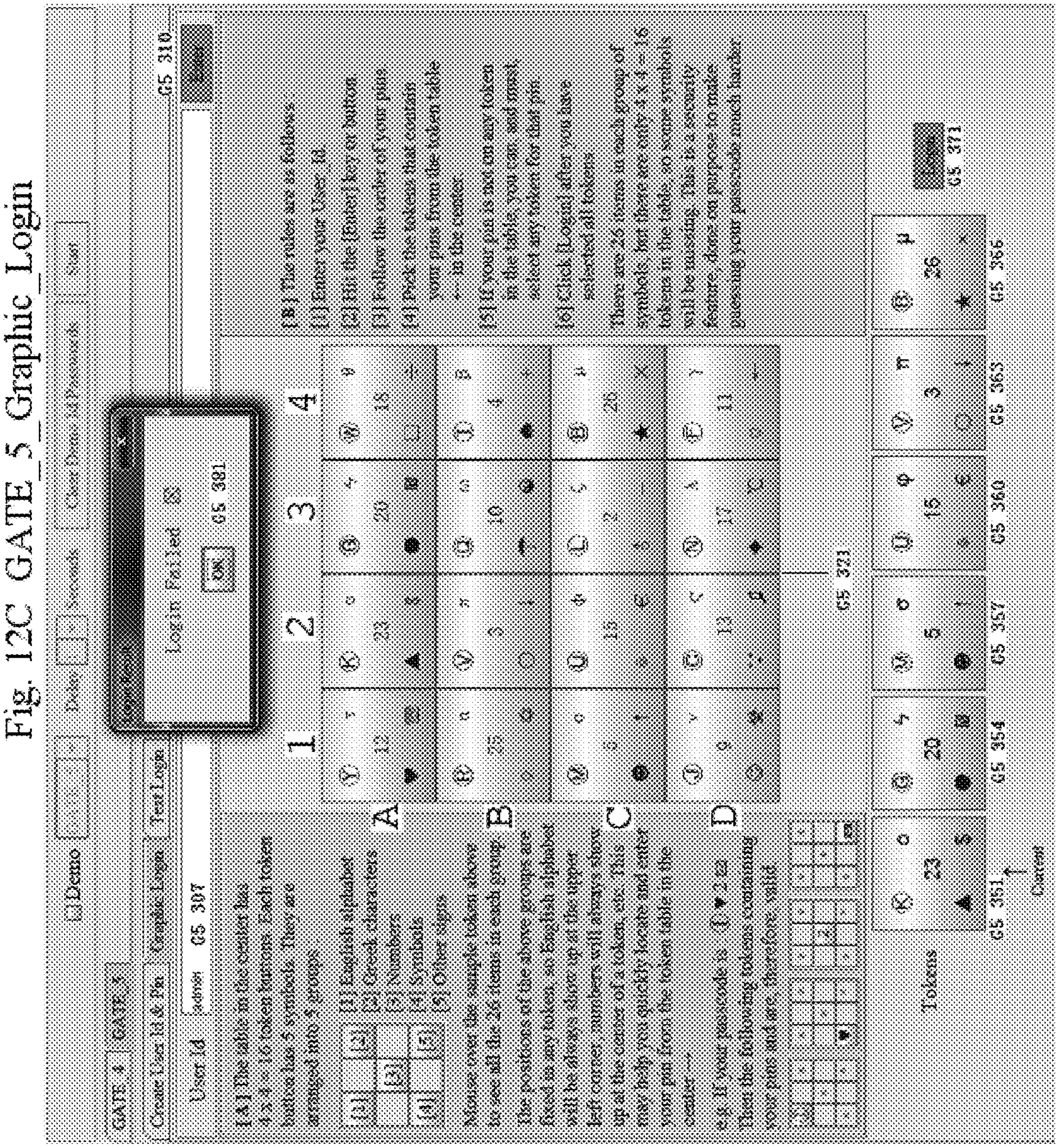

Fig. 12D GATE_5_Graphic_Login
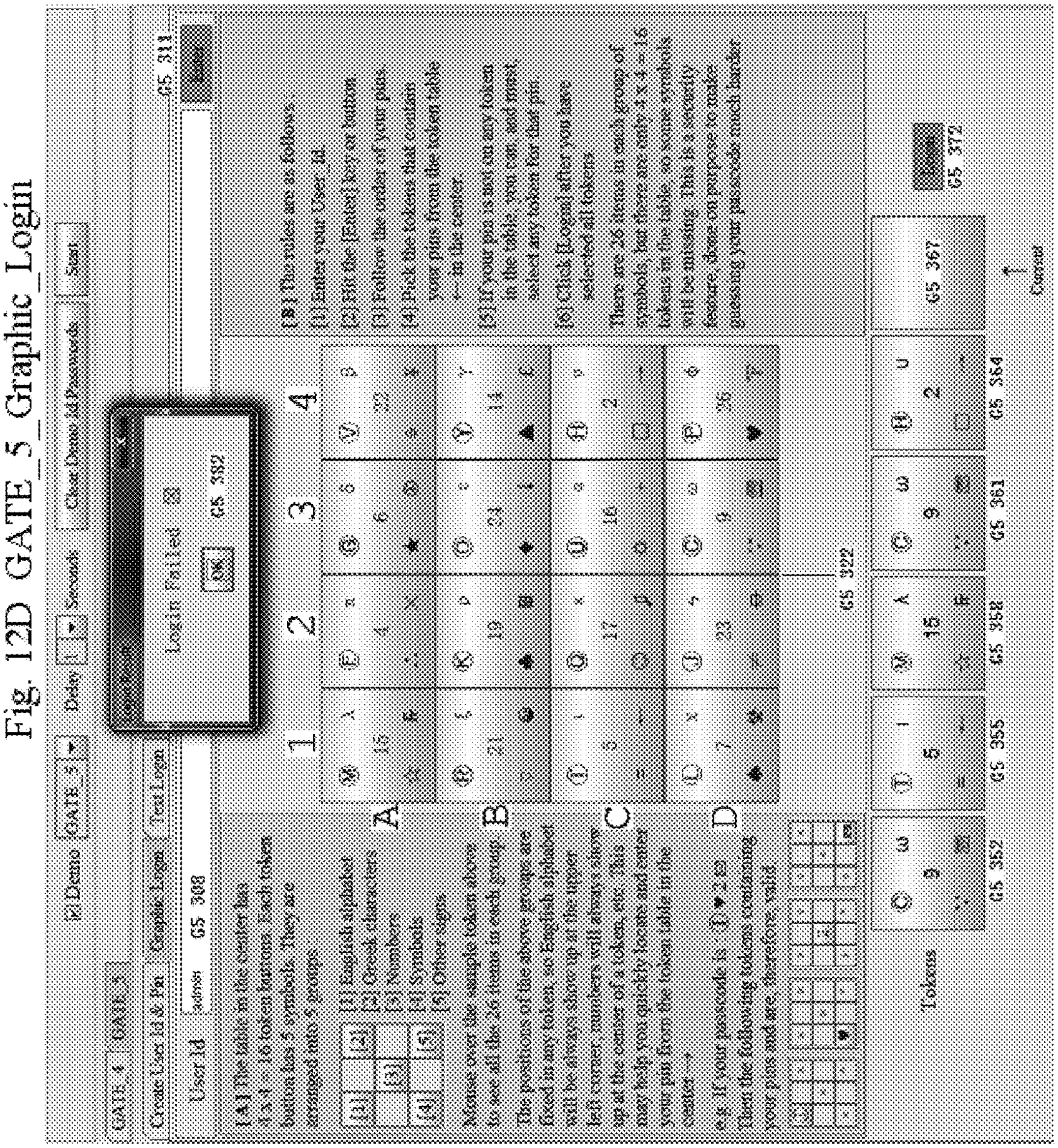

Fig. 13A GATE_5_Text_Login
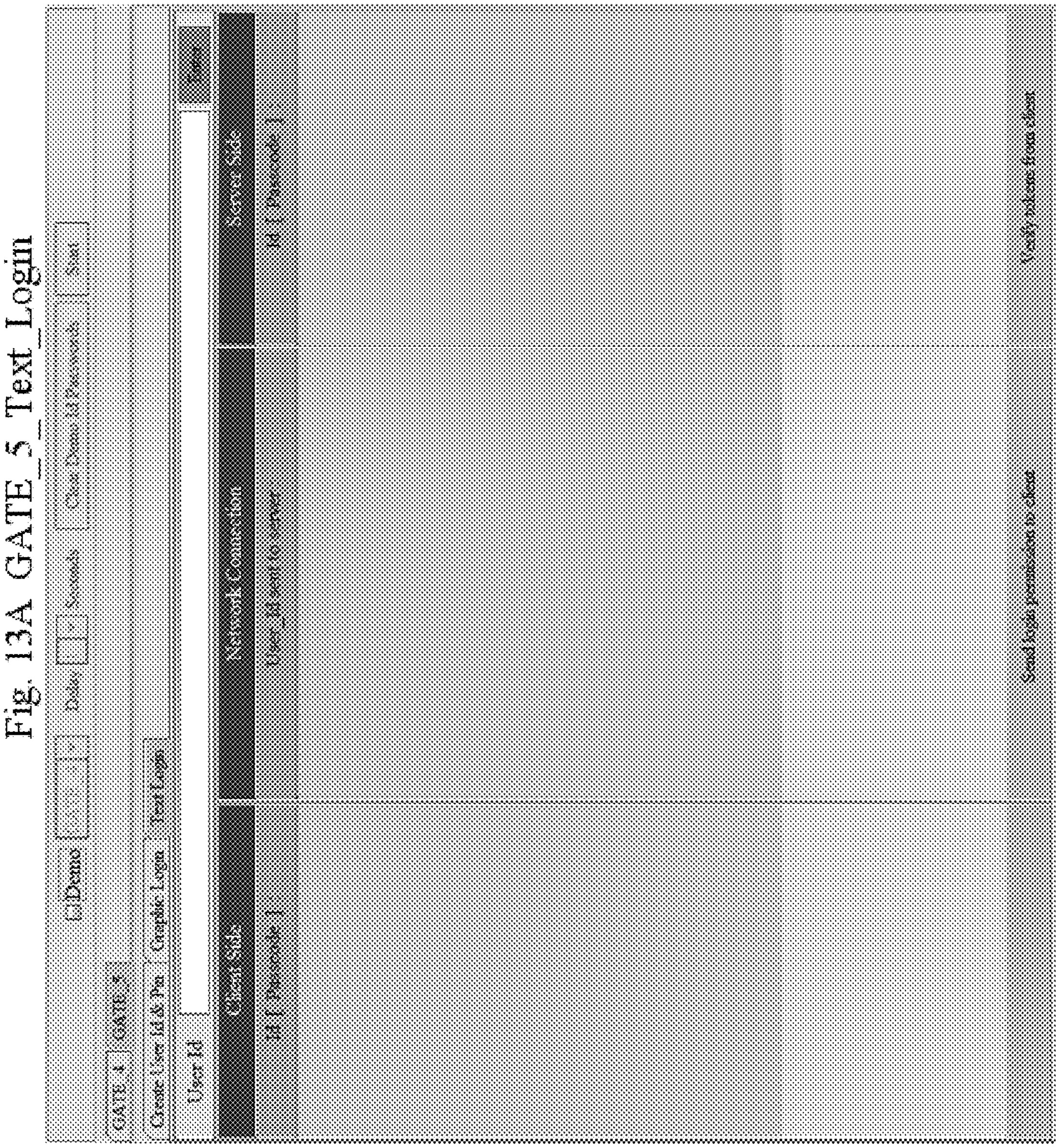

Fig. 13B GATE_5_Text_Login
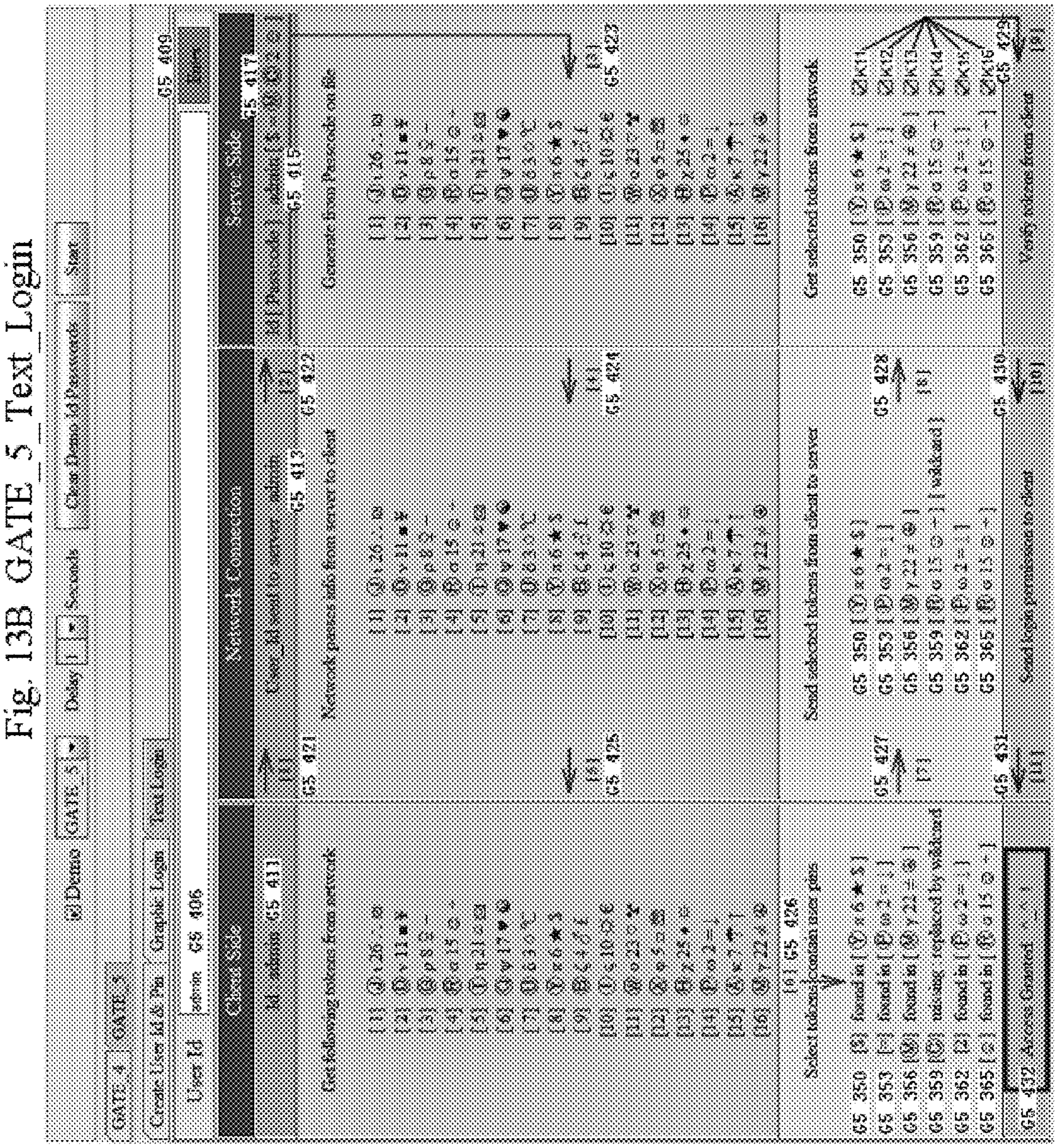

Fig. 13C GATE_5_Text_Login
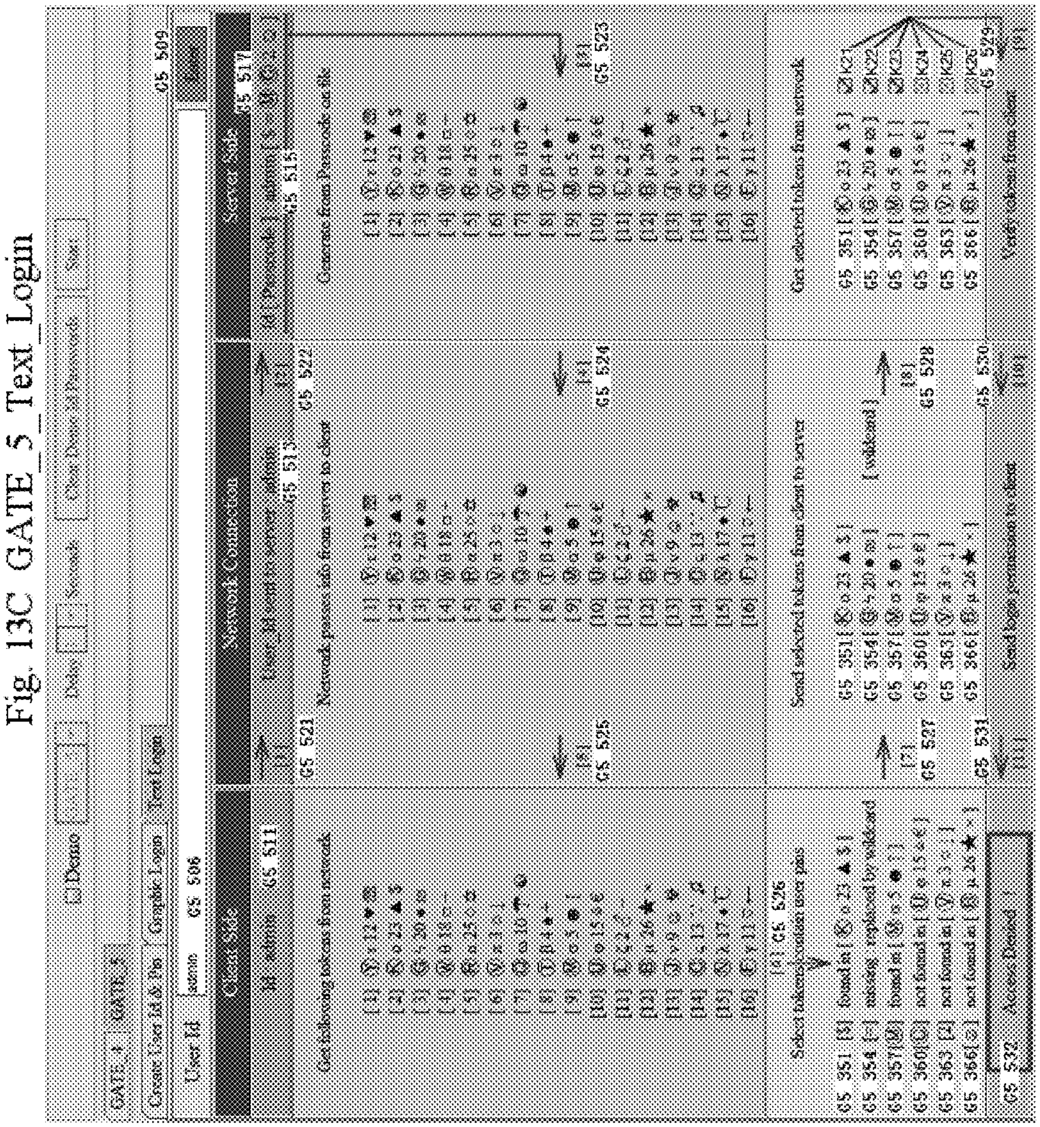

Fig. 13D GATE_5_Text_Login
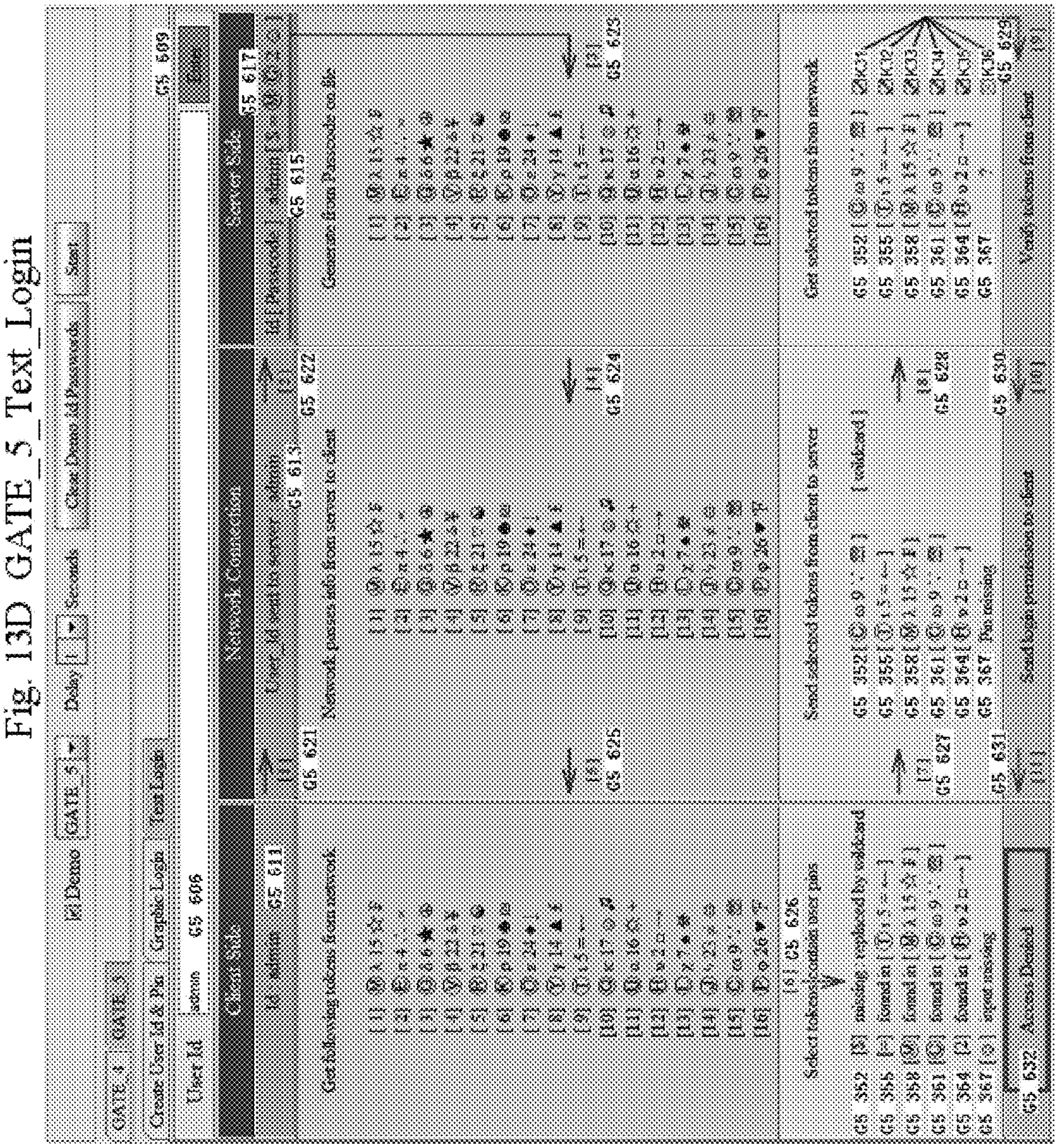

Fig. 14 GATE_4_Encryption
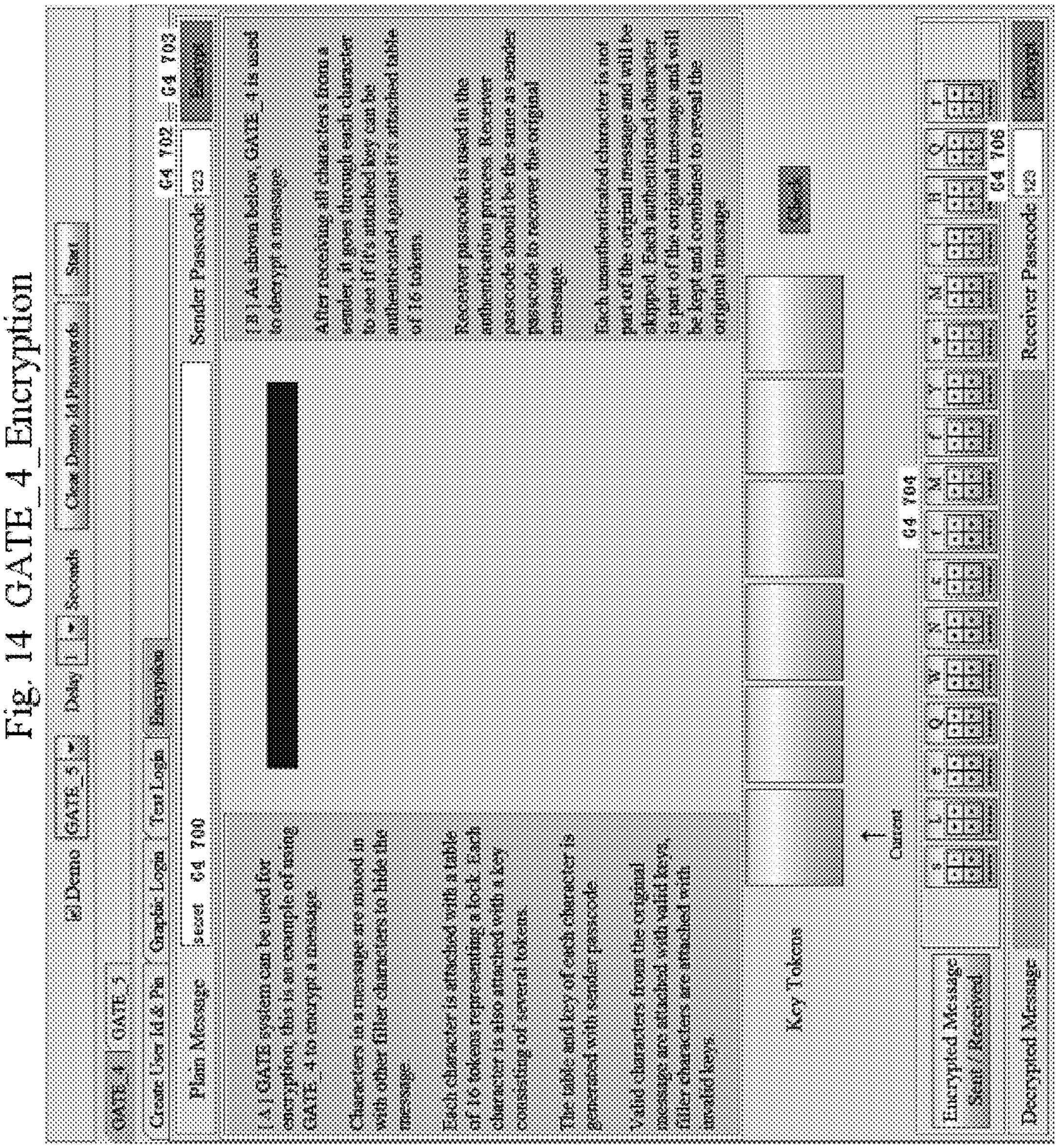

Fig. 15A GATE_4_Encryption
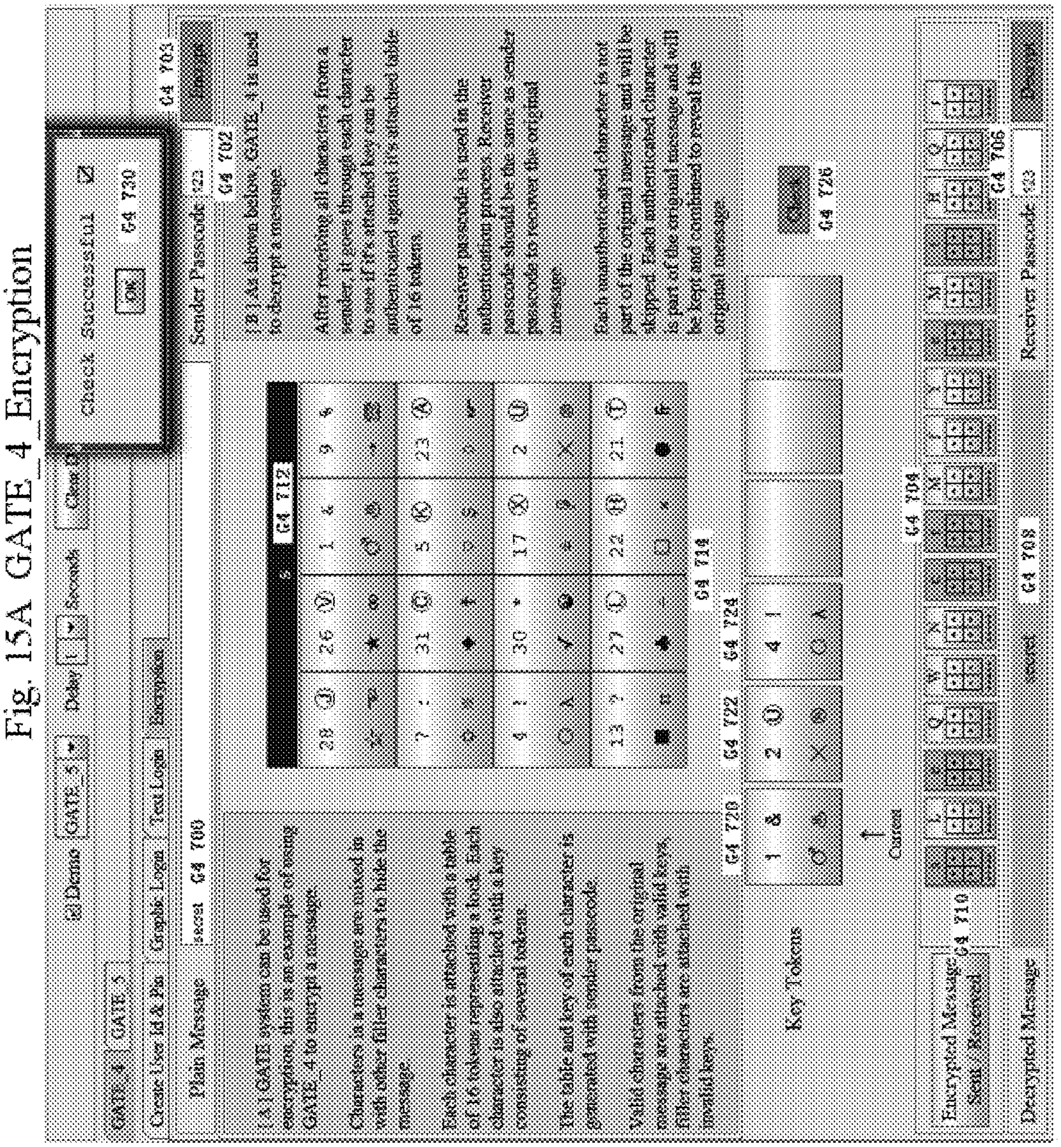

Fig. 15B GATE_4_Encryption
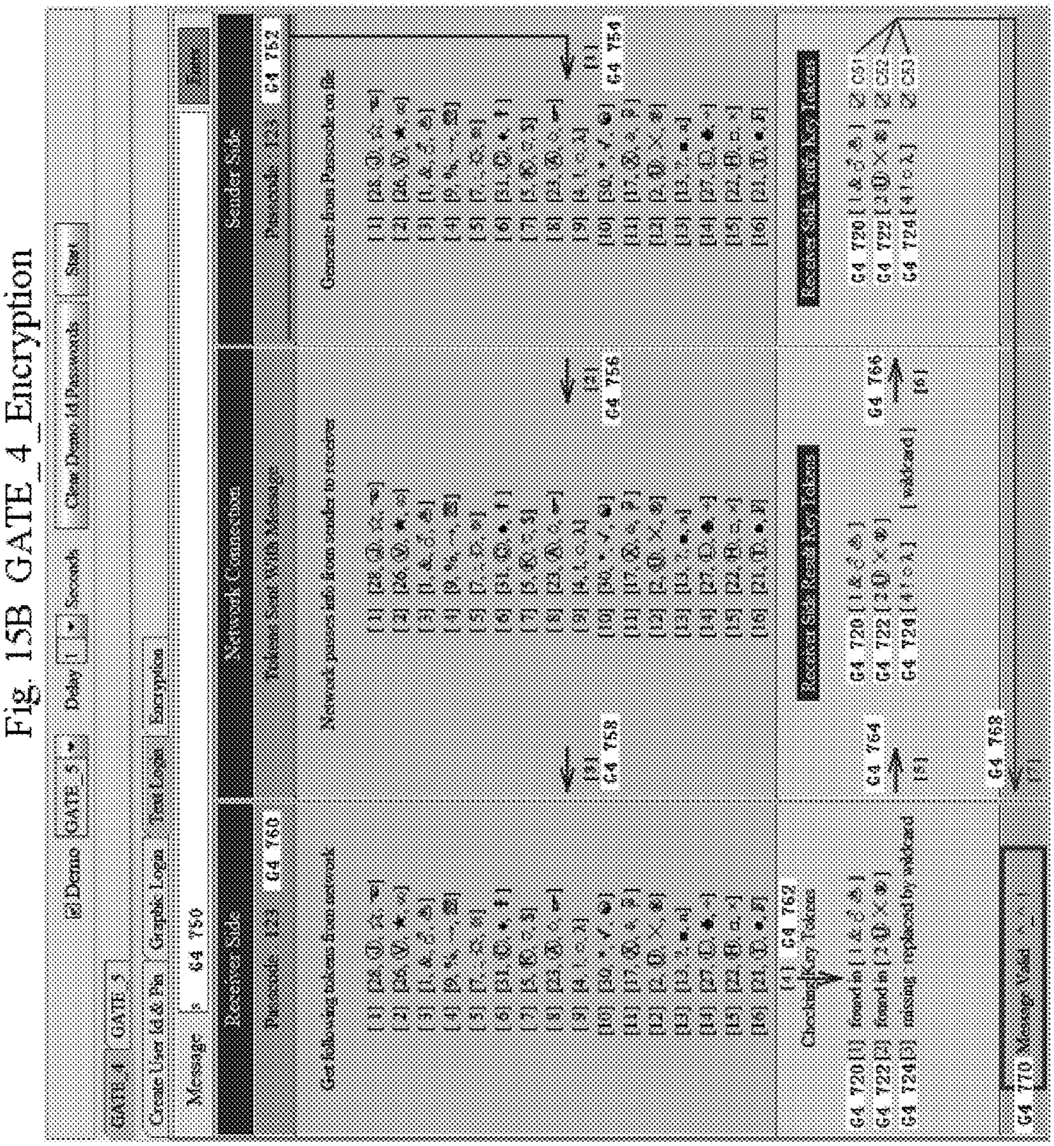

Fig. 16A GATE_4_Encryption
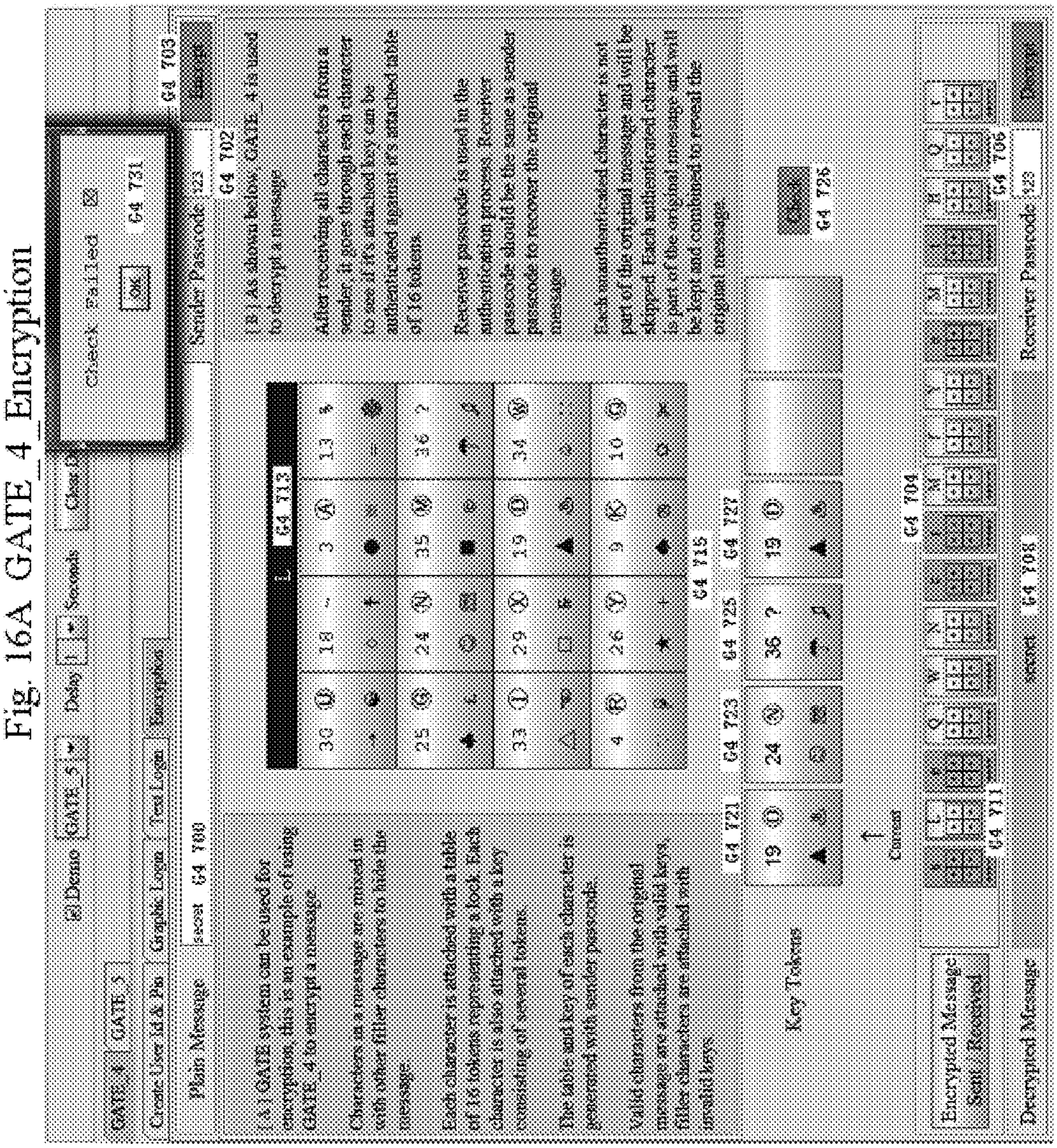

Fig. 16B GATE_4_Encryption
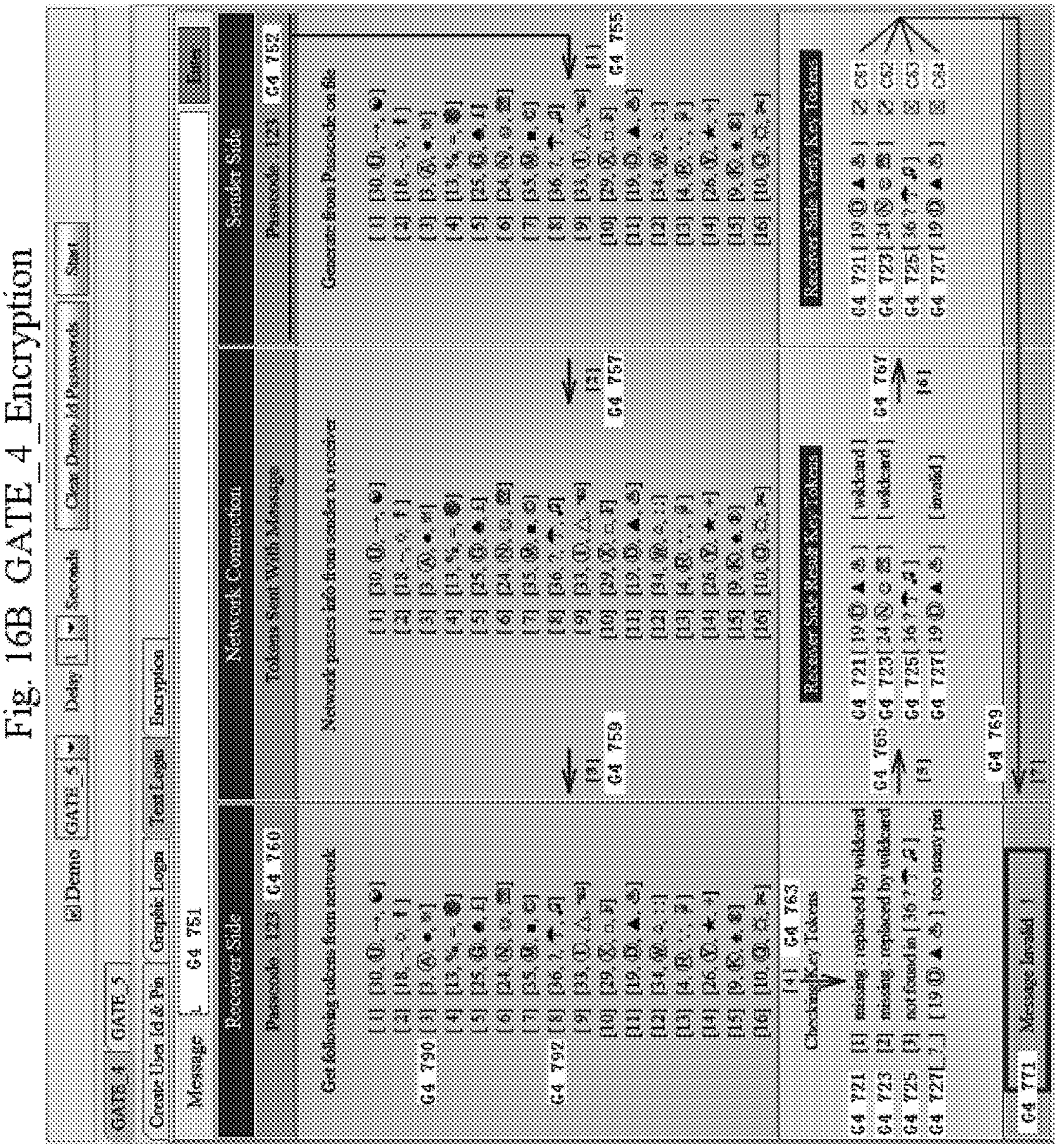

Fig. 17 GATE_4_Encryption
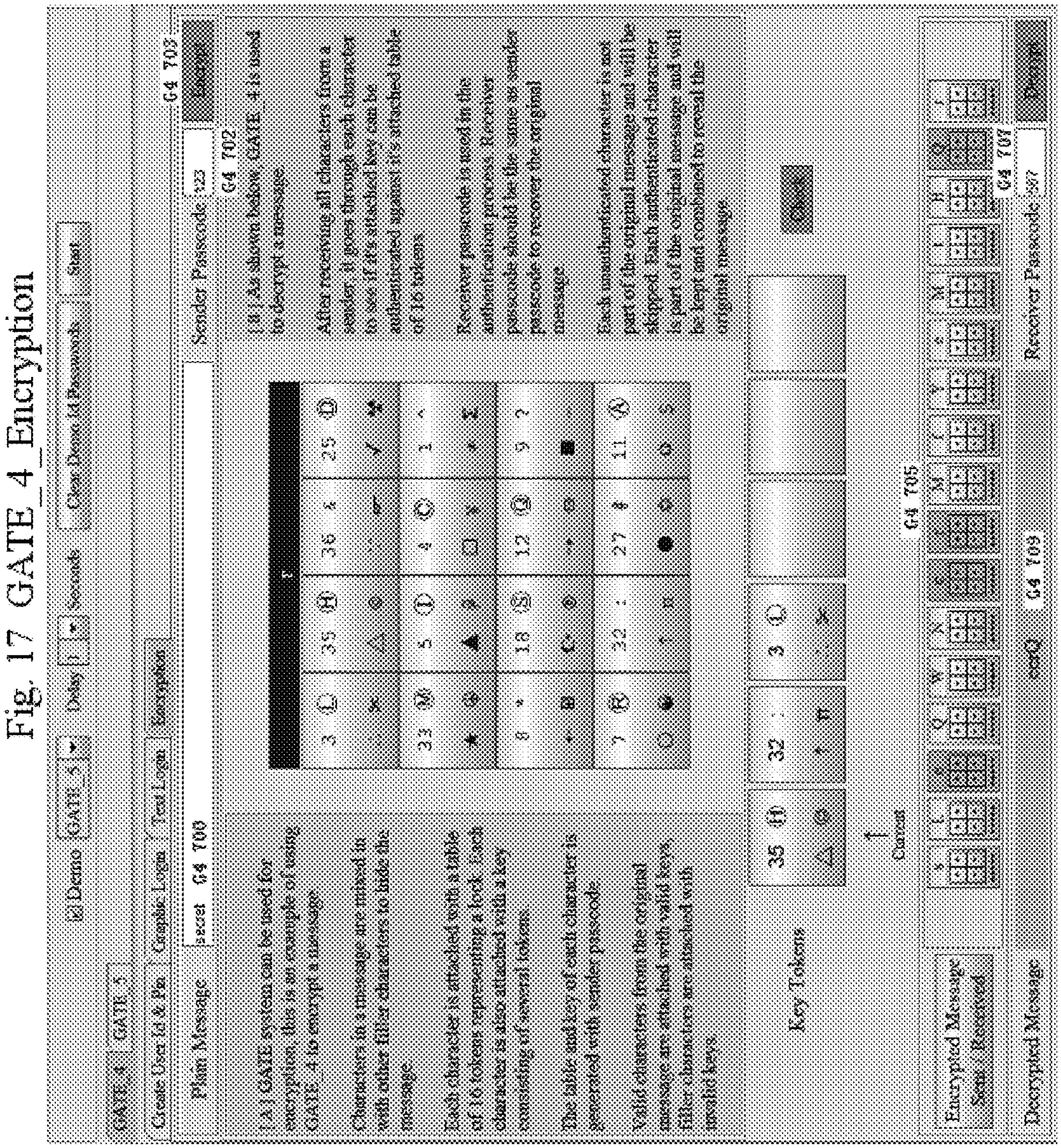

Fig. 18 GATE_5 Encryption
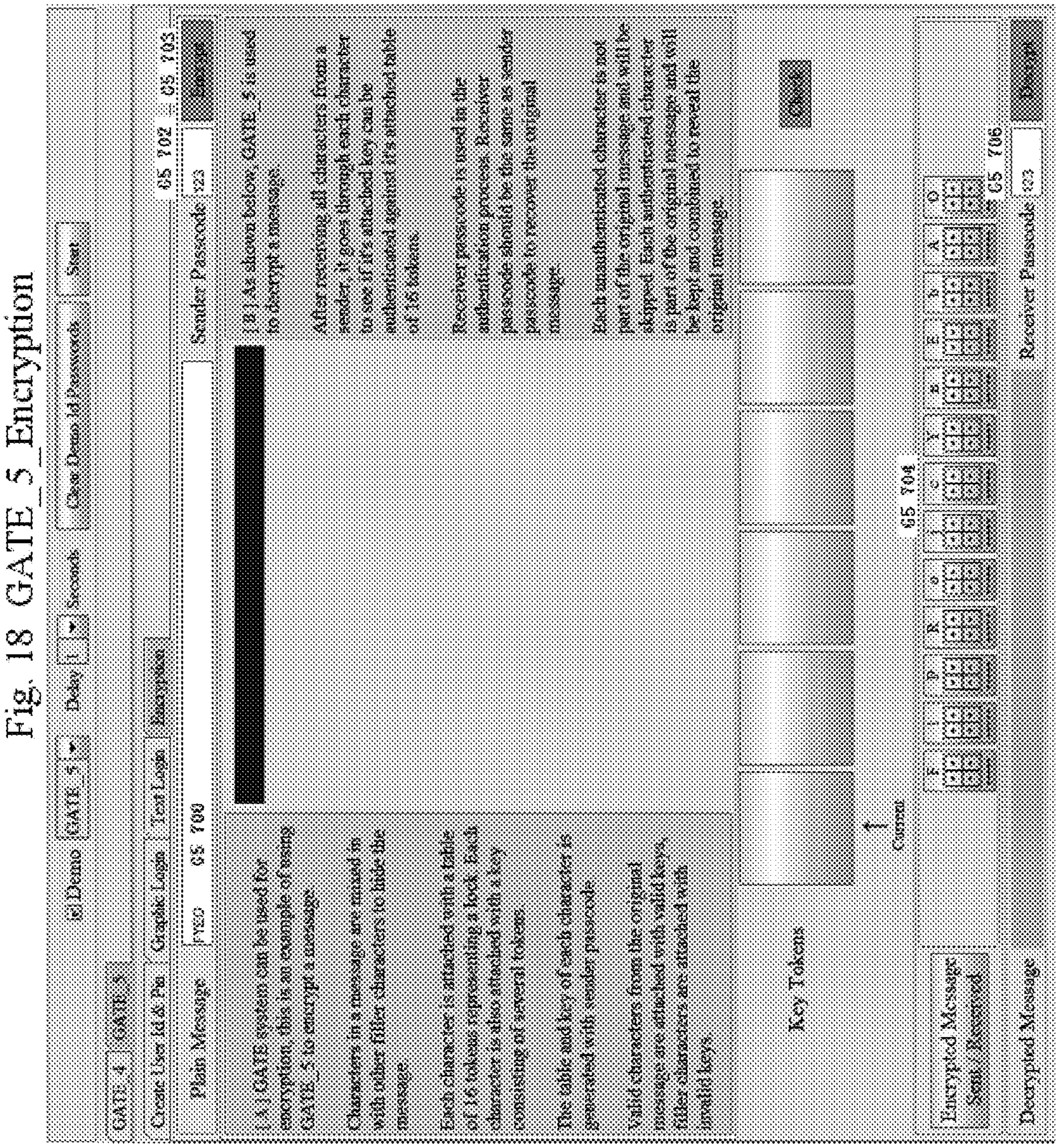

Fig. 19A GATE_5 Encryption
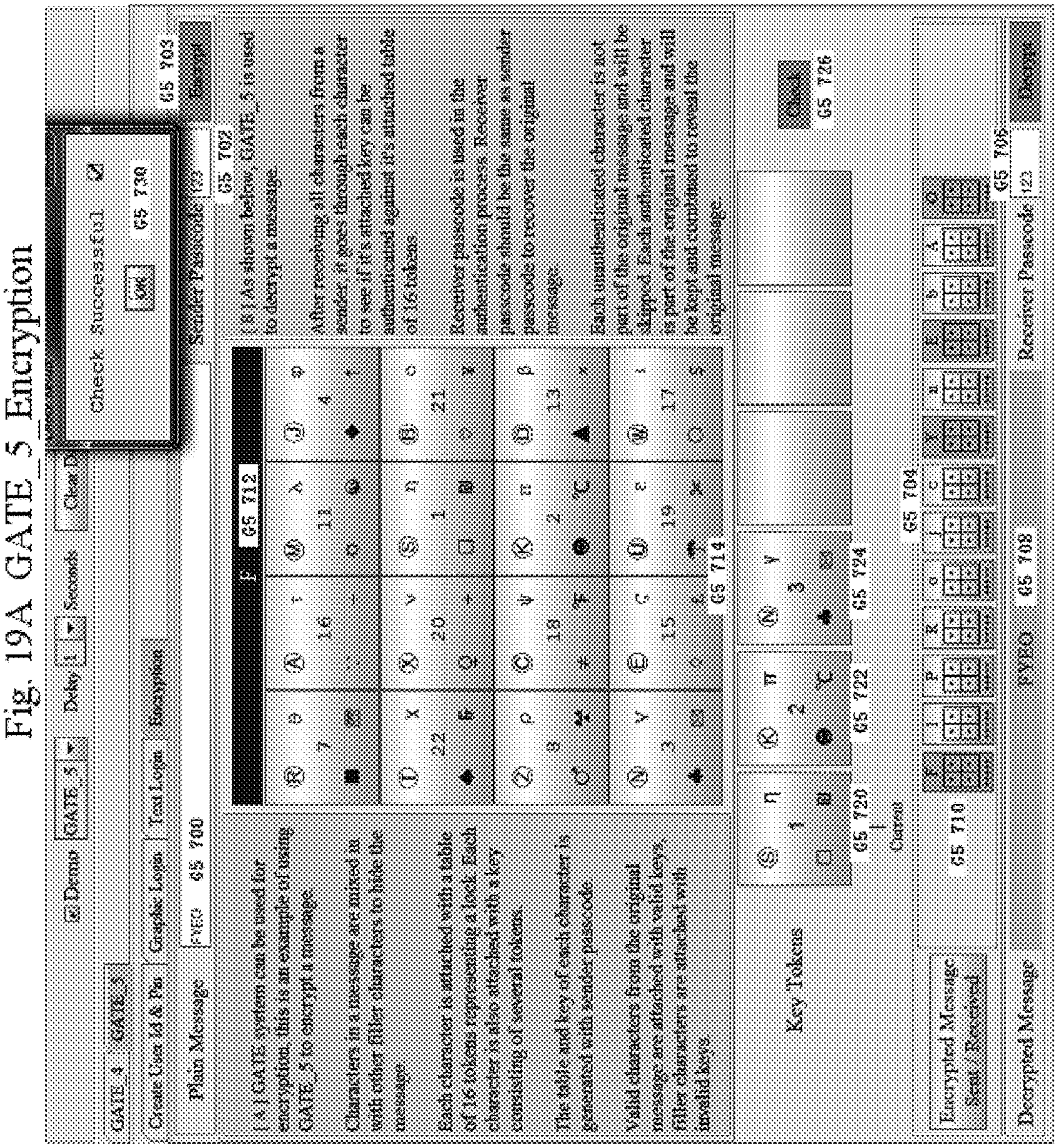

Fig. 19B GATE_5 Encryption
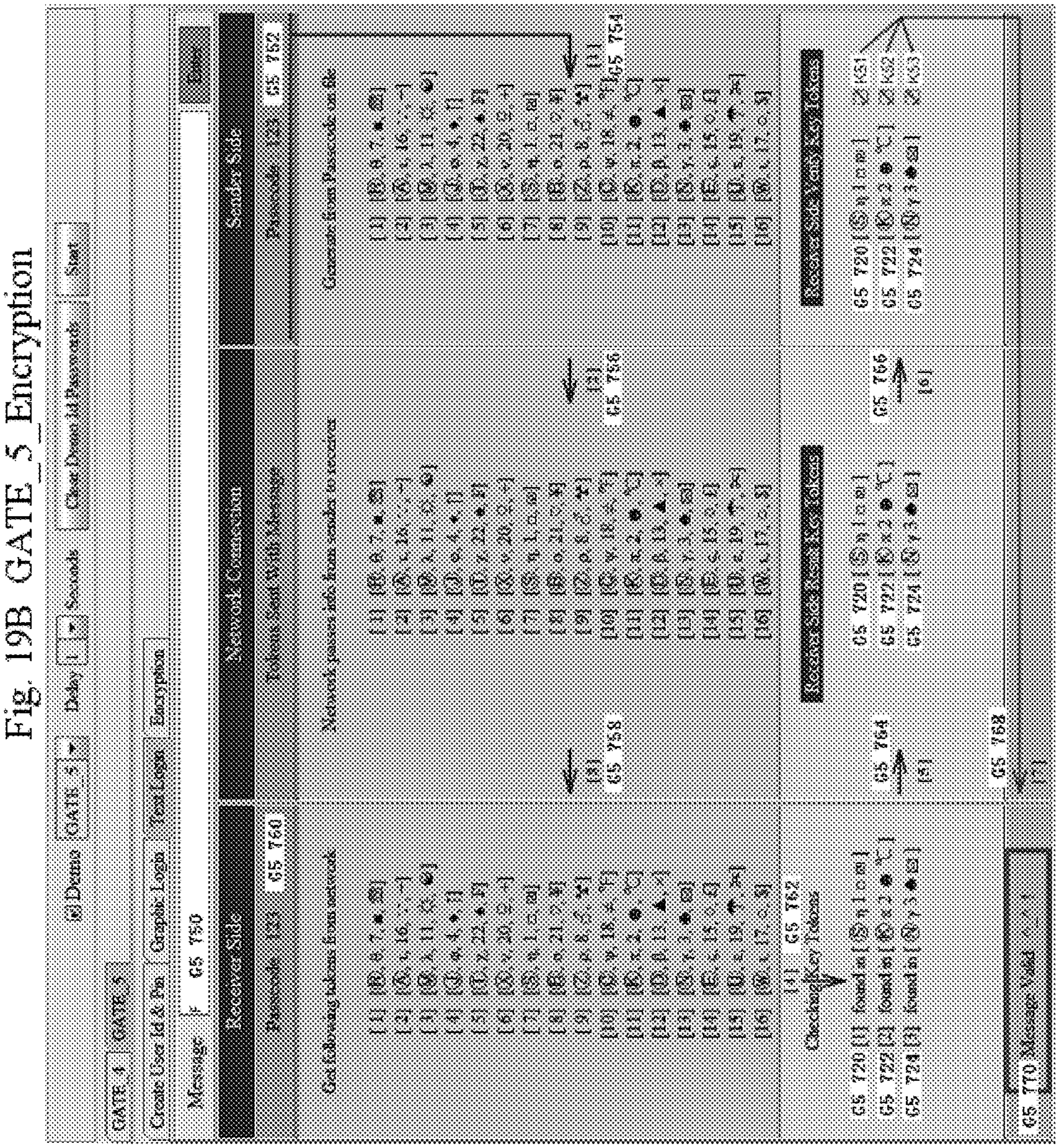

Fig. 20A GATE_5_Encryption
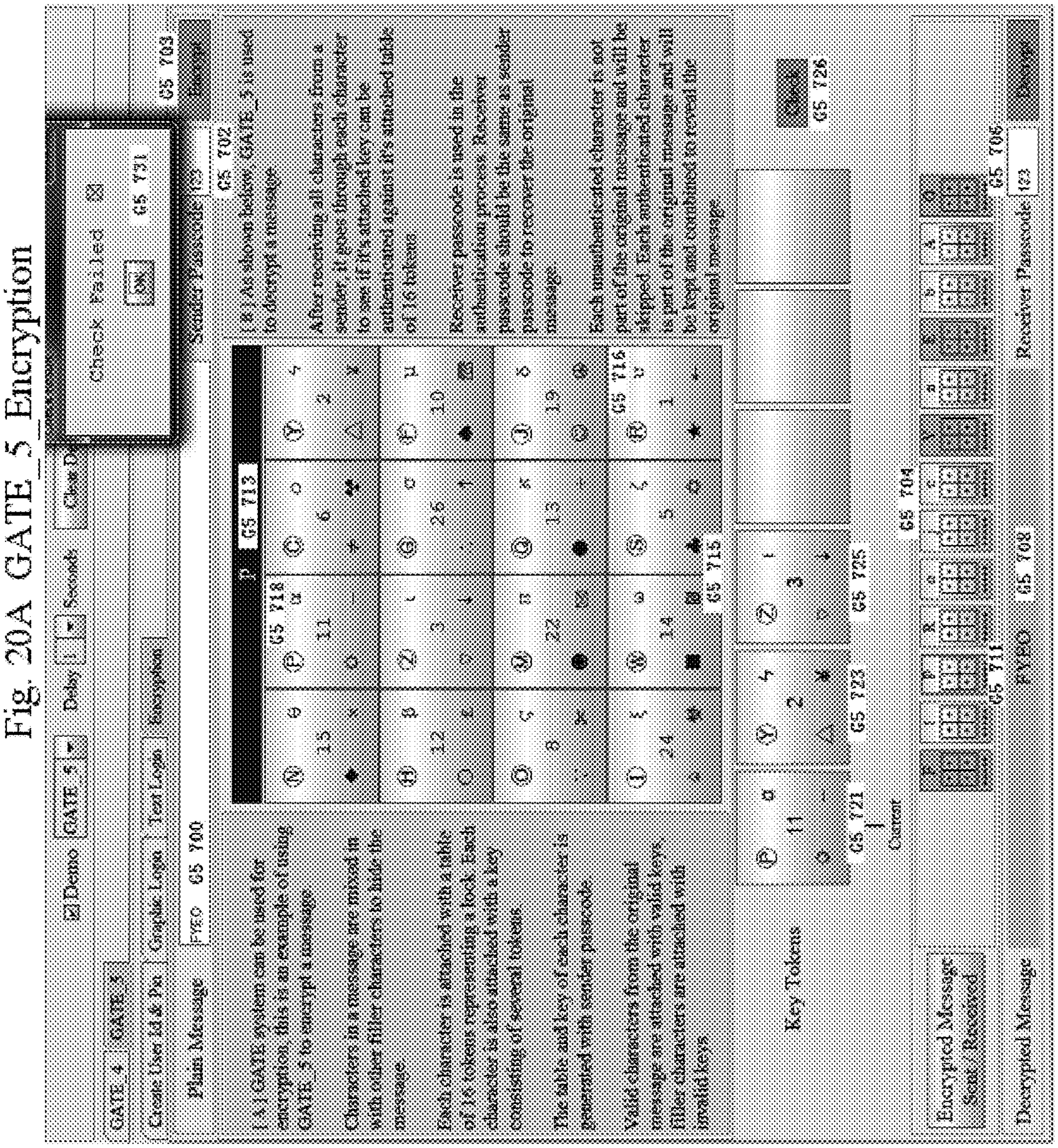

Fig. 20B GATE_5_Encryption
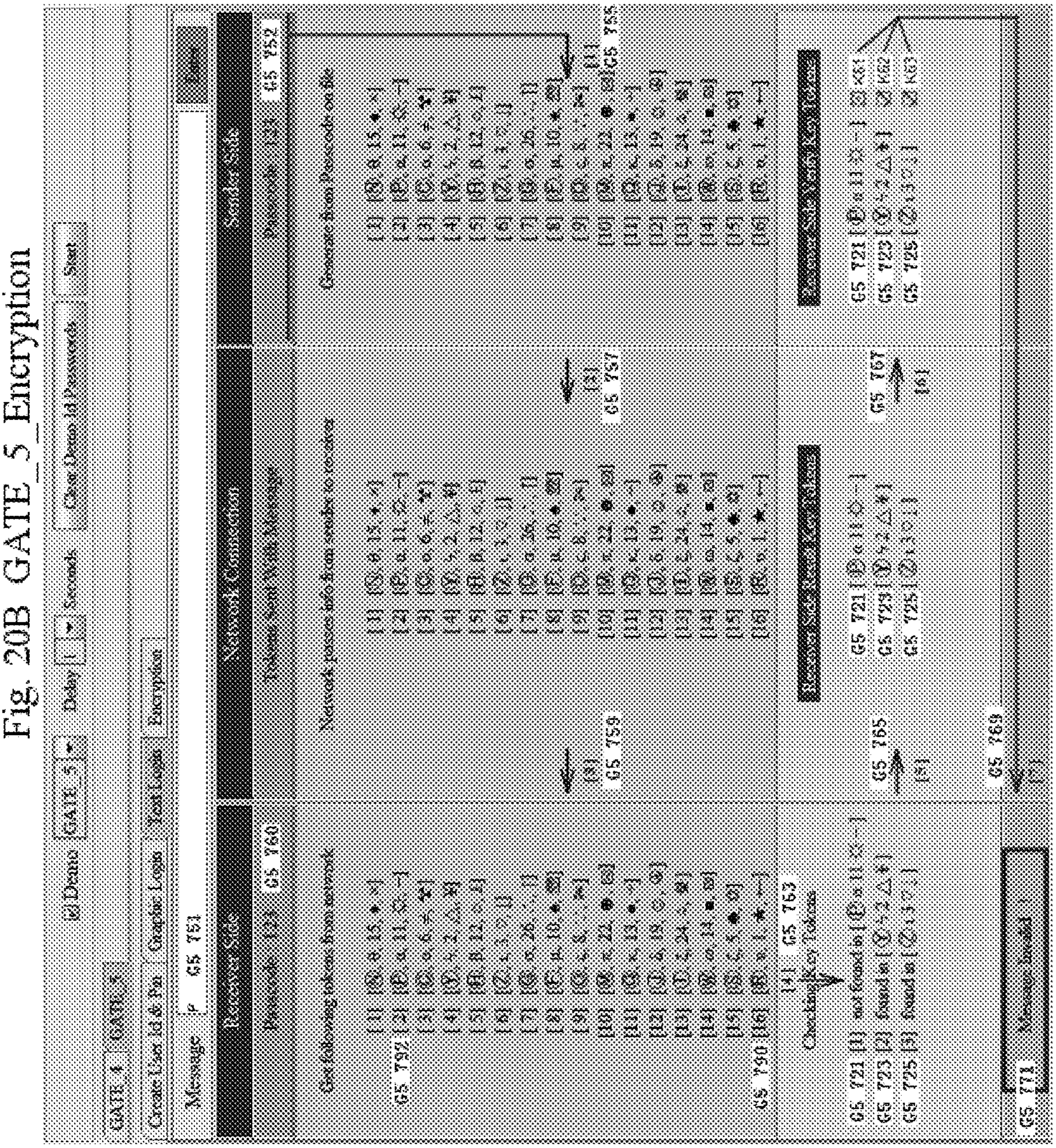

Fig. 21 GATE_5_Encryption
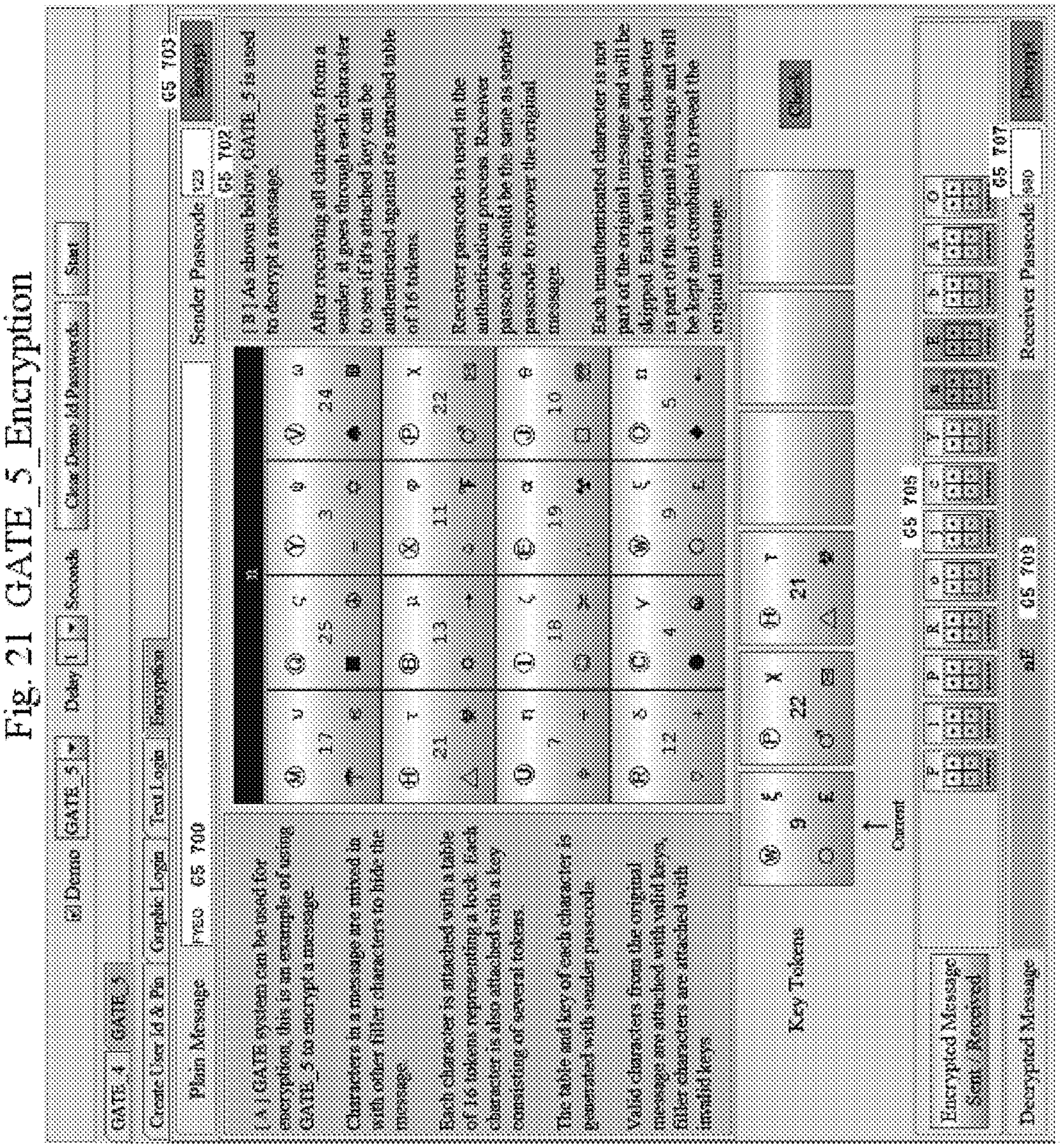

INTERCEPTION-PROOF AUTHENTICATION AND ENCRYPTION SYSTEM AND METHOD

BACKGROUND OF THE INVENTION

1. Field of the Invention

The present invention relates to authentication and encryption systems and methods and, more particularly, to interception-proof authentication and encryption systems and methods.

2. Background of the Related Art

In modern society, daily life requires the use of a wide variety of information devices, such as mobile phones, PCs, notebooks, and ATMs to name a few. The information devices may keep users' personal data. Due to the importance of protecting this personal data, there are methods to securely lock and unlock these devices.

At present, the most commonly used method to lock and unlock these devices is a password-based challenge authentication procedure, whereby a device typically requires that, before accessing its services, users enter a user id and a password for identity recognition. This is known as a login. This login process is designed to prevent users' personal data from being stolen or fraudulently changed.

With the rapid daily increase of network coverage and accessibility, hackers are more likely to target users' passwords to gain access to their private information. In addition, hackers are getting more and more sophisticated at guessing and cracking users' passwords. Therefore, simple passwords no longer provide adequate protection from cyber threats and espionage.

In view of this, various mechanisms have been implemented to provide better protection. For example, users are required to create a password that meets the requirements of password length, complexity, and unpredictability, such that the strength of the password is, in theory, sufficient enough to fend off brute-force search attacks and dictionary attacks. Furthermore, users are required to change their passwords regularly to invalidate old passwords, thereby reducing the chance that their passwords will be cracked. These mechanisms do enhance security to a certain degree and thus help users protect their accounts.

However, each organization may have a different set of password rules. Some require the password length to be at least 6 or 8 characters. Some require the use of mixed uppercase and lowercase letters, as well as numbers. Some require at least one special character, yet some do not allow special characters, so when you think you have just created a very strong golden password which you can use in all places, there will be a next place which has a different set of requirements that will make your golden password invalid.

As a result of these different password rules, it may be difficult, if not impossible, for users to remember the multitude of passwords they have set up with different sites/organizations. Thus, users will typically store their passwords, such as in a file that is stored on their information device and/or in a password storage application that runs on their information device. The stored passwords can be targeted by hackers, and if they gain access to the device on which the passwords are stored, they will gain access to all the passwords and have access to all of the user's password protected accounts/sites. Therefore, implementing strict rules for passwords to avoid passwords that are too weak can have the opposite of the intended effect (an increased risk of exposing more information).

In view of these problems with traditional passwords, new methods have been developed to try to solve these problems. These methods may include, but are not limited to, using photos, graphic images, or different shapes and shades to make it harder for hackers to peek or steal. Some techniques even use gestures and positioning of information in certain locations of the input screen to validate user access. However, none of these methods can defeat a hidden camera which can record users' every move every time they log into a device. If a hacker can play back all the recordings and analyze a user's every move, the hacker will eventually gain access.

The primary problems with existing authentication methods are:

(1) Traditional passwords and security questions (the most commonly used method) are not peek-proof;

(2) Graphic images and photo-based methods may require users to upload an image or photo file, and the system must save and maintain the images and/or photos. This increases user and system burden, and if hackers record and playback the login process, the images can still be recognized;

(3) New graphic and gesture and/or location-based authentication methods can only be used between human and computer, and thus cannot be used machine to machine.

Thus, there is a need for authentication and encryption systems and methods that do not exhibit the above-described problems.

SUMMARY OF THE INVENTION

An object of the invention is to solve at least the above problems and/or disadvantages and to provide at least the advantages described hereinafter.

Therefore, an object of the present invention is to provide a system and method for authentication of a user.

Another object of the present invention is to provide a system and method for authentication of a user attempting to access an electronic device.

Another object of the present invention is to provide a system and method for authentication of a user that is requesting access to electronically stored information.

Another object of the present invention is to provide a system and method for authentication of a user that is requesting access to a device on a network.

Another object of the present invention is to provide a system and method for authentication of a user that utilizes passcodes that contain a predetermined number of symbols.

Another object of the present invention is to provide a system and method for authentication of a user that utilizes multiple tokens, where each token is a group of at least two symbols from a set of symbols used to create a user passcode.

Another object of the present invention is to provide a system and method for encryption and decryption of electronic information.

Another object of the present invention is to provide a system and method for encryption and decryption of electronic information that utilize a passcode that contains a predetermined number of symbols for encrypting and decrypting the electronic information.

Another object of the present invention is to provide a system and method for encryption and decryption of electronic information that utilizes a passcode that contains a predetermined number of symbols in combination with multiple tokens, where each token is a group of at least two symbols from a set of symbols used to create the passcode.

To achieve at least the above objects, in whole or in part, there is provided a method of authenticating a user using a predetermined passcode that comprises a predetermined number of symbols ("passcode symbols") selected from a set of symbols, wherein each of the predetermined passcode symbols is characterized by a predetermined pin position, comprising presenting a token set to the user, wherein the token set comprises at least two tokens, and wherein each token in the token set comprises at least two symbols that belong to the set of symbols, requiring the user to select a token from the token set for each pin position in the predetermined passcode, and authenticating the user based on the tokens that the user selected.

To achieve at least the above objects, in whole or in part, there is also provided a system for authenticating a user using a predetermined passcode that comprises a predetermined number of symbols ("passcode symbols") selected from a set of symbols, wherein each of the predetermined passcode symbols is characterized by a predetermined pin position, comprising a processor, memory accessible by the processor, and an authentication/encryption module comprising a set of computer readable instructions stored in memory that are executable by the processor to present a token set to the user, wherein the token set comprises at least two tokens, and wherein each token in the token set comprises at least two symbols that belong to the set of symbols, require the user to select a token from the token set for each pin position in the predetermined passcode, and authenticate the user based on the tokens that the user selected.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2B shows examples of symbols grouped into five dimensions, in accordance with one embodiment of the present invention;

FIG. 5 is a table listing exemplary token generation rules used by the authentication/encryption module, in accordance with one embodiment of the present invention;

FIG. 6 is a table listing exemplary token selection rules used by the authentication/encryption module, in accordance with one embodiment of the present invention;

FIG. 7 is a table listing exemplary token validation rules used by the authentication/encryption module, in accordance with one embodiment of the present invention;

FIGS. 8A and 8B are sample screenshots of the user id creation (registration) process in the GATE_4 embodiment, in accordance with one embodiment of the present invention;

FIGS. 9A-9D are sample screenshots of the user login process in the GATE_4 embodiment, in accordance with one embodiment of the present invention;

FIGS. 10A-10D are sample screenshots of the user login process in the GATE_4 embodiment in text format, in accordance with one embodiment of the present invention;

FIGS. 11A and 11B are sample screenshots of the user id creation (registration) process in the GATE_5 embodiment, in accordance with one embodiment of the present invention;

FIGS. 12A-12D are sample screenshots of the user login process in the GATE_5 embodiment, in accordance with one embodiment of the present invention;

FIGS. 13A-13D are sample screenshots of the user login process in the GATE_5 embodiment in text format, in accordance with one embodiment of the present invention;

FIG. 14 is a sample screenshot of a message encryption process using the GATE_4 embodiment in which a plain text message is encrypted with a sender passcode, in accordance with one embodiment of the present invention;

FIGS. 15A and 15B are sample screenshots of a message decryption process using the GATE_4 embodiment in which a successful decryption takes place, in accordance with one embodiment of the present invention;

FIGS. 16A and 16B are sample screenshots of a message decryption process using the GATE_4 embodiment in which an encrypted filler message is invalidated on the receiver side, in accordance with one embodiment of the present invention;

FIG. 17 is a sample screenshot of a message decryption process using the GATE_4 embodiment in which decryption fails because of a receiver passcode that is different than a sender passcode, in accordance with one embodiment of the present invention;

FIG. 18 is a sample screenshot of a message encryption process using the GATE_5 embodiment in which a plain text message is encrypted with a sender passcode, in accordance with one embodiment of the present invention;

FIGS. 19A and 19B are sample screenshots of a message decryption process using the GATE_5 embodiment in which a successful decryption takes place, in accordance with one embodiment of the present invention;

FIGS. 20A and 20B are sample screenshots of a message decryption process using the GATE_5 embodiment in which an encrypted filler message is invalidated on the receiver side, in accordance with one embodiment of the present invention; and FIG. 21 is a sample screenshot of a message decryption process using the GATE_5 embodiment in which decryption fails because of a receiver passcode that is different than a sender passcode, in accordance with one embodiment of the present invention.

DETAILED DESCRIPTION OF PREFERRED EMBODIMENTS

Figure 1A:
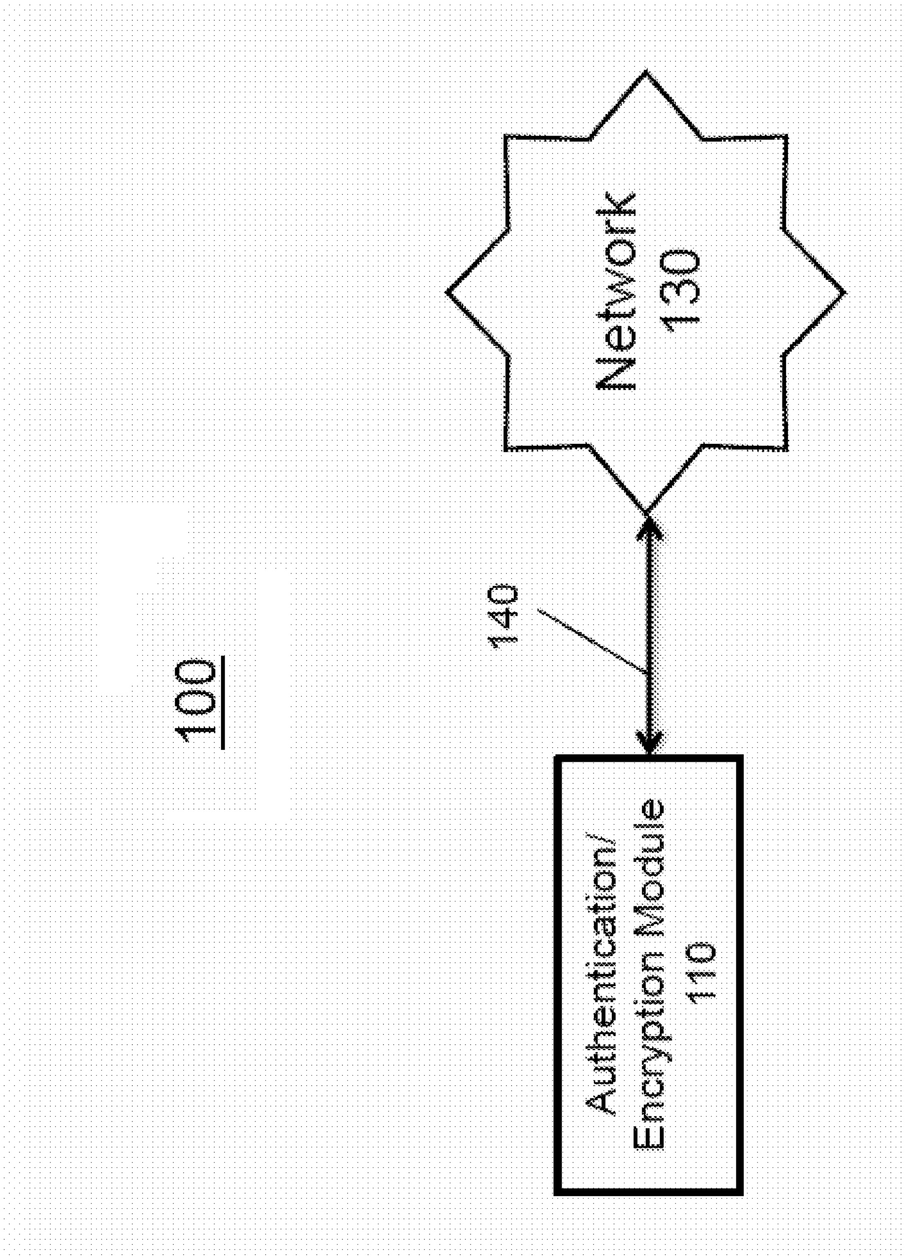
FIG. 1A is a block diagram illustrating an exemplary interception-proof authentication/encryption system that can be incorporated into a device or a server that is accessed by a client system, in accordance with one embodiment of the present invention.

The present invention provides a novel interception-proof authentication and encryption mechanism that is implemented with a specially programmed apparatus. For authentication, the present invention utilizes "passcodes" that are formed with symbols that are part of a device's operating system. As an example, a passcode may look like this:

Ⓘ ♥ 2 ✉

To a user, the above passcode may mean "I love to email," which is easy to remember but hard for anyone else to know. Each symbol in the passcode will be referred to as a "pin" with a corresponding pin position relative to the other pins. In the example above, the symbol "Ⓘ" is in the first pin position, the symbol "♥" is in the second pin position, the symbol "2" is in the third pin position and the symbol "✉" is in the fourth pin position.

The present invention is preferably "in-system" in that it utilizes a select set of symbols that are preferably part of the device's operating system, and therefore does not require users to upload any photos or images. The symbols used to create the passcodes or the encrypted message are of different types that are preferably grouped into two or more groups that will be referred to herein as "dimensions." This gives users a greater variety of ways to express themselves when creating their passcodes.

The present invention provides a novel interception-proof authentication and encryption mechanism by "hiding" the symbols used for the pins that make up a user's passcode among multiple other symbols that are not part of the user's passcode. Thus, in essence, hiding a needle in a haystack. Specifically, the present invention utilizes what will be referred to herein as "tokens." A token is a group of at least two symbols. Multiple tokens (a "token set") are presented to a user, with some or all of a user's pre-selected pins randomly inserted into some or all of the tokens. Specifically, each pin (represented by a pre-selected symbol) in a user's passcode may be included in one of the tokens that are presented to the user. The user chooses the tokens that contain the individual pins that make up the passcode, such that the pin position of each selected token corresponds to the pin position of the passcode pin that it contains. Because each chosen token contains not only one of the pre-selected pins in the user's passcode, but also other randomly generated symbols that are not one of the pre-selected pins in the user's passcode, someone that observes which tokens the user has chosen cannot determine what the user's actual passcode is.

Each time the user is asked to provide the passcode, another set of randomly generated tokens are generated with the individual pre-selected pins in the user's passcode randomly distributed among the multiple tokens. Thus, the user will choose a different set of tokens each time the user is asked to provide the passcode, thereby preventing an observer from determining the user's passcode based on the choice of tokens.

As an illustrative example, 4 groups of symbols (4 dimensions) can be used, with each dimension containing 36 symbols. During a login process, 36 tokens are displayed for the user, with each token containing a symbol from each of the four dimensions of symbols. A given symbol is preferably displayed in only one token (i.e., if the symbol appears in one token it does not appear again in another token). Because, in this example, 36 tokens are displayed, every symbol in each of the four dimensions is displayed (one symbol from each of the dimensions in each of the 36 tokens).

If the number of pins (represented by symbols) in a user's passcode is represented by the variable "N," then the user will need to choose N tokens (the tokens that contain the individual pins that make up the passcode, such that the pin position of each selected token corresponds to the pin position of the passcode pin that it contains).

As discussed above, the present invention will reduce the likelihood of "peek and interception" of the user's passcode because the user enters a token that contains 4 symbols, including one of the pins in the passcode, for each pin in the passcode. Thus, even if a user entry is observed by a hacker looking at the login screen, or by a hacker intercepting network traffic, the hacker would not be able to determine which of the 4 symbols in each token corresponds to each of the pre-selected pins that make up the user's passcode. Accordingly, if the hacker tried to login to the user's account, the hacker would be presented with another set of randomly generated tokens, some of which contain the user's pre-selected pins that make up the user's passcode, and the hacker would not know which tokens to select.

However, if the hacker observes the user login process enough times, the hacker can compare all the recorded login sessions to find out what each pin is in the passcode, because each pin is sure to appear in a token user enters, and if the hacker compares all the 1st tokens from different login sessions, the hacker will eventually determine the 1st pin, and if the hacker compares all the 2nd tokens from all sessions, the hacker will eventually determine the 2nd pin, etc.

Therefore in order to prevent a hacker from finding out the pins in the passcode over time, the number of randomly generated tokens presented to the user is preferably less than the number of symbols in each dimension. For example, if each of the one or more dimensions contain 36 symbols, one could choose to only present 16 tokens to the user. The result of this is that there is no guarantee that a user pin will even appear in a token. In this embodiment, if the user is attempting to login and one or more pins in the user's passcode is not present in any of the tokens, then the user selects any token as a "wildcard" token for the pins that are not present in any of the tokens (such that the pin position of the selected wildcard token corresponds to the pin position of the missing passcode pin). This makes a hacker's guess work much more difficult, because there may be a randomly chosen token in place of one of the user's pins that does not actually contain the pin.

Another benefit of using less tokens than the number of symbols in the one or more dimensions (e.g., using 16 tokens when the number of symbols in the one or more dimensions is 36) is that it makes it easier for users to quickly find out whether the pre-selected pins are in the tokens or not, and the screen looks simpler to the user.

The present invention preferably uses symbols that are part of the operating system of the device that incorporates the present system. Thus, no special graphics or photos are required to be loaded by the user onto the system, and therefore it reduces the load on the user and the system to store and maintain those properties.

The system and methods of the present invention can be used not only to authenticate users, but to also authenticate multiple pieces of information, and can therefore be used to encrypt messages.

FIG. 1A is a block diagram illustrating an exemplary interception-proof authentication/encryption system 100 that can be incorporated into a device or a server that is accessed by a client system, in accordance with one preferred embodiment of the present invention. The system 100 includes an authentication/encryption module 110 that provides interception-proof authentication and/or encryption functionality. The system 100 can be optionally connected to a network 130.

Figure 1B:
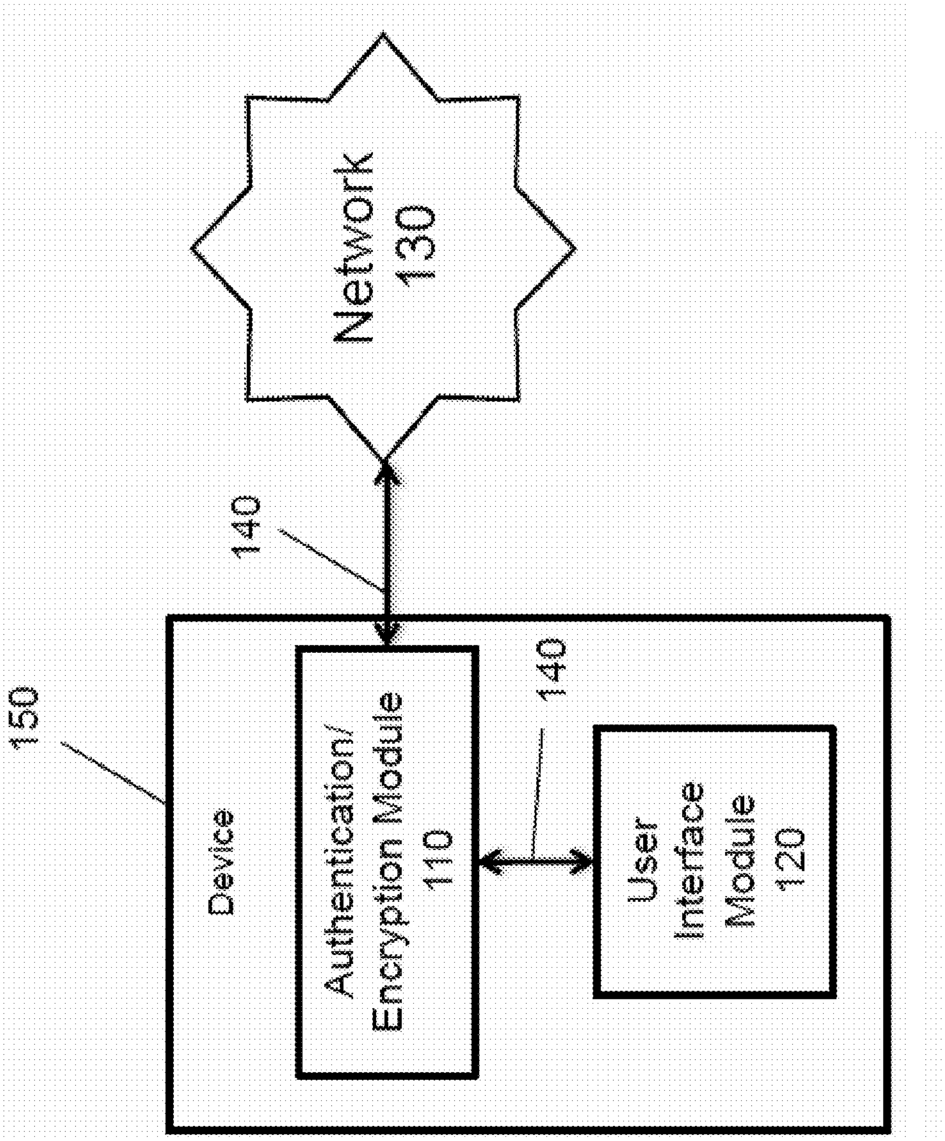
FIG. 1B is a block diagram illustrating the interception-proof authentication/encryption system incorporated into a device, in accordance with one embodiment of the present invention.

FIG. 1B is a block diagram illustrating the interception-proof authentication/encryption system incorporated into a device 150, in accordance with one preferred embodiment of the present invention. The device 150 preferably includes a user interface module 120. The authentication/encryption module 110 provides secure authentication of a user's passcode and/or encryption of a message, as will be explained in more detail below. The authentication/encryption module 110 can be optionally connected to a network 130.

The user interface module 120 can be implemented with any type of user interface known in the art such as, for example, a graphical user interface, a web-based interface and the like. In general, the user interface module 120 can be implemented with any type of interface that enables a user to interact with the authentication module 110.

Figure 1C:
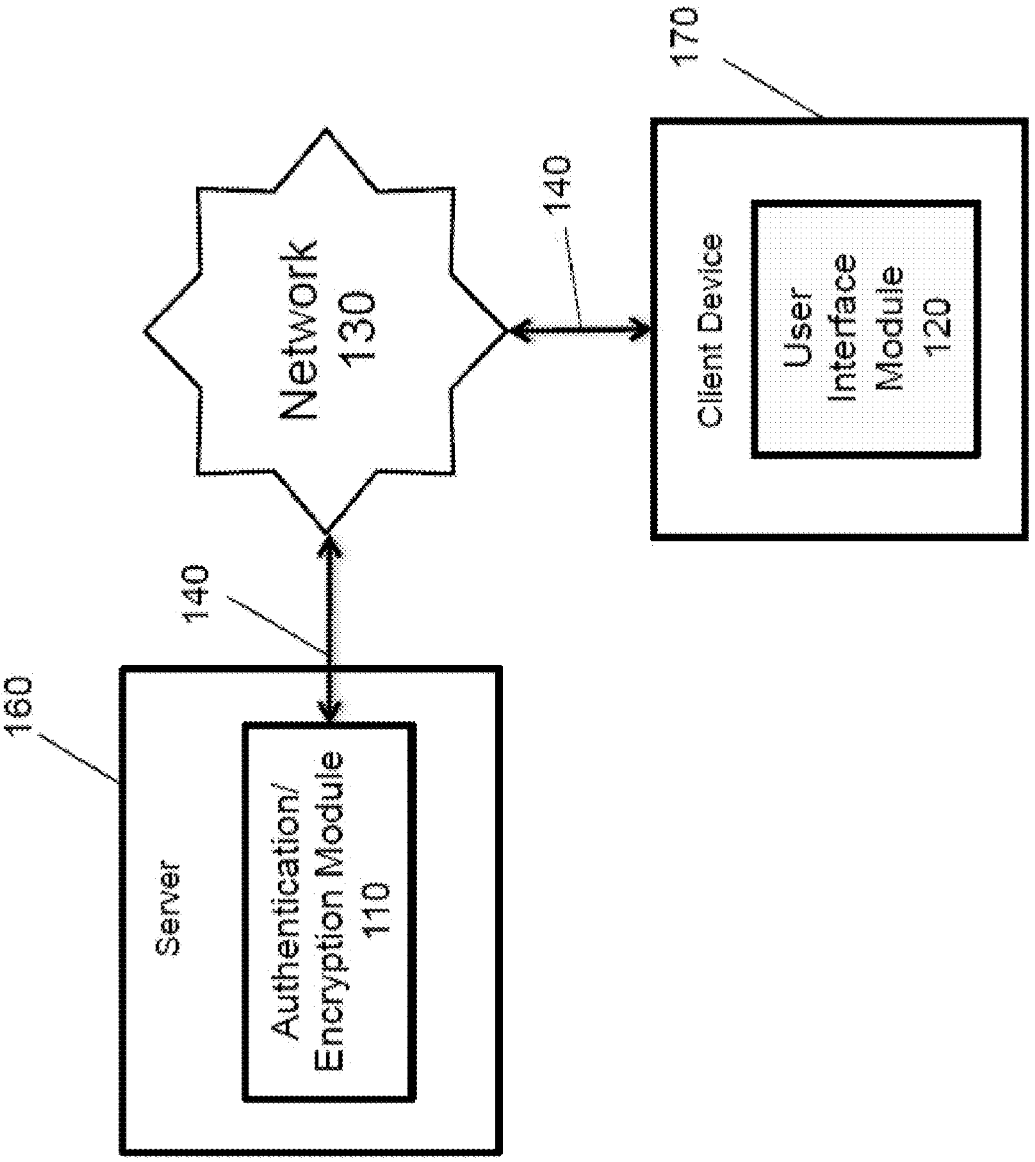
FIG. 1C is a block diagram illustrating the interception-proof authentication/encryption system incorporated into a server that is accessed by a client device via a network, in accordance with one embodiment of the present invention.

FIG. 1C is a block diagram illustrating the interception-proof authentication/encryption system incorporated into a server 160 that is accessed by a client device 170 via a network 130, in accordance with one preferred embodiment of the present invention. The client device 170 is any type of computer or device that can access the server 160 via the network 130, and preferably includes a user interface module 120 that enables a user to interact with the client device 170. The authentication/encryption module 110 provides secure authentication of a user's passcode and/or encryption of a message, as will be explained in more detail below.

Communication links 140 are used for communications between the authentication/encryption module 110, the user interface module 120, the network 130 and the client device 170. Communication links 140 can be wired links, wireless links, wireless inductive links, capacitive links or any other mechanisms known in the art for connecting electronic components. A hardwire link could suitably be implemented with a bus such as, for example, an Industry Standard Architecture (ISA) bus, a Micro Channel Architecture (MCA) bus, an enhanced ISA bus, a Video Electronics Standards Association (VESA) local bus or a Peripheral Component Interconnect (PCI) bus.

Examples of wireless links include, but are not limited to, a WAP (Wireless Application Protocol) link, a GPRS (General Packet Radio Service) link, a GSM (Global System for Mobile Communication) link, CDMA (Code Division Multiple Access) or TDMA (Time Division Multiple Access) link, such as a cellular phone channel, a GPS (Global Positioning System) link, CDPD (Cellular Digital Packet Data), a RIM (Research in Motion, Limited) duplex paging type device, a Bluetooth radio link, or an IEEE 802.11-based radio frequency link (WiFi).

The network 130 can be a wired or wireless network, and may include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, an ATM (Asynchronous Transfer Mode) connection, an FDDI (Fiber Distributed Data Interface) or CDDI (Copper Distributed Data Interface) connection.

The user interface module 120 can be implemented with any type of user interface known in the art such as, for example, a graphical user interface, a web-based interface and the like. In general, the user interface module 120 can be implemented with any type of interface that enables a user to interact with the authentication/encryption module 110.

The term "module" as used herein means a real-world device, component, or arrangement of components implemented using hardware, which may include an application specific integrated circuit (ASIC) or field-programmable gate array (FPGA), for example, or a microprocessor system and a set of instructions to implement the module's functionality, which (while being executed) transform the microprocessor system into a special-purpose device for carrying out the module's functions.

A module can also be implemented as a combination of hardware alone and software-controlled hardware, with certain functions facilitated by the hardware alone, and other functions facilitated by a combination of hardware and software. In certain implementations, at least a portion, and in some cases, all, of a module can be executed on the processor(s) of a computer or device (such as, for example, the server 160 and the client device 170) that executes an operating system, system programs, and application programs, while also implementing the module using multitasking, multithreading, distributed (e.g., cloud) processing, or other such techniques. Examples of such a computer or device include, but are not limited to, a personal computer (e.g., a desktop computer or a notebook computer), a server, an automated teller machine (ATM), a point-of-sale terminal, an appliance, and a mobile computing device, such as a smartphone, a tablet, or a personal digital assistant (PDA). Further, the server 160 is suitably any type of server, such as a Windows server, Linux server, Unix server or the like.

Figure 1D:
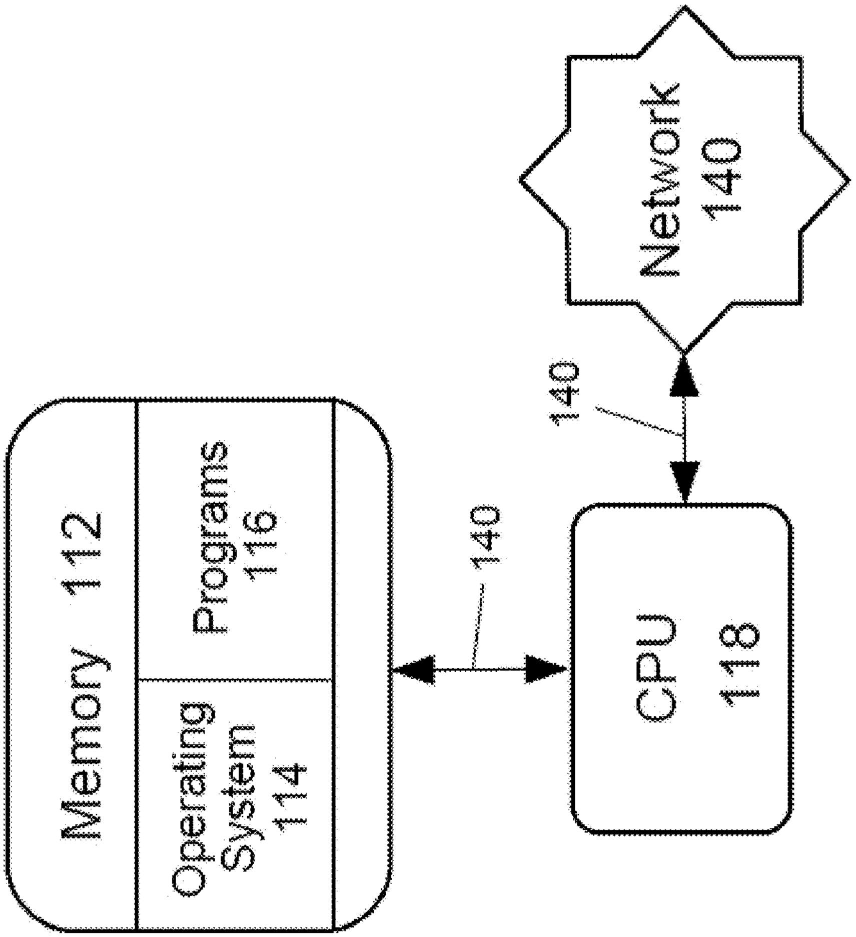
FIG. 1D is a schematic diagram of one exemplary hardware implementation of the interception-proof authentication/encryption system, in accordance with one embodiment of the present invention.

FIG. 1D is a schematic diagram of one exemplary hardware implementation of the interception-proof authentication/encryption system 100, in accordance with one embodiment of the present invention. In the embodiment of FIG. 1D, the authentication/encryption module 110 is implemented by CPU 118 and memory 112.

The CPU 118 accesses operating system code 114 and other program code 116 stored in memory 112 for execution. The program code 116 that implements the functionality of the authentication/encryption module 110 is stored in memory 112, or on an external storage device (not shown), for access and execution by the CPU 118.

Memory 112 can be implemented by, for example, random-access memory (RAM), cache memory, removable/non-removable storage media, volatile/non-volatile storage media, such as a non-removable non-volatile hard disk drive, a removable non-volatile floppy disk drive, an optical disk drive (such as CD-ROM, DVD-ROM, or any other optical storage medium), USB flash drive, and a memory card.

The functionality of the authentication/encryption module 110 will now be described. The authentication/encryption module 110 provides passcode/challenge authentication, in response to a user login request, by displaying to the user (via user interface module 120) multiple tokens with a user's pre-selected pins randomly inserted into the tokens. As discussed above, each pin (represented by a pre-selected symbol) in a user's passcode may be included in one of the tokens that are presented to the user. At least one pin is present in one of the tokens. The user chooses the tokens that contain the individual pins that make up the passcode, such that the pin position of each selected token corresponds to the pin position of the passcode pin that it contains. Because each chosen token contains randomly generated symbols that are not one of the pre-selected pins in the user's passcode, as well as possibly one of the pre-selected pins in the user's passcode, someone that observes which tokens the user has chosen cannot determine what the user's actual passcode is.

Figure 2A:
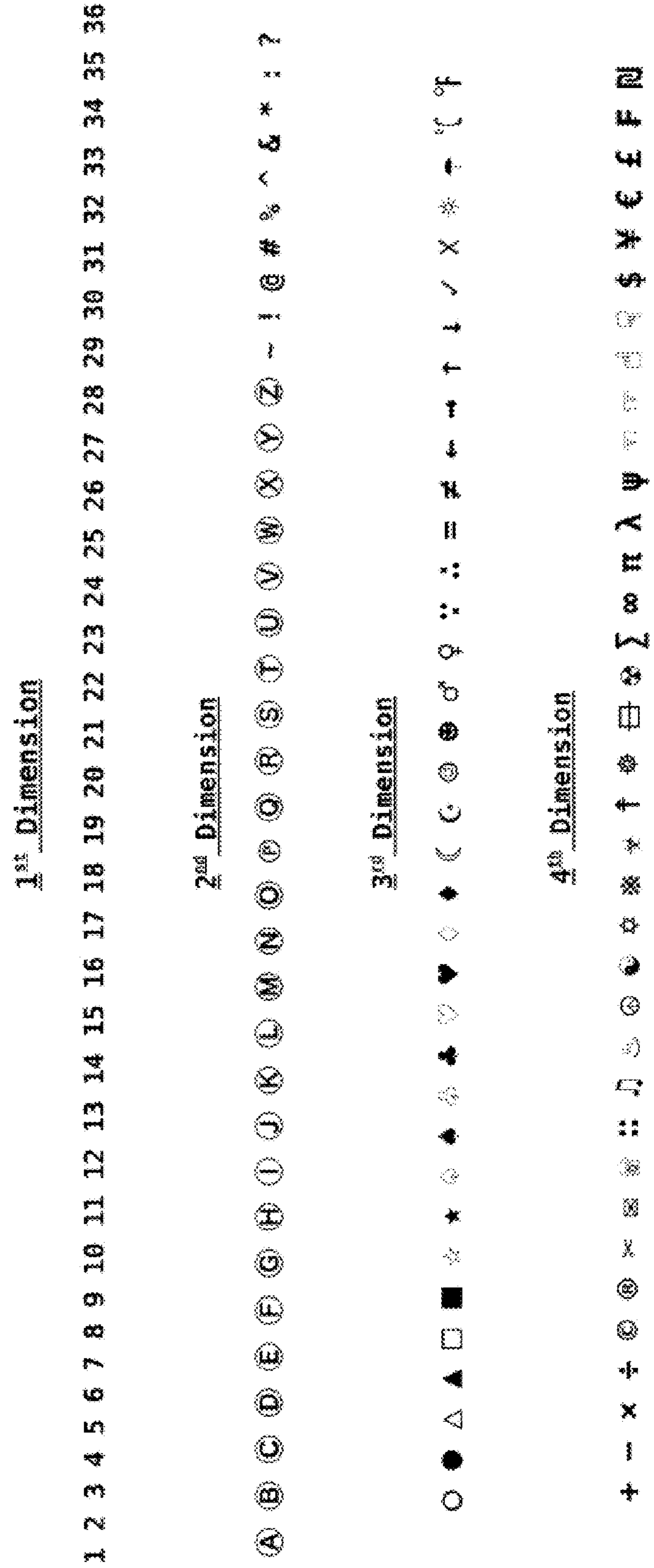
FIG. 2A shows examples of symbols grouped into four dimensions, in accordance with one embodiment of the present invention.

Two illustrative embodiments of authentication/encryption module functionality will be described below, and will be referred to herein as Graphical Access Tabular Entry_4 ("GATE_4") and Graphical Access Tabular Entry_5 ("GATE_5"). As shown in FIG. 2A, the GATE_4 embodiment uses 4 dimensions of symbols, with 36 symbols included in each dimension. As shown in FIG. 2B, the GATE_5 embodiment uses 5 dimensions of symbols, with 26 symbols included in each dimension. The symbols shown in FIGS. 2A and 2B are examples of the types of symbols that may be used, and it should be appreciated that any other types of symbols may be used while still falling within the scope of the present invention.

The symbols shown in FIGS. 2A and 2B are generally available in modern computer operating systems, and do not require any special process to create or upload/save into an existing system that incorporates the present invention. They are a subset of the standard Unicode system found in most computer operating systems. Each symbol has a Unicode ID, familiar characters: a, b, . . . z, 0, 1, 9, @, +, <, % are all part of the Unicode system. For example:

Unicode \u0062 is for the character: b

Unicode \u2206 is for the character: ∆

Unicode \u0040 is for the character: @

The symbols shown in the embodiments of FIGS. 2A and 2B were included because they are diverse, distinctive and easy to remember.

Figure 3:
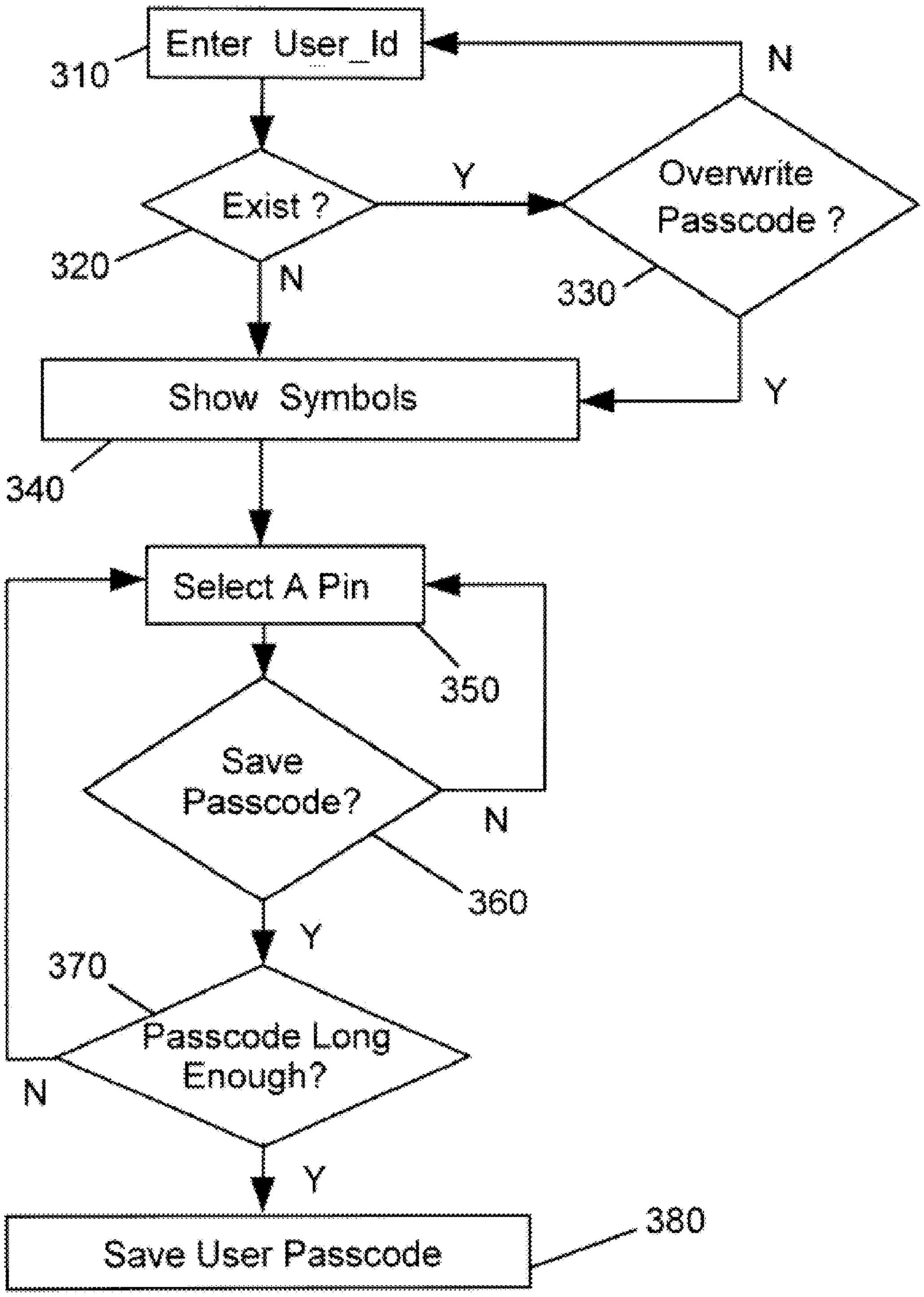
FIG. 3 is a flowchart illustrating an exemplary process implemented by the authentication/encryption module for enabling a user to create a passcode, in accordance with one embodiment of the present invention.

FIG. 3 is a flowchart illustrating an exemplary process implemented by the authentication/encryption module 110 for enabling a user to create a passcode, in accordance with one embodiment of the present invention. The process starts at step 310, where the user is asked to enter a desired user id. At step 320, the authentication/encryption module 110 determines if the user id already exists in memory 112. If the user id exists, the process continues to step 330. Otherwise, the process continues to step 340.

At step 330, the user is asked if they want to overwrite the existing passcode associated with the user id. If the user indicates "no," the process jumps back to step 310. If the user indicates "yes," the process proceeds to step 340.

At step 340, the symbols available for the user to choose for each pin in their passcode are displayed to the user. Then, at step 350, the user is asked to select one of the displayed symbols as one of the pins for their passcode. At step 360, the process determines if the user has requested that the currently selected pin(s) should be saved as the passcode. This may be implemented, for example, by displaying an icon that the user can select when the user is ready to save the passcode. If the user has not indicated that the passcode should be saved, the process loops back to step 350, where the user selects another symbol for another pin in the passcode. If the user indicates, at step 360, that the passcode should be saved, then the process proceeds to step 370.

At step 370, it is determined whether the selected passcode complies with a predetermined length requirement (i.e., a predetermined minimum number of pins). If the selected passcode complies, then the passcode is saved at step 380. If the passcode does not comply, then the process loops back to step 350, in which the user is prompted to choose a symbol for an additional pin.

Figure 4:
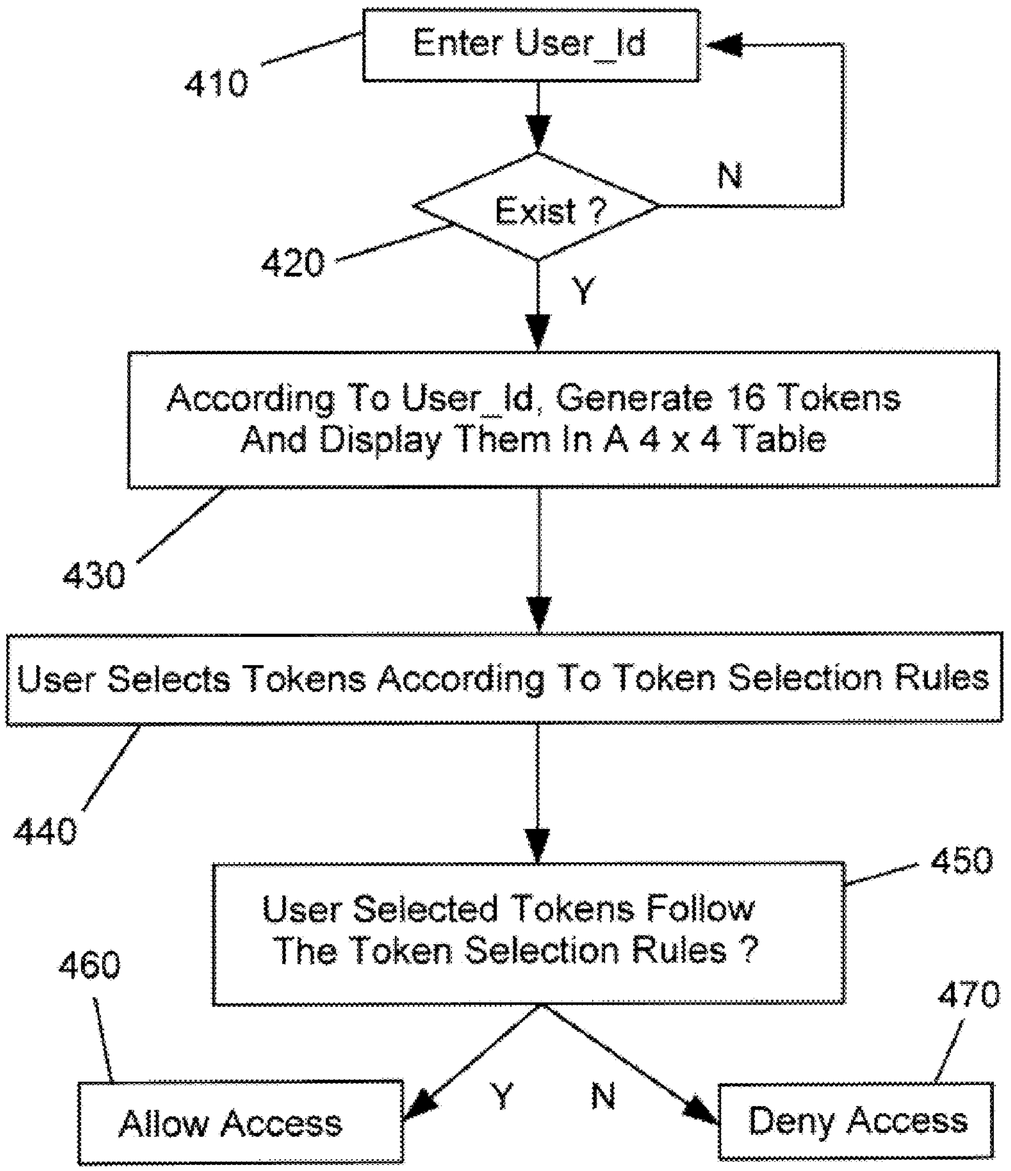
FIG. 4 is a flowchart illustrating an exemplary process implemented by the authentication/encryption module for authenticating a user, in accordance with one embodiment of the present invention.

FIG. 4 is a flowchart illustrating an exemplary process implemented by the authentication/encryption module 110 for authenticating a user, in accordance with one embodiment of the present invention. The process starts at step 410, where a login screen is presented to the user in which the user is prompted to enter a user id. The process then proceeds to step 420, where the authentication/encryption module 110 determines if the user id entered by the user exists. If it does, the process proceeds to step 430. If it does not, the process loops back to step 410, where the user is prompted to enter another user id.

At step 430, the authentication/encryption module generates a predetermined number of tokens based on the number of pins used for the user's passcode. In the embodiment described in FIG. 4, 16 tokens are generated and are preferably displayed to the user in a 4×4 token table, as will be described in more detail below. The tokens are generated based on the token generation rules shown in FIG. 5. In the examples, there are 16 tokens in the table, but in reality, it could be any number of tokens larger then the user pin count, and presented in 3×4, 2×5, or any other combination, 4×4 is just a preferred way to display them.

The process then proceeds to step 440, where the user selects the tokens that contain the pins in his passcode, in the order in which the pins appear in the passcode, in accordance with the token selection rules shown FIG. 6. At step 450, the authentication/encryption module 110 determines if the user selected tokens follow the token selection rules shown in FIG. 6. If the token selection rules are followed, the process proceeds to step 460, where the user is authenticated and allowed access. If the token selection rules are not followed, the process proceeds to step 470, where the user is not authenticated and denied access.

As discussed above, FIG. 5 is a table listing exemplary token generation rules used by the authentication/encryption module 110, in accordance with one embodiment of the present invention. At least one of the pins in the user's passcode will be in at least one of the 16 tokens. Sometimes all of the user pins will be found in the tokens, and most times between 1 to N (N being the length of the user passcode with N pins) user pre-selected pins will be in the 16 tokens.

In the embodiment shown in FIG. 5, 16 tokens, not 36 (in the case of the GATE_4 embodiment) and not 26 (in the case of GATE_5 embodiment), are generated. Thus, in the case of GATE_4 embodiment, only 16/36=44% of the time one of the pins in the user's passcode may appear in one of the 16 tokens. In the case of the GATE_5 embodiment, only 16/26=62% of the time will one of the pins in the user's passcode appear in one of the 16 tokens. There is a probability that all of the pins in a user's passcode may appear in the token table, and it is guaranteed that at least one user pin will be present in the token table. Most of the time, some of the pins in the user's passcode will be missing, and some will appear in the tokens. In alternative embodiments, the rules could be modified so that at least 2 or 3 of the pins in a user's passcode will be present in the token table.

It is this uncertainty that makes the present invention effective. If the login process is peeked or intercepted, the only thing that is certain to the hacker is the length of the passcode, because if user enters more or less tokens than the passcode length, login will fail. The only thing that will lead to, but not guarantee, a successful login is entering the same number of tokens as pins in the user's passcode.

However, even if a hacker learns how long the passcode is, the hacker will not be able to determine the identity of the individual pins. This is because, even though a pin may not necessarily appear in one of the 16 tokens, the user can still successfully login. This is because, as indicated in the token selection rules of FIG. 6, the user can pick a random token for a pin that is not present in one of the tokens that are presented.

Further, even if all the pins in the user passcode appear in the 16 tokens, the hacker still will not be able to tell which symbol in each token is a pre-selected pin, because there are 4 symbols in the GATE_4 embodiment, and 5 symbols in the GATE_5 embodiment. This uncertainty makes this system and method of the present invention peek and interception proof.

As shown in the token selection rules listed in FIG. 6, the rules for selecting a valid token can be summarized as follows:

A user must select N tokens from the token table, corresponding to the N pins in the user's passcode. Thus, if the user's passcode has 4 pins, the user selects 4 tokens. Similarly, if the user's passcode has 6 pins, the user must select 6 tokens.

If a user's pin appears in one of the 16 tokens, the user must select that token to enter the pin.

If one of the pins in the user's passcode is not present in any of the 16 tokens, the user must select any one of the 16 tokens for that pin (hereinafter referred to as a "wildcard token").

As discussed above, FIG. 7 is a table listing exemplary token validation rules used by the authentication/encryption module 110, in accordance with one embodiment of the present invention. These rules are for validating the tokens the user selected in the login process. For example, the rules determine whether the number of tokens entered by the user equals the length of the user's passcode. If not, the user login will fail. If so, then the rules require checking each pin in the user's passcode to see if it is in one of the 16 tokens. If one of the pins in the user's passcode is not present in one of the tokens, the user must select a random token. If a pin in the user's passcode does appear in one of the tokens, the user must select that token.

FIG. 8A is a sample screenshot of an empty registration screen for entering a user id, per step 310 of FIG. 3, in accordance with one embodiment of the present invention. The figure shows an example of how the GATE_4 embodiment's registration screen can appear before a user enters a user id.

FIG. 8B is a sample screenshot of a frame of execution of the registration process to create user id presented by the system 100, in accordance with one embodiment of the present invention. It shows one example of how the GATE_4 embodiment screen may look like as the user goes through the registration (create user id) process of FIG. 3 as follows:

The user enters a new user id: "admin" (G4 206), then clicks on the "Check Availability" button (G4 208). The system checks to see if the ID "admin" is already in its memory (step 320 of FIG. 3). If so, it will display a dialog (not shown) that asks: "User Id already exist, do you want to overwrite existing passcode?" If the user does not want to overwrite the old passcode, the process will close the dialog and wait for the user to enter another user id. If user id "admin" does not exist, or if it exists, but user wants to overwrite the existing passcode, the system will enable the buttons in G4 212, G4 222, G4 232 and G4 242, which each has 36 symbols from a predefined dimension, as shown in FIG. 2A. For example, G4 212 includes all the 36 numbers from the 1st dimension, and those symbols will show up in a token at the "[1]" (upper left) position as shown in G4 210 (the numbers are from 1 to 36). G4 222 has 36 symbols from "Ⓐ" to "?" and they will show up in any token at the "[2]" (G4 220: upper right) position. G4 232 has 36 symbols from "○" to "° F.", which will show up at the "[3]" (G4 230: lower left) position in a token, and G4 242 shows 36 symbols from "+" to "ⓤ" and they will show up in any token at the "[4]" (G4 240: lower right) position. At this stage of the process, the system will enable the above buttons in G4 212, G4 222, G4 232 and G4 242, so that the user can click any one of them. As a comparison, in FIG. 8A those buttons are not enabled and look pale, because the user has not yet entered a user id. Without a user id, the user is not allowed to create a passcode.

User clicks on "Ⓘ" among the symbols in G4 222 to select first pin, and it shows up at G4 250 (step 350 of FIG. 3).

User clicks on "♥" among the symbols in G4 232 to select second pin, and it shows up at G4 252 (step 350 of FIG. 3).

User clicks on "2" among the symbols in G4 212 to select third pin, and it shows up at G4 254 (step 350 of FIG. 3).

User clicks on "✉" among the symbols in G4 242 to select fourth pin, and it shows up at G4 256 (step 350 of FIG. 3).

In this example user chose to have 4 pins in the passcode, so the passcode length is 4.

In this example positions G4 258 and G4 260 are left blank

User then finishes the user id creation (registration) process by clicking the "Save" button—G4 270 (step 370 of FIG. 3). The system will save the passcode "Ⓘ♥ 2 ✉" with the user id "admin" into memory (step 380 of FIG. 3).

As discussed above, the dimensional options are not restricted to the symbols shown in example of FIG. 8B. The dimensional options may include any other symbols. There are 4 user pins in the exemplary embodiment described above, however, any number of pins may be used while still falling within the scope of the present invention. If the number of pins is too low, the passcode will be too vulnerable. If the number of pins is too high, the user may not remember the passcode. Accordingly, a preferred length is between 4 and 6 pins.

FIG. 9A is a sample screenshot of a frame of execution of the login screen presented by the system 100, in accordance with one embodiment of the present invention, before the user enters any information. FIG. 9A is used as a comparison to FIG. 9B.

FIG. 9B is a sample screenshot of a frame of execution of the login process executed by the system 100, in accordance with one embodiment of the present invention. It shows one example of how the GATE_4 embodiment screen may look like as the user goes through the login process of FIG. 4 as follows:

The user enters a user id: "admin" (G4 306) (step 410 of FIG. 4).

User clicks on "Enter" button (G4 309). The system checks to see if the id "admin" is already in its memory (step 420 of FIG. 4), if it does not exist, it will display a message (not shown) showing "User Id does not exist, please enter a valid User Id". If it exists, the system will display a 4×4 table (G4 320). To better describe the table, the rows are preferably marked from top to bottom as follows: A, B, C, D. The columns are also preferably marked from left to right as follows: 1, 2, 3, 4. The tokens in this table are generated according to the rules described in FIG. 5.

Since we know from FIG. 8B that the passcode associated with user id "admin" is: "Ⓘ ♥ 2 ✉", the user needs to begin by going through the 16 tokens in the table to find the first pin: "Ⓘ". Because the symbol Ⓘ belongs to the 2nd dimension, in this example it appears in the upper right position of any token, so user only needs to scan the upper right portion of each token to see if Ⓘ exists. In this example, it is in the token D2. This screenshot was taken in demo mode, and in demo mode the program highlights the matching symbol for the user to better understand the process. In real time, this does not need to be highlighted. In this illustration, the Ⓘ in D2 is highlighted. Since it is found in the D2 token, the user must click on this token according to the rules described in FIG. 6.

After user clicks on D2, the token is copied to the first position of the passcode (G4 350) (step 440 of FIG. 4).

The second pin in user passcode is: "♥", and this symbol belongs to the 3rd dimension. In this example, the 3rd dimension symbols appear in the lower left side of any token. Thus, the user only needs to look at the lower left side of each of the 16 tokens. In this example, it is in token D3. Thus, the user should click on D3 (step 440 of FIG. 4). It is highlighted in this illustration.

After the user clicks on D3 (step 440 of FIG. 4), the token is copied to the second position of the passcode (G4 353).

The third pin in the passcode is "2", and it belongs to the 1st dimension. Thus, in this example, the user only needs to look at the upper left position of each of the 16 tokens. In this example, it does not exist. According to token selection rules (FIG. 6), the user can and must selects a wildcard token (any token) for that pin's position. In this example, the user randomly clicks on token C3. That token is copied to the 3rd pin position—G4 356.

The fourth and last pin is "✉", and this symbol belongs to the 4th dimension. 4th dimension symbols in this example appear in the lower right side of any token. Thus, the user only needs to check the lower right side of each of the 16 tokens. In this example, it is in token B3, so the user needs to click on B3 (step 440 of FIG. 4). In this illustration, it is highlighted. After user clicks on B3, the token is copied to the 4th position of the passcode (G4 359).

Since there are only 4 pins in the passcode, positions G4 362 and G4 365 are left blank, and they should remain blank. If the user enters a token in one or both places, the system will deny the user access, because the user entered more tokens then the original 4 pins (step 450 of FIG. 4).

After the user enters all 4 tokens, the user will click on the "Login" (G4 370) button to let the system know the user has finished the token selection process, and the system will check to see if the tokens entered are valid according to the rules described in FIG. 7 (step 450 of FIG. 4).

In this example, the tokens the user entered are valid, and the system displays a "Login Successful" message (G4 380) and grants user access (step 460 of FIG. 4).

FIG. 9C is a sample screenshot of a frame of execution of the login process executed by the system 100 for a failed login process, in accordance with one embodiment of the present invention. It shows one example of how the GATE_4 embodiment screen may look like if the user goes through a failed login process (FIG. 4) as follows:

The user enters a user id: "admin" (G4 307) (step 410 of FIG. 4).

User clicks on "Enter" button (G4 310). The system checks to see if the id "admin" is already in its memory (step 420 of FIG. 4), if it does not exist, it will display a message (not shown) showing "User Id does not exist, please enter a valid User Id". If it exists, the system will display a 4×4 table (G4 321). To better describe the table, the rows are preferably marked from top to bottom as follows: A, B, C, D. The columns are also preferably marked from left to right as follows: 1, 2, 3, 4. The tokens in this table are generated according to the rules described in FIG. 5.

Since we know from FIG. 8B that the passcode associated with user id "admin" is: "Ⓘ ♥ 2 ✉", the user needs to begin by going through the 16 tokens in the table to find the first pin: "Ⓘ". Because the symbol Ⓘ belongs to the 2nd dimension, in this example it appears in the upper right position of any token, so user only needs to scan the upper right portion of each token to see if Ⓘ exists. In this example, it is in the token A1. The user must click on this token according to the rules described in FIG. 6.

After user clicks on A1, the token is copied to the first position of the passcode (G4 351) (step 440 of FIG. 4).

The second pin in the user's passcode is: "♥", and this symbol belongs to the 3rd dimension. In this example, the 3rd dimension symbols appear in the lower left side of any token. Thus, the user only needs to look at the lower left side of each of the 16 tokens. In this example, it is in token D1. Thus, the user should click on D1 (step 440 of FIG. 4). However, in this example the user did not click on this token and, instead, clicked on B4. This is the wrong token, and the system will record this as an error and deny the user access.

After the user clicks on B4 (step 440 of FIG. 4), the token is copied to the second position of the passcode (G4 354).

The third pin in the passcode is "2", and it belongs to the 1st dimension. Thus, in this example, the user only needs to look at the upper left position of each of the 16 tokens. In this example, it does not exist. According to token selection rules (FIG. 6), the user can and must selects a wildcard token (any token) for that pin's position. In this example, the user randomly clicks on token C4. That token is copied to the 3rd pin position—G4 357.

The fourth and last pin is "✉", and this symbol belongs to the 4th dimension. 4th dimension symbols in this example appear in the lower right side of any token. Thus, the user only needs to check the lower right side of each of the 16 tokens. In this example, it is in token A2, so the user needs to click on A2 (step 440 of FIG. 4). After user clicks on A2, the token is copied to the 4th position of the passcode (G4 360).

Since there are only 4 pins in the passcode, positions G4 363 and G4 366 are left blank, and they should remain blank. If the user enters a token in one or both places, the system will deny the user access, because the user entered more tokens then the original 4 pins (step 450 of FIG. 4).

After the user enters all 4 tokens, the user will click on the "Login" (G4 371) button to let the system know the user has finished the token selection process, and the system will check to see if the tokens entered are valid according to the rules described in FIG. 7 (step 450 of FIG. 4).

In this example, the tokens the user entered are invalid, and the system displays a "Login Failed" message (G4 381) and denies access to the user (step 470 of FIG. 4).

FIG. 9D is a sample screenshot of a frame of execution of the login process executed by the system 100 for another failed login process, in accordance with one embodiment of the present invention. It shows one example of how the GATE_4 embodiment screen may look like if the user goes through a failed login process (FIG. 4) as follows:

The user enters a user id: "admin" (G4 308) (step 410 of FIG. 4).

User clicks on "Enter" button (G4 311). The system checks to see if the id "admin" is already in its memory (step 420 of FIG. 4), if it does not exist, it will display a message (not shown) showing "User Id does not exist, please enter a valid User Id". If it exists, the system will display a 4×4 table (G4 322). To better describe the table, the rows are preferably marked from top to bottom as follows: A, B, C, D. The columns are also preferably marked from left to right as follows: 1, 2, 3, 4. The tokens in this table are generated according to the rules described in FIG. 5.

Since we know from FIG. 8B that the passcode associated with user id "admin" is: "Ⓘ ♥ 2 ✉", the user needs to begin by going through the 16 tokens in the table to find the first pin: "Ⓘ". Because the symbol Ⓘ belongs to the 2nd dimension, in this example it appears in the upper right position of any token, so user only needs to scan the upper right portion of each token to see if Ⓘ exists. In this example, it is in the token B2. The user must click on this token according to the rules described in FIG. 6.

After user clicks on B2, the token is copied to the first position of the passcode (G4 352) (step 440 of FIG. 4).

The second pin in user passcode is: "♥", and this symbol belongs to the 3rd dimension. In this example, the 3rd dimension symbols appear in the lower left side of any token. Thus, the user only needs to look at the lower left side of each of the 16 tokens. In this example, it does not exist. According to token selection rules (FIG. 6), the user can and must selects a wildcard token (any token) for that pin's position. In this example, the user randomly clicks on token A4. That token is copied to the 2nd pin position—G4 355.

The third pin in the passcode is "2", and it belongs to the 1st dimension. Thus, in this example, the user only needs to look at the upper left position of each of the 16 tokens. In this example, it is in token B3. In this example, the user clicks on B3 and that token is copied to the 3rd pin position—G4 358.

The fourth and last pin is "✉", and this symbol belongs to the 4th dimension. 4th dimension symbols in this example appear in the lower right side of any token. Thus, the user only needs to check the lower right side of each of the 16 tokens. In this example, it is in token D1, so the user needs to click on D1 (step 440 of FIG. 4). After user clicks on D1, the token is copied to the 4th position of the passcode (G4 361).

Since there are only 4 pins in the passcode, positions G4 364 and G4 367 should be left blank. In this example, the user entered an extra token D2, and the system will therefore deny access to the user, because the user entered more than the original 4 pins.

After the user enters all 5 tokens, the user will click on the "Login" (G4 372) button to let the system know the user has finished the token selection process, and the system will check to see if the tokens entered are valid according to the rules described in FIG. 7 (step 450 of FIG. 4).

In this example, the user entered too many tokens, and the system displays a "Login Failed" message (G4 382) and denies access to the user (step 470 of FIG. 4).

FIG. 10A is a sample screenshot of the user login process in the GATE_4 embodiment in text format. It reflects an empty screen when the programs starts. This image is used as a basis of comparison for FIGS. 10B, 10C and 10D below. This screen is only shown as an explanation of what happens behind the scenes. It is not shown during real-time user login.

FIG. 10B is a sample screenshot of the user login process in the GATE_4 embodiment in text format. It shows what happens behind the scenes when the user login process of FIG. 9B is taking place and it shows what the process flow of FIG. 4 looks like in a sample embodiment. This is only a demo and is not shown during real-time user login. It is used to visually illustrate the token validation rules shown in FIG. 7.

There are 3 columns: "Client Side" (left side), "Network Connection" (middle), and "Server Side" (right side). The process starts from the Client Side when the user enters the user id, then the info passes through the Network Connection to the Server Side. The Server generates 16 tokens and passes them to the Network, then the tokens are passed to the Client Side.

The user selects the tokens in accordance with the token selection rules shown in FIG. 6. The selected tokens are passed to the Network, then passed to the Server Side to be validated, the result of granting or denying access is passed through the Network to the Client Side. The process flow is marked by arrows in FIG. 10B. A more detailed explanation is provided below.

The user enters a user id: "admin" (G4 406).

User clicks on "Enter" button (G4 409).

User id "admin" (G4 406) is shown on the Client Side (G4 411) and passed (G4 421) to the Network Connection (G4 413), then it is passed again (G4 422) to the Server Side (G4 415).

On the Server Side the system checks its memory to see if user id "admin" exists, if it does not, the system will show a message: "User Id does not exist, please enter a valid User Id" (not shown). The same example from FIG. 8B is used, the passcode in memory is: "Ⓘ ♥ 2 ✉", the system finds it in memory (G4 417).

The system generates 16 tokens (G4 423) in accordance with the token generation rules shown in FIG. 5.

The 16 tokens are passed (G4 424) to the Network.

The Network passes (G4 425) the tokens to the Client Side.

The 16 tokens are displayed on the user login screen, as shown in FIG. 9B, in a 4×4 table (G4 320 in FIG. 9B).

The user selects (G4 426) the 4 tokens: G4 350, G4 353, G4 356 and G4 359.

The 4 user selected tokens are passed (G4 427) to the Network after user clicks “Login” (G4 370 in FIG. 9B).

The 4 user selected tokens are then passed (G4 428) to the Server Side.

On the Server Side, the system checks all the 4 tokens one by one: C11, C12, C13 and C14, in this example they are all correct.

The above result of a successful login (G4 429) is passed (G4 430) to the Network.

The Network passes (G4 431) the result to the Client Side and displays (G4 432) a message shown in G4 380 of FIG. 9B.

FIG. 10C is a sample screenshot of the user login process in the GATE_4 embodiment in text format. It shows what happens behind the scenes when the user login process of FIG. 9C is taking place and it shows what the process flow of FIG. 4 looks like in a sample embodiment. This is only a demo and is not shown during real-time user login. It is used to visually illustrate the token validation rules shown in FIG. 7.

There are 3 columns: “Client Side” (left side), “Network Connection” (middle), and “Server Side” (right side). The process starts from the Client Side when the user enters the user id, then the info passes through the Network Connection to the Server Side. The Server generates 16 tokens and passes them to the Network, then the tokens are passed to the Client Side.

The user selects the tokens in accordance with the token selection rules shown in FIG. 6. The selected tokens are passed to the Network, then passed to the Server Side to be validated, the result of granting or denying access is passed through the Network to the Client Side. The process flow is marked by arrows in FIG. 10C. A more detailed explanation is provided below.

The user enters a user id: “admin” (G4 506).

User clicks on “Enter” button (G4 509).

User id “admin” (G4 506) is shown on the Client Side (G4 511) and passed (G4 521) to the Network Connection (G4 513), then it is passed again (G4 522) to the Server Side (G4 515).

On the Server Side the system checks its memory to see if user id “admin” exists, if it does not, the system will show a message: “User Id does not exist, please enter a valid User Id” (not shown). The same example from FIG. 8B is used, the passcode in memory is: “Ⓘ♥2✉”, the system finds it in memory (G4 517).

The system generates 16 tokens (G4 523) in accordance with the token generation rules shown in FIG. 5.

The 16 tokens are passed (G4 524) to the Network.

The Network passes (G4 525) the tokens to the Client Side.

The 16 tokens are displayed on the user login screen, as shown in FIG. 9C, in a 4×4 table (G4 321 in FIG. 9C).

The user selects (G4 526) the 4 tokens: G4 351, G4 354, G4 357 and G4 360.

The 4 user selected tokens are passed (G4 527) to the Network after user clicks “Login” (G4 371 in FIG. 9C).

The 4 user selected tokens are then passed (G4 528) to the Server Side.

On the Server Side, the system checks all the 4 tokens one by one: C21, C22, C23 and C24, in this example the 2nd token is incorrect (because the second pin “V” exists in the D1 token, but the user selected the B4 token which was wrong. Therefore the result is a failed login).

The above result of a failed login (G4 529) is passed (G4 530) to the Network.

The Network passes (G4 531) the result to the Client Side and displays (G4 532) a message shown in G4 381 of FIG. 9C.

FIG. 10D is a sample screenshot of the user login process in the GATE_4 embodiment in text format. It shows what happens behind the scenes when the user login process of FIG. 9D is taking place and it shows what the process flow of FIG. 4 looks like in a sample embodiment. This is only a demo and is not shown during real-time user login. It is used to visually illustrate the token validation rules shown in FIG. 7.

There are 3 columns: “Client Side” (left side), “Network Connection” (middle), and “Server Side” (right side). The process starts from the Client Side when the user enters the user id, then the info passes through the Network Connection to the Server Side. The Server generates 16 tokens and passes them to the Network, then the tokens are passed to the Client Side.

The user selects the tokens in accordance with the token selection rules shown in FIG. 6. The selected tokens are passed to the Network, then passed to the Server Side to be validated, the result of granting or denying access is passed through the Network to the Client Side. The process flow is marked by arrows in FIG. 10D. A more detailed explanation is provided below.

The user enters a user id: “admin” (G4 606).

User clicks on “Enter” button (G4 609).

User id “admin” (G4 606) is shown on the Client Side (G4 611) and passed (G4 621) to the Network Connection (G4 613), then it is passed again (G4 622) to the Server Side (G4 615).

On the Server Side the system checks its memory to see if user id “admin” exists, if it does not, the system will show a message: “User Id does not exist, please enter a valid User Id” (not shown). The same example from FIG. 8B is used, the passcode in memory is: “Ⓘ♥2✉”, the system finds it in memory (G4 617).

The system generates 16 tokens (G4 623) in accordance with the token generation rules shown in FIG. 5.

The 16 tokens are passed (G4 624) to the Network.

The Network passes (G4 625) the tokens to the Client Side.

The 16 tokens are displayed on the user login screen, as shown in FIG. 9D, in a 4×4 table (G4 322 in FIG. 9D).

The user selects (G4 626) the 5 tokens: G4 352, G4 355, G4 358, G4 361 and G4 364.

The 5 user selected tokens are passed (G4 627) to the Network after user clicks “Login” (G4 372 in FIG. 9D).

The 5 user selected tokens are then passed (G4 628) to the Server Side.

On the Server Side, the system checks all the 5 tokens one by one: C31, C32, C33, C34 and C35, in this example the 5$^{th}$ token is incorrect (Because the passcode has only 4 pins, but the user entered a 5th token, that was wrong. Therefore the result is a failed login).

The above result of a failed login (G4 629) is passed (G4 630) to the Network.

The Network passes (G4 631) the result to the Client Side and displays (G4 632) a message shown in G4 382 of FIG. 9D.

FIG. 11A is a sample screenshot of the user id creation (registration) process in the GATE_5 embodiment. It reflects an empty screen when the programs starts. This image is used as a basis of comparison for FIG. 11B below.

FIG. 11B is a sample screenshot of the user id creation (registration) process in the GATE_5 embodiment. It shows where each dimension of symbols are located in a token. It also reflects how a user creates a new user id, and how a user selects and saves pins to form a passcode associated with the user id. The process proceeds as follows:

- User enters a new user id: "admin" (G5 206), then click on "Check Availability" button (G5 208). The system checks to see if the id "admin" is already in its memory, if so it will display a dialog (not shown) that asks: "User Id already exist, do you want to overwrite existing passcode?" If user doesn't want to overwrite old passcode, the process will close the dialog and wait for user to enter another user id. If user id "admin" doesn't exist, or if it exists, but user wants to overwrite the existing passcode, the system will enable the buttons in G5 212, G5 222, G5 232, G5 242 and G5 248, each has 26 symbols from a predefined dimension as described in FIG. 2B.
  - For example, G5 212 includes all the 26 symbols from 1st dimension, those symbols will show up in a token at the "[1]" (upper left) position as shown in G5 210. The 26 symbols are from "Ⓐ" to "Ⓩ". G5 222 shows 26 symbols from "a" to "ϟ", they are from the 2nd dimension and they will show up in any token at the "[2]" (G5 220: upper right) position. G5 232 shows 26 numbers from 1 to 26, they are from the 3rd dimension which will show up at the "[3]" (G5 230: in the middle) position in a token, and G5 242 shows 26 symbols from "○" to "≠", they are from the 4th dimension and they will show up in any token at the "[4]" (G5 240: lower left) position. G5 248 shows 26 symbols from "+" to "ᥓ", they are from the 5th dimension and they will show up in any token at the "[5]" (G5 246: lower right) position.
  - At this time in the process, the system will enable the above buttons in G5 212, G5 222, G5 232, G5 242 and G5 248, so that user can click on any of them. As a comparison, in FIG. 11A those buttons are not enabled, and look pale, because user has not entered any user id yet. Without a user id, it won't allow user to select any pin.
- User clicks on "$" among the symbols in G5 248 to select first pin, and it shows up at G5 250.
- User clicks on "=" among the symbols in G5 242 to select second pin, and it shows up at G5 252.
- User clicks on "Ⓜ" among the symbols in G5 212 to select third pin, and it shows up at G5 254.
- User clicks on "Ⓒ" among the symbols in G5 212 to select fourth pin, and it shows up at G5 256.
- User clicks on "2" among the symbols in G5 232 to select fifth pin, and it shows up at G5 258.
- User clicks on "☺" among the symbols in G5 242 to select sixth pin, and it shows up at G5 260.
- In this example user chose to have 6 pins in his passcode, so his passcode's length is 6.
- User then finishes the user id creation (registration) process by clicking "Save" button (G5 270). The system will save the passcode "$=Ⓜ Ⓒ 2 ☺" with the user id "admin" into memory.

FIG. 12A is a sample screenshot of the user login process in the GATE_5 embodiment. It reflects an empty screen when the programs starts. This image is used as a basis of comparison for FIGS. 12B, 12C and 12D below.

FIG. 12B is a sample screenshot of the user login process in the GATE_5 embodiment. It shows a 4×4 table of 16 tokens from which a user selects the passcode. It reflects how the token selection process works and highlights the symbols in the tokens that a user selects and have user pins in them as part of the user's passcode. It also shows what a successful login may look like. This example process follows the example of FIG. 11B, so the same passcode will be used. The process proceeds as follows:

- User enters a new user id: "admin" (G5 306).
- User clicks on "Enter" button (G5 309). The system checks to see if the id "admin" is already in its memory, if it doesn't exist, it will display a message (not shown) showing "User Id doesn't exist, please enter a valid User Id". If it exists, the system will display a 4×4 table (G5 320), to better describe the table, the rows are marked from top to bottom: A,B,C,D. the columns are also marked from left to right: 1,2,3,4. The tokens in this table are generated according to the rules described in FIG. 5.
- Since we know from FIG. 11B that the passcode associated with user id "admin" is: "$=Ⓜ Ⓒ 2 ☺", so the user needs to begin by going through the 16 tokens in the table to find the first pin: "$"
  - Because the symbol $ belongs to the 5th dimension, it will only appear in the lower right position of any token, so user only needs to scan the lower right portion of each token to see if $ exists. In our example, it is in the token B4, the screen is taken in demo mode, and in demo mode the program highlights the matching symbol for user to better understand the process. In real time, it will not be highlighted. In our case, the $ in B4 is highlighted, since it is found in the B4 token, user must click on this token according to the rules described in FIG. 6.
- After user clicks on B4, the token is copied to the first position of the passcode (G5 350).
- The second pin in user passcode is: "=", and this symbol belongs to the 4th dimension, 4th dimension symbols only appear in the lower left side of any token, so user only needs to look at the lower left side of each of the 16 tokens, in our case it's in token D2, so user should click on D2. It is highlighted in the screenshot.
- After user clicks on D2, the token is copied to the second position of the passcode (G5 353).
- The third pin in passcode is: "Ⓜ", and it belongs to the 1st dimension, so user only needs to look at the upper left position of each of the 16 tokens, in our case it's in token D4, so user should click on D4. It is highlighted in the screenshot.
- After user clicks on D4, the token is copied to the third position of the passcode (G5 356).
- The fourth pin is: "Ⓒ", and this symbol belongs to the 1st dimension, 1st dimension symbols only appear in the upper left side of any token, so user only needs to check the upper left side of each of the 16 tokens, in our case it doesn't exist, according to token selection rules, user can and must select a wildcard token (any token) in that pin's position, so user clicks on a random token A4, that token is copied to the 4th pin position G5 359.
- The fifth pin in passcode is: "2", and it belongs to the 3rd dimension, so user only needs to look at the center of each of the 16 tokens, in our case it's in token D2, so user should click on D2. It is highlighted in the screenshot. After user click, the token is copied to the 5th position of the passcode (G5 362).
- The sixth and last pin is: "☺", and this symbol belongs to the 4th dimension, 4th dimension symbols only appear in the lower left side of any token, so user only needs to check the lower left side of each of the 16 tokens, in our case it's in token A4, so user needs to click on A4.

It is also highlighted by the demo program. After user click, the token is copied to the 6th and last position of the passcode (G5 365).

After user enters all 6 tokens, he will click on "Login" (G5 370) button to let the system know he has finished the token selection process, and the system will check to see if the tokens entered are valid according to the rules described in FIG. 7.

In this example, the tokens user entered are valid, and the system displayed a "Login Successful" message and granted user access (G5 380).

In this example, tokens at G5 353 and G5 362 are the same, so are tokens at G5 359 and G5 365, it's just coincidence, situations like this might happen quite often. This might very well confuse anyone who is trying to guess the passcode.

FIG. 12C is a sample screenshot of the user login process in the GATE_5 embodiment. It shows a 4×4 table of 16 tokens from which a user selects the passcode. It reflects how the token selection process works. It also shows what a failed login with 3 wrong pins may look like. This example process follows the example of FIG. 11B, so the same passcode will be used. The process proceeds as follows:

User enters a user id: "admin" (G5 307).

User clicks on "Enter" button (G5 310). The system checks to see if the id "admin" is already in its memory, if it doesn't exist, it will display a message (not shown) showing "User Id doesn't exist, please enter a valid User Id". If it exists, the system will display a 4×4 table (G5 321), to better describe the table, the rows are marked from top to bottom: A,B,C,D. the columns are also marked from left to right: 1,2,3,4. The tokens in this table are generated according to the rules described in FIG. 5.

Since we know from FIG. 11B that the passcode associated with user id "admin" is: "$=Ⓜ Ⓒ 2 ☺", so the user needs to begin by going through the 16 tokens in the table to find the first pin: "$"

Because the symbol $ belongs to the 5th dimension, it will only appear in the lower right position of any token, so user only needs to scan the lower right portion of each token to see if $ exists. In our example, it is in the token A2, user must click on this token according to the rules described in FIG. 6.

After user clicks on A2, the token is copied to the first position of the passcode (G5 351).

The second pin in user passcode is: "=", this symbol belongs to the 4th dimension, and 4th dimension symbols only appear in the lower left side of any token, so user only needs to look at the lower left side of each of the 16 tokens, in our case it doesn't exist, according to token selection rules, user can and must select a wildcard token (any token) in that pin's position, so user clicks on a random token A3.

After user clicks on A3, the token is copied to the second position of the passcode (G5 354).

The third pin in passcode is: "Ⓜ", and it belongs to the 1st dimension, so user only needs to look at the upper left position of each of the 16 tokens, in our case it is in token C1, user needs to click on C1. In our case user does click on C1.

After user clicks on C1, the token is copied to the third position of the passcode (G5 357).

The fourth pin is: "Ⓒ", and this symbol belongs to the 1st dimension, user only needs to look at the upper left position of each of the 16 tokens, in our case it is in token D2, user needs to click on D2. In our case user did not click on D2, instead user clicked on C2. This is wrong and the system will deny user access.

After user clicks on C2, the token is copied to the 4th position of the passcode (G5 360).

The fifth pin in passcode is: "2", and it belongs to the 3rd dimension, so user only needs to look at the center of each of the 16 tokens, in our case it is in token C3, and according to the token selection rules in FIG. 6 user must select this token, but in the example user selected token B2 instead, this is wrong, and the system will check and notice.

After user clicks on the wrong token B2, it is copied to the 5th position of the passcode (G5 363).

The sixth and last pin is: "☺", and this symbol belongs to the 4th dimension, 4th dimension symbols only appear in the lower left side of any token, so user only needs to check the lower left side of each of the 16 tokens, in our case it's in token D1, user needs to click on D1. In our case user didn't click on D1, instead user clicked on token C4, this is wrong and the system will notice it.

After user clicks on the wrong token C4, it is copied to the 6th position of the passcode (G5 366).

After user enters all 6 tokens, he clicks on "Login" (G5 371) button to let the system know he has finished the token selection process, and the system will check to see if the tokens entered are valid according to the rules described in FIG. 7.

In this example, the tokens user entered are invalid, and the system displayed a "Login Failed" message and denied user access (G5 381).

FIG. 12D is a sample screenshot of the user login process in the GATE_5 embodiment. It shows a 4×4 table of 16 tokens from which a user selects the passcode. It reflects how the token selection process works. It also shows what a failed login with a missing pin may look like. This example process follows the example of FIG. 11B, so the same passcode will be used. The process proceeds as follows:

User enters a user id: "admin" (G5 308).

User clicks on "Enter" button (G5 311). The system checks to see if the id "admin" is already in its memory, if it doesn't exist, it will display a message (not shown) showing "User Id doesn't exist, please enter a valid User Id". If it exists, the system will display a 4×4 table (G5 322), to better describe the table, the rows are marked from top to bottom: A,B,C,D. the columns are also marked from left to right: 1,2,3,4. The tokens in this table are generated according to the rules described in FIG. 5.

Since we know from FIG. 11B that the passcode associated with user id "admin" is: "$=Ⓜ Ⓒ 2 ☺", so the user needs to begin by going through the 16 tokens in the table to find the first pin: "$"

Because the symbol $ belongs to the 5th dimension, it will only appear in the lower right position of any token, user only needs to scan the lower right portion of each token to see if $ exists. In our example, it doesn't exist, user can and must select a wildcard token (any token) in that pin's position, so user clicks on a random token D3.

After user clicks on D3, the token is copied to the first position of the passcode (G5 352).

The second pin in user passcode is: "=", this symbol belongs to the 4th dimension, 4th dimension symbols only appear in the lower left side of any token, so user only needs to look at the lower left side of each of the 16 tokens, in our case it is in token C1, user must click on this token.

After user clicks on C1, the token is copied to the second position of the passcode (G5 355).

The third pin in passcode is: "Ⓜ", and it belongs to the 1st dimension, so user only needs to look at the upper left position of each of the 16 tokens, in our case it is in token A1, so user needs to click on A1. In our case user does click on A1.

After user clicks on A1, the token is copied to the third position of the passcode (G5 358).

The fourth pin is: "Ⓒ", and this symbol belongs to the 1st dimension, user only needs to look at the upper left position of each of the 16 tokens, in our case it is in token D3, so user needs to click on D3. In our case user did click on D3.

After user clicks on D3, the token is copied to the 4th position of the passcode (G5 361).

The fifth pin in passcode is: "2", and it belongs to the 3rd dimension, user only needs to look at the center of each of the 16 tokens, in our case it is in token C4, and according to the token selection rules in FIG. 6 user must select this token, and in the example user did select token C4.

After user clicks on the token C4, it is copied to the 5th position of the passcode (G5 364).

The sixth and last pin is: "☺", and this symbol belongs to the 4th dimension, and 4th dimension symbols only appear in the lower left side of any token, so user only needs to check the lower left side of each of the 16 tokens, in our case it is in token C2, so user needs to click on C2. But in our case user didn't click on C2, instead user left the last position blank and only entered 5 pins. This is wrong.

After user enters the above 5 tokens, he clicked on "Login" (G5 372) button to let the system know he has finished the token selection process, and the system will check to see if the tokens entered are valid according to the rules described in FIG. 7.

In this example, the tokens user entered are invalid, because the original passcode had 6 pins, but the user in our example only entered 5 tokens, so user request for access was denied and the system displayed a "Login Failed" message (G5 382).

FIG. 13A is a sample screenshot of the user login process in the GATE_5 embodiment in text format. It reflects an empty screen when the programs starts. This image is used as a basis of comparison for FIGS. 13B, 13C and 13D below. This screen is only shown as an explanation of what happens behind the scenes. It is not shown during real-time user login.

FIG. 13B is a sample screenshot of the user login process in the GATE_5 embodiment in text format. It shows what happens behind the scenes when the user login process of FIG. 12B is taking place and it shows what the process flow of FIG. 4 looks like in a sample embodiment. This is only a demo and is not shown during real-time user login. It is used to visually illustrate the token validation rules shown in FIG. 7.

There are 3 columns: "Client Side" (left side), "Network Connection" (middle), and "Server Side" (right side). The process starts from the Client Side when user enters user id, then the info passes through the Network Connection to the Server Side. The Server generates 16 tokens and passes them to the Network, then the tokens are passed to the Client Side.

The user selects the tokens according to the token selection rules shown in FIG. 6, then the selected tokens are passed to the Network then passed to the Server Side to be validated. The result of granting or denying access is passed through the Network to the Client Side. The process flow is marked by arrows in FIG. 13B. The process proceeds as follows:

User enters user id "admin" (G5 406).

User clicks on "Enter" (G5 409).

User id "admin" (G5 406) is shown on the Client Side (G5 411) and passed (G5 421) to the Network Connection (G5 413), then it is passed again (G5 422) to the Server Side (G5 415).

On the Server Side the system checks its memory to see if user id "admin" exists, if it doesn't, the system will show a message: "User Id doesn't exist, please enter a valid User Id" (not shown). The same example as FIG. 11B is used, so the passcode in memory is: "$=Ⓜ Ⓒ 2 ☺", the system finds it in memory (G5 417).

The system generates 16 tokens (G5 423) according to FIG. 5.

The 16 tokens are passed (G5 424) to the Network.

The Network passed (G5 425) the tokens to the Client Side.

The 16 tokens are displayed on the user login screen, as shown in FIG. 12B, in a 4×4 table (G5 320).

The user selects (G5 426) the 6 tokens: G5 350, G5 353, G5 356, G5 359, G5 362 and G5 365.

The 6 user selected tokens are passed (G5 427) to the Network after user clicks "Login" (G5 370) in FIG. 12B.

The 6 user selected tokens are then passed (G5 428) to the Server Side.

On the Server Side, the system checks all 6 tokens one by one: K11, K12, K13, K14, K15 and K16, in our example they are all correct.

The above result of a successful login (G5 429) is passed (G5 430) to the Network.

The Network passes (G5 431) the result to the Client Side and displays (G5 432) a message shown in FIG. 12B's G5 380.

FIG. 13C is a sample screenshot of the user login process in the GATE_5 embodiment in text format. It shows what happens behind the scenes when the user login process of FIG. 12C is taking place and it shows what the process flow of FIG. 4 looks like in a sample embodiment. This is only a demo and is not shown during real-time user login. It is used to visually illustrate the token validation rules shown in FIG. 7.

There are 3 columns: "Client Side" (left side), "Network Connection" (middle), and "Server Side" (right side). The process starts from the Client Side when the user enters the user id, then the info passes through the Network Connection to the Server Side. The Server generates 16 tokens and passes them to the Network, then the tokens are passed to the Client Side.

The user selects the tokens in accordance with the token selection rules shown in FIG. 6. The selected tokens are passed to the Network, then passed to the Server Side to be validated, the result of granting or denying access is passed through the Network to the Client Side. The process flow is marked by arrows in FIG. 13C. A more detailed explanation is provided below.

The user enters a user id: "admin" (G5 506).

User clicks on "Enter" button (G5 509).

User id "admin" (G5 506) is shown on the Client Side (G5 511) and passed (G5 521) to the Network Connection (G5 513), then it is passed again (G5 522) to the Server Side (G5 515).

On the Server Side the system checks its memory to see if user id "admin" exists, if it does not, the system will show a message: "User Id does not exist, please enter a valid User Id" (not shown). The same example from FIG. 11B is used, the passcode in memory is: "$=Ⓜ © 2 ☺", the system finds it in memory (G5 517).

The system generates 16 tokens (G5 523) in accordance with the token generation rules shown in FIG. 5.

The 16 tokens are passed (G5 524) to the Network.

The Network passes (G5 525) the tokens to the Client Side.

The 16 tokens are displayed on the user login screen, as shown in FIG. 12C, in a 4×4 table (G5 321 in FIG. 12C).

The user selects (G5 526) the 6 tokens: G5 351, G5 354, G5 357, G5 360, G5 363 and G5 366.

The 6 user selected tokens are passed (G5 527) to the Network after the user clicks "Login" (G5 371 in FIG. 12C).

The 6 user selected tokens are then passed (G5 528) to the Server Side.

On the Server Side, the system checks all 6 tokens one by one: K21, K22, K23, K24, K25 and K26. In this example the last 3 selected tokens are incorrect (the user needed to select the D2 token, C3 token and D1 token for the 4th, 5th and 6th tokens, respectively, but instead the user selected the C2 token, B2 token and C4 token, which are wrong. Therefore the result is a failed login).

The above result of a failed login (G5 529) is passed (G5 530) to the Network.

The Network passes (G5 531) the result to the Client Side and displays (G5 532) a message shown in G5 381 of FIG. 12C.

FIG. 13D is a sample screenshot of the user login process in the GATE_5 embodiment in text format. It shows what happens behind the scenes when the user login process of FIG. 12D is taking place and it shows what the process flow of FIG. 4 looks like in a sample embodiment. This is only a demo and is not shown during real-time user login. It is used to visually illustrate the token validation rules shown in FIG. 7.

There are 3 columns: "Client Side" (left side), "Network Connection" (middle), and "Server Side" (right side). The process starts from the Client Side when user enters user id, then the info passes through the Network Connection to the Server Side. The Server generates 16 tokens and passes them to the Network, then the tokens are passed to the Client Side.

The user selects the tokens according to the token selection rules shown in FIG. 6, then the selected tokens are passed to the Network then passed to the Server Side to be validated. The result of granting or denying access is passed through the Network to the Client Side. The process flow is marked by arrows in FIG. 13D. The process proceeds as follows:

User enters user id "admin" (G5 606).

User clicks on "Enter" (G5 609).

User Id "admin" (G5 606) is shown on the Client Side (G5 611) and passed (G5 621) to the Network Connection (G5 613), then it is passed again (G5 622) to the Server Side (G5 615).

On the Server Side the system checks its memory to see if user id "admin" exists, if it doesn't, the system will show a message: "User Id doesn't exist, please enter a valid User Id" (not shown). The same example from FIG. 11B is used, thus the passcode in memory is: "$=Ⓜ © 2 ☺", the system finds it in memory (G5 617).

The system generates 16 tokens (G5 623) in accordance to the token generation rules of FIG. 5.

The 16 tokens are passed (G5 624) to the Network.

The Network passed (G5 625) the tokens to the Client Side.

The 16 tokens are displayed on the user login screen, as shown in FIG. 12D, in a 4×4 table (G5 322).

The user selects (G5 626) the 5 tokens: G5 352, G5 355, G5 358, G5 361 and G5 364. Notice G5 367, it says "[ ☺] input missing", that means, the system is expecting the "☺" symbol as the last pin, therefore there should be a 6th token, and yet the input from a 6th token is missing, this is an error and the system will deny user access.

The 5 user selected tokens are passed (G5 627) to the Network after user clicks "Login" (G5 372) in FIG. 12D.

The 5 user selected tokens are then passed (G5 628) to the Server Side.

On the Server Side, the system checks all the 5 tokens one by one: K31, K32, K33, K34 and K35, in our example all the 5 tokens are correct, and yet the 6th token is missing (the user didn't click on C2, and instead user left the last position blank and only entered 5 pins), therefore K36 got an [x] mark which stands for an error. This is wrong. Therefore the result is a failed login.

The above result of a failed login (G5 629) is passed (G5 630) to the Network.

The Network passes (G5 631) the result to the Client Side and displays (G5 632) a message shown in G5 382 of FIG. 12D.

The method can be further extended to use the following feature to make guessing the passcode even more difficult: assign certain number of pins to be "hidden", so that when those hidden pins appear in the selection table, they are not to be selected. Instead, the user must select any other token that does not have these pins, and avoid the tokens that have those pins.

So, for instance, if user has the passcode "123($#)456", the length of the passcode is 8, the 2 pins in the middle are hidden pins shown between "(" and ")". For pins 1, 2, 3, 4, 5, 6 follow the above rules. For "$" and "#", follow the "hidden-pin rules", which are: if none of them appear in any of the 16 tokens, the user can and must select a wildcard token in their place, but if any of them do appear in one of the 16 tokens in the selection table, the user must avoid that pin and select one from any other 15 tokens.

To make a pin a hidden pin, a check box below each pin in the passcode creation (registration) screen can be displayed, so that when the user checks a box below a pin, that pin becomes a hidden pin and, during the token validation process, use the above hidden-pin rules to validate user login.

The present invention can also be used in any communication process to attach a selection table with 16 tokens [generated with a sender passcode following the token generation rules described in FIG. 5] and a key with some tokens along with a message. If that key is valid against that table, then that message is a true message. If the key is invalid against the selection table, then the attached message is a false message. By keeping the true message and dropping the false message, one will get the final [original] correct message. the receiver uses the same passcode to decrypt the message, so the process may proceed like the following examples:

Message_1: I will go home at 7 pm [+token table with 16 tokens+invalid key]→Throw away message Message_2: I will go home at 3 pm [+token table with 16 tokens+valid key]==>I will go home at 3 pm Message_3: We will abandon attack on the 3rd [+token table with 16 tokens+invalid key]→Throw away message Message_4: We will attack at noon on the 3rd [+token table with 16 tokens+valid key]==>We will attack at noon on the 3rd Thus, the correct final message is: I will go home at 3 pm. We will attack at noon on the 3rd.

Message_1: I [+token table with 16 tokens+valid key] ==>I

Message_2: will [+token table with 16 tokens+valid key] ==>will

Message_3: not [+token table with 16 tokens+invalid key]→Throw away message

Message_4: go [+token table with 16 tokens+valid key] ==>go

Thus, the correct final message is: I will go.

Message_1: u [+token table with 16 tokens+invalid key] →Throw away message

Message_2: n [+token table with 16 tokens+invalid key] →Throw away message

Message_3: t [+token table with 16 tokens+valid key] ==>t

Message_4: r [+token table with 16 tokens+valid key] ==>r

Message_5: u [+token table with 16 tokens+valid key] ==>u

Message_6: e [+token table with 16 tokens+valid key] ==>e

Thus, the correct final message is: true.

The present invention can also defeat phishing, which is an attempt to acquire sensitive information such as usernames, passwords, and credit card details, often for malicious reasons, by masquerading as a trustworthy entity in an electronic communication. Because, with the present invention, all the information passed between the user and the server are in the form of tokens, and each token has multiple symbols, no clear user pin is given away.

FIG. 14 is a sample screenshot of a message encryption process using the GATE_4 embodiment. It shows an example of how a plain text message is encrypted with a sender passcode and what the encrypted message may look like. The process proceeds as follows:

Message sender enters a plain text message "secret" at G4 700.

Sender enters a passcode "123" at G4 702 and clicks the "Encrypt" button [G4 703].

The original message "secret" is mixed with some random filler characters and turned into the following result message "sLeQWNcrMfYeMtHQr" as shown in G4 704.

Receiver will use the same passcode "123" [G4 706] on the receiver side to decrypt the message.

FIG. 15A is a sample screenshot of a message decryption process using the GATE_4 embodiment. It shows an example of how an encrypted original message may be successfully decrypted with a receiver passcode. The process proceeds as follows:

Each character in the result message [G4 704] is attached with a 4×4 token table, each token in the table has 4 symbols, each character in the message is also attached to a "key", the key has some tokens in it, the number of tokens in the key might range from 2 to 6.

Receiver uses the same passcode "123" [G4 706] to decrypt the message, the decrypted message is show in G4 704 as highlighted characters. The result decrypted message is "secret" [G4 708].

FIG. 15A shows an example of what it might look like for each character. In the screenshot, the first character in the message "s" [G4 710] is displayed as an example after user clicks on it [G4 710], G4 712 shows that the current displaying character is "s". The 4×4 token table attached to this character is shown in the table G4 714.

The key tokens attached to "s" are also shown as G4 720, G4 722 and G4 724.

The filler characters in the message: L, Q, W, N, M, f, Y, M, H, Q and r are intentionally attached with token tables and keys that are invalid, so they will be invalidated on the receiver side.

In the example shown, the user can click on each character in G4 704 to show its content and key tokens, then click the "Check" button [G4 726] to see if the character is valid. In the screenshot, it shows that the character "s" is valid and the check was successful [G4 730].

FIG. 15B is a sample screenshot of a message decryption process using the GATE_4 embodiment. It shows what happens behind the scenes when the process shown in FIG. 15A is taking place and how a message is validated on the receiver side. The process proceeds as follows:

Message character "s" [G4 750] is encrypted with sender passcode "123" [G4 752] and attached with 16 tokens [G4 754] and a key with some tokens [G4 720, G4 722 and G4 724]. This information is sent to the network [G4 756], then to the receiver [G4 758].

On the receiver side, the same passcode is used "123" [G4 760] to decode the message. The key tokens go through [G4 762] the validation process G4 764, G4 766, to check each key token. From C51, C52 and C53, one can see they are all valid, so a final conclusion is reached [G4 768] that the message is valid [G4 770], as shown in FIG. 15A [G4 730].

FIG. 16A is a sample screenshot of a message decryption process using the GATE_4 embodiment. It shows an example of how an encrypted filler message may be decrypted and recognized as invalid information by a receiver passcode. The process proceeds as follows:

FIG. 16A shows an example of what it might look like for each filler character that is not part of the original message. It shows the content of the second character "L" [G4 711] in the message [G4 704] after the user clicks on it. G4 713 shows that the character is "L". The 4×4 table of 16 tokens attached to this character is shown in G4 715. The 4 key tokens attached to "L" are shown as G4 721, G4 723, G4 725 and G4 727.

Since the character "L" is a filler character and is not part of the original message, the sender intentionally attached it with a 4×4 token table and key that would not validate. One can clearly see that the sender passcode [G4 702] and receiver passcode [G4 706] are the same and has 3 pins "1", "2" and "3", thus a valid key should have no more and no less then 3 tokens. In this example, it has 4 key tokens, so it is invalid and the character "L" should be ignored and would not be part of the final decrypted message.

In the screenshot, when the user clicks the "Check" button G4 726, it shows that the validation process has failed [G4 731].

FIG. 16B is a sample screenshot of a message decryption process using the GATE_4 embodiment. It shows what happens behind the scenes when the process shown in FIG.

16A is taking place and how a filler message is invalidated on the receiver side. The process proceeds as follows:

Message character "L" [G4 751] is encrypted with sender passcode "123" [G4 752] and attached with a 4×4 table of 16 tokens [G4 755] and a key with some tokens [G4 721, G4 723, G4 725 and G4 727]. The above information is sent to the network [G4 757] then to the receiver [G4 759].

On the receiver side, the same passcode is used "123" [G4 760] to decode the message. The key tokens go through [G4 763] the validation process G4 765, G4 767, to check each key token, from C61, C62, C63 and C64. One can see that the last 2 key tokens are invalid.

The 3rd passcode "3" appeared in the 3rd token [G4 790], and it should be selected. However, the 8th token [G4 792] was selected and showed up in the 3rd key token G4 725. This is incorrect.

The sender passcode equals the receiver passcode and has 3 pins, but the attached key has 4 tokens. The last token [G4 727] is also invalid.

A final conclusion is reached [G4 769] that the message is invalid [G4 771], as shown in FIG. 16A [G4 731].

FIG. 17 is a sample screenshot of a message decryption process using the GATE_4 embodiment. It shows an example of how an encrypted original message may not be successfully decrypted by a receiver passcode that is different from the sender passcode. The process proceeds as follows:

User typed in a plain text message "secret" in G4 700, then entered passcode "123" [G4 702] and clicked on the "Encrypt" button [G4 703].

The message is encrypted, sent and received and showed up at G4 705 as: "sLeQWNcrMfYeMtHQr" [G4 705].

Receiver uses passcode "567" [G4 707] to decrypt the message received from the sender, which was encrypted with passcode "123" [G4 702].

The decrypted message is highlighted in G4 705:"ecrQ". The result message is shown as "ecrQ" [G4 709].

The result message is different from the original message from sender: "secret" [G4 700], because the receiver used a different passcode to decrypt the message.

FIG. 18 is a sample screenshot of a message encryption process using the GATE_5 embodiment. It shows an example of how a plain text message is encrypted with a sender passcode and what the encrypted message may look like. The process proceeds as follows:

Message sender enters a plain text message "FYEO" at G5 700.

Sender enters a passcode "123" at G5 702 and clicks the "Encrypt" button [G5 703].

The original message "FYEO" is mixed with some random filler characters and turned into the following result message "FlPRojcYnEbAO" [G5 704].

Receiver will use the same passcode "123" [G5 706] on the receiver side to decrypt the message.

FIG. 19A is a sample screenshot of a message decryption process using the GATE_5 embodiment. It shows an example of how an encrypted original message may be successfully decrypted with a receiver passcode. The process proceeds as follows:

Each character in the received message [G5 704] is attached with a 4×4 token table, each token in the table has 5 symbols, each character in the message is also attached to a "key", the key has some tokens in it, the number of tokens in the key might range from 2 to 6.

Receiver uses the same passcode "123" [G5 706] to decode the message, the decrypted message is show in G5 704 as highlighted characters. The result decrypted message is "FYEO" [G5 708].

FIG. 19A shows an example of what it might look like for each character. In the screenshot, the first character in the message "F" [G5 710] is displayed as an example. G5 712 shows that the current displaying character is "F", and the 4×4 token table attached to this character is shown in the table G5 714.

The key tokens attached to "F" are also shown as G5 720, G5 722 and G5 724.

The filler characters in the message: l, P, R, o, j, c, n, b and A are intentionally attached with token tables and keys that are invalid, so they will be invalidated on the receiver side.

In this example, the user can click on each character in G5 704 to show its content and key tokens, then click the "Check" button [G5 726] to see if the character is valid. In the screenshot, it shows that the character "F" is valid and the check was successful [G5 730].

FIG. 19B is a sample screenshot of a message decryption process using the GATE_5 embodiment. It shows what happens behind the scenes when the process shown in FIG. 19A is taking place and how a message is validated on the receiver side. The process proceeds as follows:

Message character "F" [G5 750] is encrypted with sender passcode "123" [G5 752] and attached with a 4×4 table of 16 tokens [G5 754] and a key with some tokens [G5 720, G5 722 and G5 724]. This information is sent to the network [G5 756] then to the receiver [G5 758].

On the receiver side, it uses the same passcode "123" [G5 760] to decrypt the message. The key tokens go through [G5 762] the validation process G5 764, G5 766, to check each key token. From K51, K52 and K53 one can see they are all valid, so a final conclusion is reached [G5 768] that the message is valid [G5 770], as shown in FIG. 19A [G5 730].

FIG. 20A is a sample screenshot of a message decryption process using the GATE_5 embodiment. It shows an example of how an encrypted filler message may be decrypted and recognized as invalid information by a receiver passcode. The process proceeds as follows:

FIG. 20A shows an example of what it might look like for each filler character that is not part of the original message. It shows the content of the third character "P" [G5 711] in the message [G5 704]. G5 713 shows that the character is "P", and the 4×4 table of 16 tokens attached to this character is shown in G5 715. The 3 key tokens attached to "P" are shown as G5 721, G5 723 and G5 725.

Since the character "P" is a filler character and is not part of the original message, the sender intentionally attached it with a 4×4 token table and key that would not validate, as one can clearly see that the sender passcode [G5 702] and receiver passcode [G5 706] are the same and has 3 pins "1", "2" and "3". The first pin "1" in the passcode appears in the last token in the 4×4 table [G5 716], and that token should be selected as the first key token. However, the second token [G5 718] in the table was selected, and is shown in the first key token position G5 721. This is wrong and would invalidate this message.

In the screenshot, when the user clicks the "Check" button G5 726, it shows that the validation process has failed [G5 731] for this character "P".

FIG. 20B is a sample screenshot of a message decryption process using the GATE_5 embodiment. It shows what happens behind the scenes when the process shown in FIG.

20A is taking place and how a filler message is invalidated on the receiver side. The process proceeds as follows:

Message character "P" [G5 751] is encrypted with sender passcode "123" [G5 752] and attached with a 4×4 table of 16 tokens [G5 755] and a key with some tokens [G5 721, G5 723 and G5 725]. This information is sent to the network [G5 757] then to the receiver [G5 759].

On the receiver side, it uses the same passcode "123" [G5 760] to decrypt the message. The key tokens go through [G5 763] the validation process G5 765, G5 767, to check each key token. From K61, K62 and K63 one can see the 1st token is invalid.

The 1st passcode "1" appeared in the last token [G5 790], and it should be selected. However, the 2nd token [G5 792] was selected and shows up in the first key token position [G5 721]. It is therefore invalid.

A final conclusion is reached [G5 769] that the message is invalid [G5 771], as shown in FIG. 20A [G5 731].

FIG. 21 is a sample screenshot of a message decryption process using the GATE_5 embodiment. It shows an example of how an encrypted original message may not be successfully decrypted by a receiver passcode that is different from the sender passcode. The process proceeds as follows:

User typed in a plain text message "FYEO" in G5 700, then entered passcode "123" [G5 702] and clicked on the "Encrypt" button [G5 703].

The message is encrypted, sent and received, and showed up at G5 705 as: "FlPRojcYnEbAO" [G5 705].

Receiver uses passcode "680" [G5 707] to decrypt the message received from the sender, which is encrypted with passcode "123" [G5 702].

The decrypted message is highlighted in G5 705: "nE".

The result message is shown as "nE" [G5 709].

The result message is different from the original message from sender: "FYEO" [G5 700], because the receiver used a different passcode to decrypt the message.

The following steps are preferably used, for each pin in the passcode, to generate valid key tokens against a 4×4 table with 16 tokens for each valid message:

Go through all the 16 tokens: (a) if the pin is found in a token, pick that token; and (b) if the pin is not in any token, pick a random token from the 16 tokens in the table.

The following steps are preferably used to generate invalid key tokens against a 4×4 table with 16 tokens for each invalid message:

<1> Set boolean "Done_Fixing" to false

<2> Go through all the 16 tokens, do steps <3> and <4> below for each pin in the passcode <3> <A> If the pin is found in a token:

(1) If Done_Fixing equals false, pick any other token except this one to intentionally pick a wrong token, and set Done_Fixing to true.

(2) If Done_Fixing equals true, pick that token.

<B> If the pin is not in any token, pick a random token from the 16.

<4> Save the key token generated above into a vector.

<5> Generate a random number N in the range of: −1 to 1

<A> If N=−1, delete the last key token from the vector.

<B> If N=0, do nothing.

<C> If N=1 and user pin length <6, add a random token from the 16 in the table to the vector.

<6> The tokens in the vector will be the final key tokens.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

For example, although the present invention has been described in connection with the GATE_4 and GATE_5 embodiments, in which 4 dimensions and 5 dimensions of symbols are used, respectively, any number of dimensions (including only one dimension) may be used while still falling within the scope of the present invention. In general, as long as each token has more than one symbol, any number of symbols categorized in any number of dimensions may be used. Further, the GATE_4 and GATE_5 embodiments described above, as well as the associated screenshots, are meant to be illustrative and not to limit the scope of the present invention.

What is claimed is:

1. An encryption/decryption method for information comprising:

receiving and electronically storing a passcode ("passcode") that comprises a predetermined number of symbols ("passcode symbols") selected from a set of symbols, wherein each of the passcode symbols is characterized by a predetermined pin position in the passcode;

receiving original information to be encrypted ("original information"), wherein the original information comprises a predetermined number of original information elements in respective information element positions, wherein the original information elements are selected from a set of information elements;

inserting randomly selected information elements from the set of information elements ("random information elements") into the original information at random information element positions to generate encrypted information;

generating a token set for each original and random information element, wherein each token set comprises the same number of tokens and comprises at least two tokens, wherein each token in each token set comprises at least two symbols that belong to the set of symbols; and generating a respective key for each original and random information element in the encrypted information, wherein each key comprises at least two key tokens, wherein each key token from each respective key is selected from the key's respective token set, and wherein at least one of the key tokens in each original information element's corresponding key contains a respective one of the passcode symbols;

wherein the keys are generated such that they are adapted to be used with the passcode to decrypt the encrypted information, thereby enabling secure information exchange between two or more devices.

2. The method of claim 1, wherein, during a decryption process, an information element in the encrypted information is determined to be a valid information element if:

the number of key tokens in the information element's corresponding key is equal to the number of symbols in the passcode;

at least one of the key tokens in the information element's corresponding key contains a respective one of the passcode symbols; and a pin position of each of the key tokens in the information element's corresponding key that contains a respective one of the passcode symbols corresponds to the pin position of its respective passcode symbol in the passcode.

3. The method of claim 1, wherein, during a decryption process, an information element in the encrypted information is determined to be a valid information element if:

the number of key tokens in the information element's corresponding key is equal to the number of symbols in the passcode;

each key token in the information element's corresponding key contains a respective one of the passcode symbols; and a pin position of each of the key tokens in the information element's corresponding key that contains a respective one of the passcode symbols corresponds to the pin position of its respective passcode symbol in the passcode.

4. The method of claim 1, wherein the set of symbols is divided into at least two subsets ("dimensions"), and wherein each token and each key token comprises a symbol from each of the at least two dimensions.

5. The method of claim 1, wherein the number of symbols in the set of symbols is equal to the number of tokens in the token set.

6. The method of claim 1, wherein the number of symbols in the set of symbols is greater than the number of tokens in the token set.

7. The method of claim 1, wherein each key token comprises four symbols that belong to the set of symbols.

8. The method of claim 7, wherein each set of symbols is divided into four subsets ("dimensions"), and wherein each token and each key token comprises a symbol from each dimension of symbols.

9. The method of claim 1, wherein each key token comprises five symbols that belong to the set of symbols.

10. The method of claim 9, wherein each set of symbols is divided into five subsets ("dimensions"), and wherein each token and each key token comprises a symbol from each dimension of symbols.

11. The method of claim 1, wherein the set of information elements is based on the Unicode system.

12. A system for encryption/decryption of information comprising:

a processor;

memory accessibly by the processor; and an authentication/encryption module comprising a set of computer readable instructions stored in memory that are executable by the processor to:

receive and electronically store a passcode ("passcode") that comprises a predetermined number of symbols ("passcode symbols") selected from a set of symbols, wherein each of the passcode symbols is characterized by a predetermined pin position in the passcode;

receive original information to be encrypted ("original information"), wherein the original information comprises a predetermined number of original information elements in respective information element positions, wherein the original information elements are selected from a set of information elements;

insert randomly selected information elements from the set of information elements ("random information elements") into the original information at random information element positions to generate encrypted information;

generate a token set for each original and random information element, wherein each token set comprises the same number of tokens and comprises at least two tokens, wherein each token in each token set comprises at least two symbols that belong to the set of symbols;

generate a respective key for each original and random information element in the encrypted information, wherein each key comprises at least two key tokens, wherein each key token from each respective key is selected from the key's respective token set, and wherein at least one of the key tokens in each original information element's corresponding key contains a respective one of the passcode symbols;

wherein the keys are generated such that they are adapted to be used with the passcode to decrypt the encrypted information, thereby enabling secure information exchange between two or more devices.

13. The system of claim 12, wherein, during a decryption process, the processor determines that an information element in the encrypted information is a valid information element if:

the number of key tokens in the information element's corresponding key is equal to the number of symbols in the passcode;

at least one of the key tokens in the information element's corresponding key contains a respective one of the passcode symbols; and a pin position of each of the key tokens in the information element's corresponding key that contains a respective one of the passcode symbols corresponds to the pin position of its respective passcode symbol in the passcode.

14. The system of claim 12, wherein, during a decryption process, the processor determines that an information element in the encrypted information is a valid information element if:

the number of key tokens in the information element's corresponding key is equal to the number of symbols in the passcode;

each key token in the information element's corresponding key contains a respective one of the passcode symbols; and a pin position of each of the key tokens in the information element's corresponding key that contains a respective one of the passcode symbols corresponds to the pin position of its respective passcode symbol in the passcode.

15. The system of claim 12, wherein the set of symbols is divided into at least two subsets ("dimensions"), and wherein each token and each key token comprises a symbol from each of the at least two dimensions.

16. The system of claim 12, wherein the number of symbols in the set of symbols is equal to the number of tokens in the token set.

17. The system of claim 12, wherein the number of symbols in the set of symbols is greater than the number of tokens in the token set.

18. The system of claim 12, wherein each key token comprises four symbols that belong to the set of symbols.

19. The system of claim 18, wherein each set of symbols is divided into four subsets ("dimensions"), and wherein each token and each key token comprises a symbol from each dimension of symbols.

20. The system of claim 12, wherein each key token comprises five symbols that belong to the set of symbols.

21. The system of claim 20, wherein each set of symbols is divided into five subsets ("dimensions"), and wherein each token and each key token comprises a symbol from each dimension of symbols.

22. The system of claim 12, wherein the set of information elements is based on the Unicode system.

23. An encryption/decryption method for information comprising:

receiving and electronically storing a passcode ("passcode") that comprises a predetermined number of symbols ("passcode symbols") selected from a set of symbols, wherein each of the passcode symbols is characterized by a predetermined pin position in the passcode;

receiving original information to be encrypted ("original information"), wherein the original information comprises a predetermined number of original information elements in respective information element positions, wherein the original information elements are selected from a set of information elements;

inserting randomly selected information elements from the set of information elements ("random information elements") into the original information at random information element positions to generate encrypted information;

generating a respective key for each original and random information element in the encrypted information, wherein each key comprises at least two key tokens, wherein each key token comprises at least two symbols from the set of symbols, and wherein at least one of the key tokens in each original information element's corresponding key contains a respective one of the passcode symbols;

wherein the keys are generated such that they are adapted to be used with the passcode to decrypt the encrypted information, thereby enabling secure information exchange between two or more devices.

24. The method of claim 23, wherein, during a decryption process, an information element in the encrypted information is determined to be a valid information element if:

the number of key tokens in the information element's corresponding key is equal to the number of symbols in the passcode;

at least one of the key tokens in the information element's corresponding key contains a respective one of the passcode symbols; and a pin position of each of the key tokens in the information element's corresponding key that contains a respective one of the passcode symbols corresponds to the pin position of its respective passcode symbol in the passcode.

25. The method of claim 23, wherein, during a decryption process, an information element in the encrypted information is determined to be a valid information element if:

the number of key tokens in the information element's corresponding key is equal to the number of symbols in the passcode;

each key token in the information element's corresponding key contains a respective one of the passcode symbols; and a pin position of each of the key tokens in the information element's corresponding key that contains a respective one of the passcode symbols corresponds to the pin position of its respective passcode symbol in the passcode.

26. A system for encryption/decryption of information comprising:

a processor;

memory accessibly by the processor; and an authentication/encryption module comprising a set of computer readable instructions stored in memory that are executable by the processor to:

receive and electronically store a passcode ("passcode") that comprises a predetermined number of symbols ("passcode symbols") selected from a set of symbols, wherein each of the passcode symbols is characterized by a predetermined pin position in the passcode;

receive original information to be encrypted ("original information"), wherein the original information comprises a predetermined number of original information elements in respective information element positions, wherein the original information elements are selected from a set of information elements;

insert randomly selected information elements from the set of information elements ("random information elements") into the original information at random information element positions to generate encrypted information;

generate a respective key for each original and random information element in the encrypted information, wherein each key comprises at least two key tokens, and wherein each key token comprises at least two symbols from the set of symbols;

wherein the keys are generated such that they are adapted to be used with the passcode to decrypt the encrypted information, thereby enabling secure information exchange between two or more devices.

27. The system of claim 26, wherein, during a decryption process, the processor determines that an information element in the encrypted information is a valid information element if:

the number of key tokens in the information element's corresponding key is equal to the number of symbols in the passcode;

at least one of the key tokens in the information element's corresponding key contains a respective one of the passcode symbols; and a pin position of each of the key tokens in the information element's corresponding key that contains a respective one of the passcode symbols corresponds to the pin position of its respective passcode symbol in the passcode.

28. The system of claim 26, wherein, during a decryption process, the processor determines that an information element in the encrypted information is a valid information element if:

the number of key tokens in the information element's corresponding key is equal to the number of symbols in the passcode;

each key token in the information element's corresponding key contains a respective one of the passcode symbols; and a pin position of each of the key tokens in the information element's corresponding key that contains a respective one of the passcode symbols corresponds to the pin position of its respective passcode symbol in the passcode.

* * * * *